United States Patent [19]

Takahashi

[11] Patent Number: 5,467,237

[45] Date of Patent: Nov. 14, 1995

[54] SLIDING TYPE MAGNETIC HEAD FOR MAGNETO-OPTICAL RECORDING

[75] Inventor: Tomoyuki Takahashi, Miyagai, Japan

[73] Assignee: Sony Corporation, Tokyo, Japan

[21] Appl. No.: 349,454

[22] Filed: Dec. 5, 1994

Related U.S. Application Data

[63] Continuation of Ser. No. 982,295, Nov. 25, 1992, abandoned.

[30] Foreign Application Priority Data

| Dec. 13, 1991 | [JP] | Japan | 3-330634 |
| Feb. 10, 1992 | [JP] | Japan | 4-023964 |
| Jun. 16, 1992 | [JP] | Japan | 4-157040 |

[51] Int. Cl.⁶ ............................................. G11B 5/58
[52] U.S. Cl. ........................... 360/114; 360/104; 369/13
[58] Field of Search .......................... 360/114, 103, 360/105, 109; 369/13

[56] References Cited

U.S. PATENT DOCUMENTS

| 4,996,615 | 2/1991 | Iwanaga | 360/104 |
| 5,027,241 | 6/1991 | Hatch et al. | 360/104 |
| 5,055,969 | 10/1991 | Putnam | 360/103 |
| 5,060,099 | 10/1991 | Yeager et al. | 360/105 |
| 5,198,934 | 3/1993 | Kubo et al. | 360/103 |
| 5,231,613 | 7/1993 | Nakayama et al. | 360/114 |
| 5,237,475 | 8/1993 | Kazama et al. | 360/114 |
| 5,243,482 | 9/1993 | Yamaguchi et al. | 360/103 |

FOREIGN PATENT DOCUMENTS

| 0218811 | 4/1987 | European Pat. Off. . |
| 0438315 | 7/1991 | European Pat. Off. . |
| 61-284883 | 12/1986 | Japan . |
| 62-289981 | 2/1987 | Japan . |
| 62-125554 | 6/1987 | Japan .................................... 360/114 |
| 1227241 | 9/1989 | Japan . |
| 0215412 | 1/1990 | Japan .................................... 360/103 |
| 2037583 | 2/1990 | Japan . |
| 3052176 | 3/1991 | Japan . |

Primary Examiner—John H. Wolff
Assistant Examiner—Kevin M. Watkins
Attorney, Agent, or Firm—Hill, Steadman & Simpson

[57] ABSTRACT

A sliding type magnetic head for magneto-optical recording which can prevent a jump thereof caused by a variation in profile of a surface of a disk and can realize reduction of a load force and provide a countermeasure against an external impact. A magnetic head body includes a head element having a coil wound on a magnetic core and has a sliding element provided on one side of the head element for slidably contacting with a magneto-optical disk. The magnetic head body is mounted on a gimbal of a slider arm at a position thereof corresponding to the position of the center of gravity thereof or to a position in the proximity of the position of the center of gravity. The slider arm is supported for pivotal motion on a head arm at a position thereof corresponding to the position of the center of gravity thereof or to a position in the proximity of the position of the center of gravity. A coil spring is interposed between the head arm and the sliding element of the magnetic head body.

5 Claims, 81 Drawing Sheets

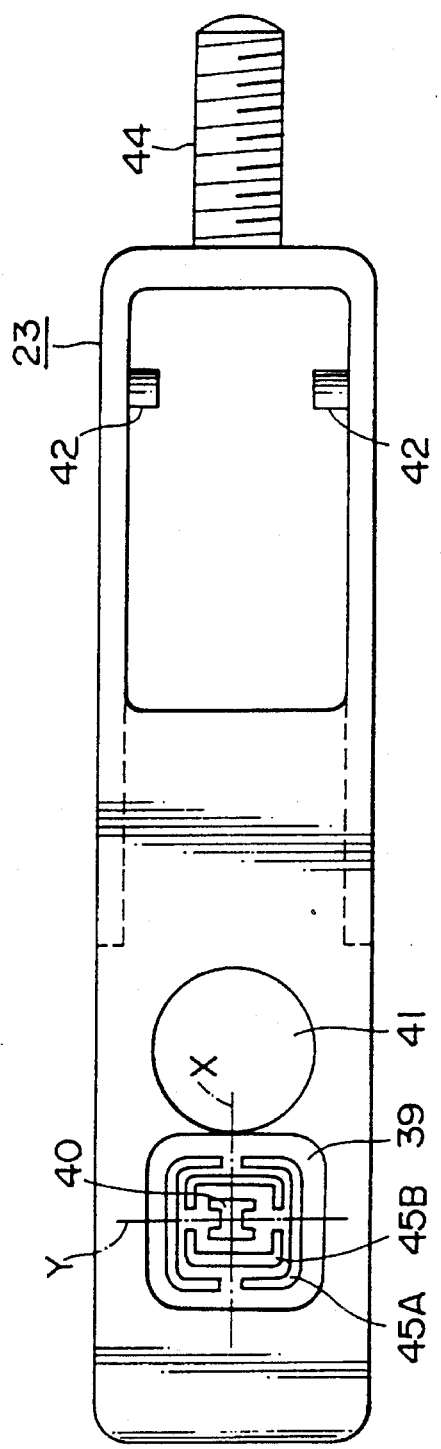
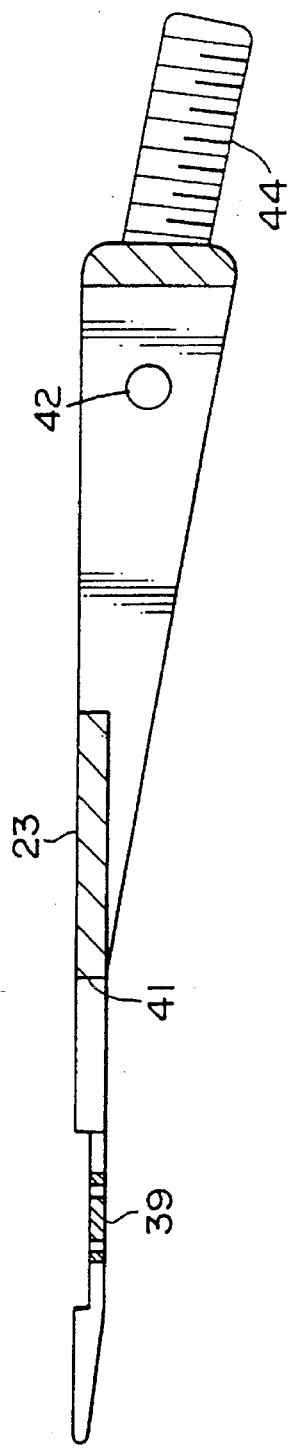
FIG. 6(A)
FIG. 6(B)

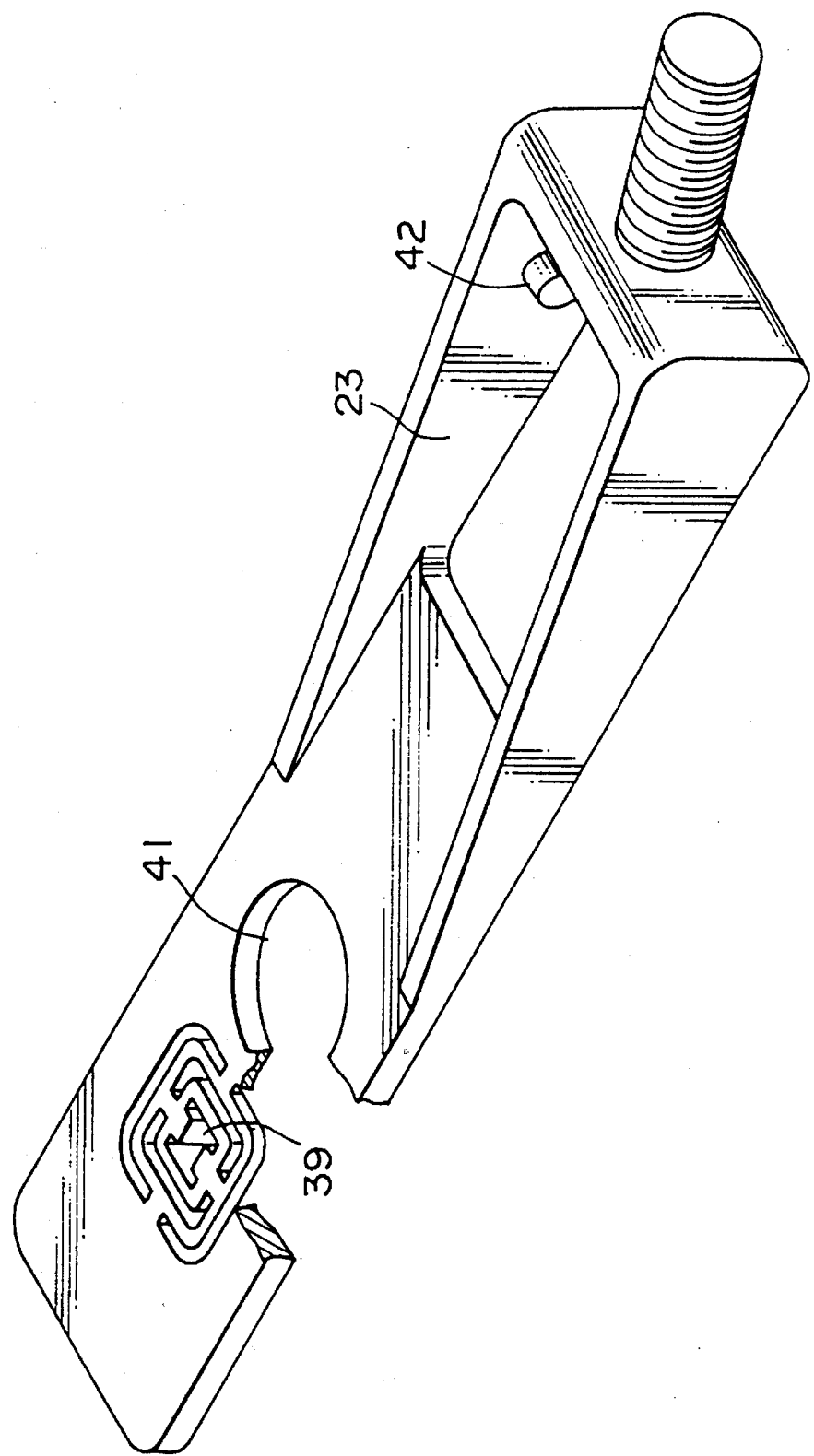

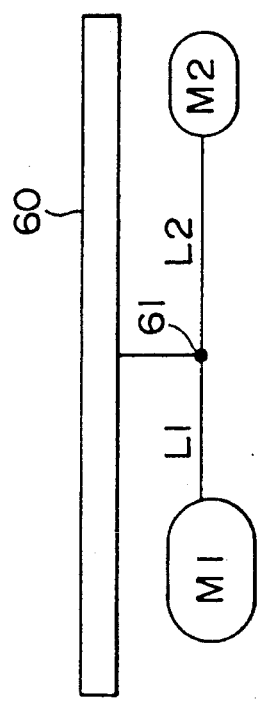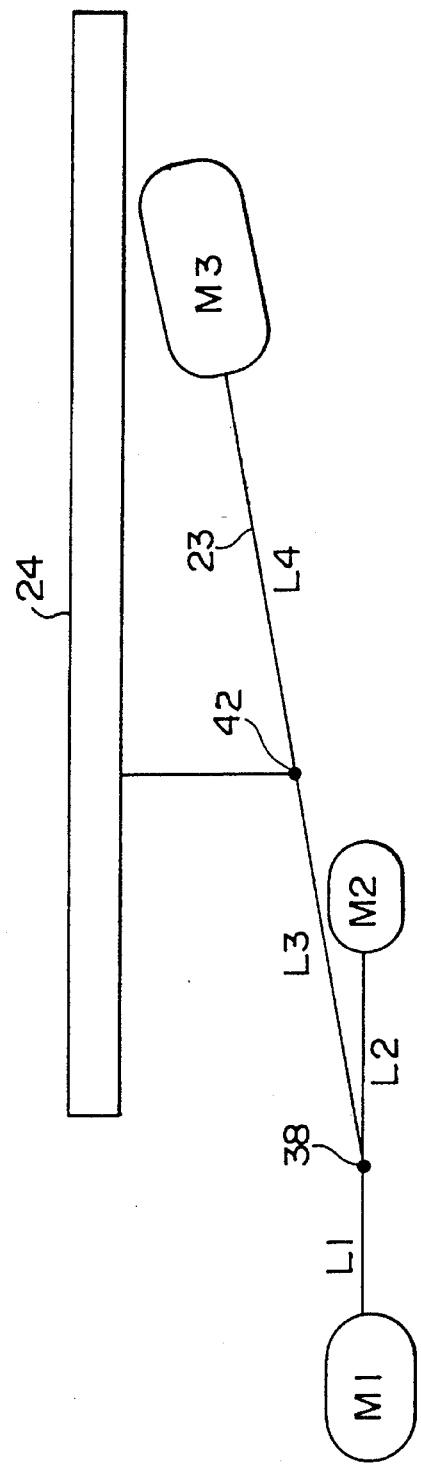
FIG. 10(A)
FIG. 10(B)

F I G. 60(A)
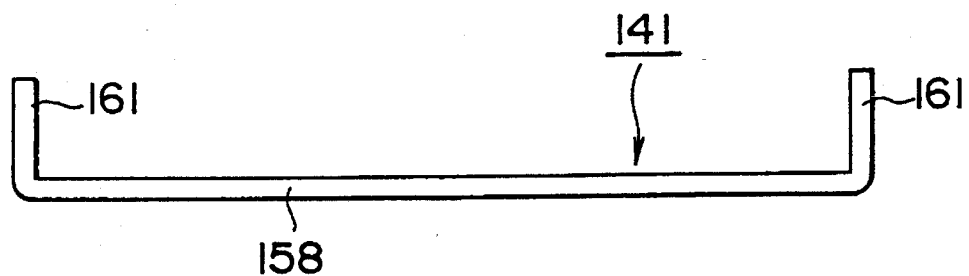
F I G. 60(B)
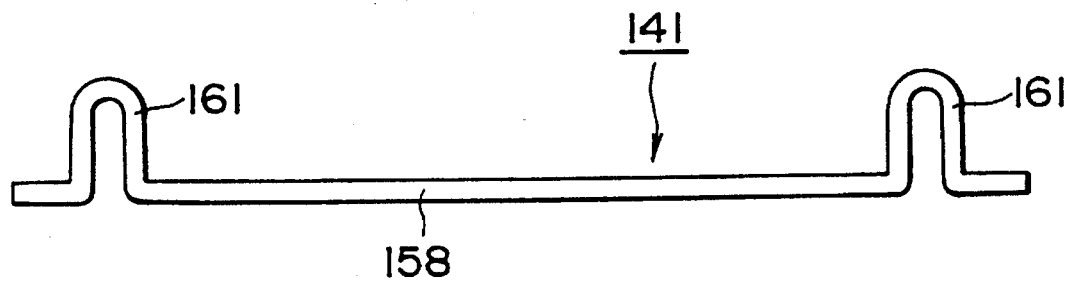

SLIDING TYPE MAGNETIC HEAD FOR MAGNETO-OPTICAL RECORDING

This is a continuation of application Ser. No. 07,982,295, filed Nov. 25, 1992, now abandoned.

BACKGROUND OF THE INVENTION

1. Field of the Invention

This invention relates to a sliding type magnetic head for magneto-optical recording which contacts with and slides on a magneto-optical record medium to effect magneto-optical recording of the record medium.

2. Description of the Related Art

Various writable optical disks for which writing, erasure and reading out can be performed using a beam of light are already known, and one of the writable optical disks is a magneto-optical disk.

General construction of a magneto-optical disk is shown in FIG. 87. Referring to FIG. 87, the magneto-optical disk 1 shown includes a transparent substrate 2, a magneto-optical recording layer 3 formed from a vertical magnetization film and provided on the transparent substrate 2, a reflection film 4 formed from, for example, a thin aluminum film and provided on the magneto-optical recording layer 3, and a protective film 5 made of, for example, a resin of the ultraviolet radiation setting type and formed on the reflection film 4.

Magnetic field modulation, light modulation and so forth are known as recording methods for a magneto-optical disk.

The magnetic field modulation allows so-called overwriting wherein a new signal is written over an old signal. In magneto-optical recording according to the magnetic field modulation, as shown in FIG. 86, an optical pickup for irradiating laser light 6 and magnetic field generating means which moves in synchronism with a laser spot, that is, a magnetic head 4, are disposed on the opposite sides of a magneto-optical disk 1 having a magneto-optical recording layer formed from a vertical magnetization film. In particular, the former is disposed adjacent the substrate 2 of the magneto-optical disk 1 while the latter is disposed adjacent the protective film 5 of the magneto-optical disk 1. Thus, the direction of the magnetic field generated by the magnetic head 7 is varied by varying the direction of an electric current to flow through the magnetic head 7.

The magneto-optical disk 1 is rotated at a predetermined speed around an axis at the center thereof.

As a magnetic field corresponding to a recording signal is formed around a laser spot 6a, a portion 1A of the disk 1 to be re-written is heated to a temperature higher than its Curie temperature at the laser spot 6a so that it is demagnetized. Then, the portion 1A of the disk 1 moves away from the laser spot 6a, and consequently, the temperature thereof drops to a level lower than the Curie temperature. In this condition, the portion 1A of the disk 1 is magnetized in the direction of the magnetic field generated by the magnetic head 7 to effect magnetic recording thereof.

A conventional magneto-optical disk is a non-contacting medium, and accordingly, the magnetic head 7 is disposed in a spaced relationship by a necessary and sufficient distance d0 from the magneto-optical disk 1.

Since a conventional magneto-optical disk is recorded in a non-contacting condition as described just above, an electromagnetic servo mechanism is provided for the magnetic head 7 for magneto-optical recording so that the magnetic head 7 may follow up deflection of the disk 1 in a lateral direction to and from its plane which takes place when the disk 1 rotates while the magnetic head 3 remains spaced away from the disk 1 and which is caused by an inclination, an uneven thickness or the like of the disk 1. Accordingly, a recording and reproducing machine which records and reproduces a magneto-optical disk in a non-contacting condition is limited in reduction of the power dissipation, reduction in size (particularly in thickness) and so forth.

The inventor of the present invention has proposed a sliding type magnetic head which contacts with and slides on a magneto-optical disk upon recording or reproduction. The sliding type magnetic head is shown in FIG. 88. Referring to FIG. 88, the sliding type magnetic head 11 includes a head element 14 wherein a coil 13 is wound around a center magnetic pole core 12A of a ferrite core member 12, and a sliding member 15 provided along a peripheral portion of a lower face of the head element 14 and having a coefficient of friction lower than that of the ferrite core member 12.

In the sliding type magnetic head 11, the sliding member 15 contacts with and slides on the disk 1 while the center magnetic pole core 12A is opposed to the disk 1 in a spaced relationship by a small distance d1 and does not contact directly with the disk 1. Accordingly, the center magnetic pole core 12A will not damage the protective film 5 of the disk 1 at all.

Further, since the magnetic head 11 is of the contacting type wherein it contacts with and slides on the magneto-optical disk 1, it can be supported by way of such a simple structure that it is mounted on a head arm by way of a resilient supporting member of itself, and a conventionally employed electrode servo mechanism which occupies a large volume can be eliminated. Accordingly, the sliding type magnetic head 11 is advantageous in reduction of the power dissipation of a recording and/or reproducing apparatus and in miniaturization of the equipment. Further, since the magnetic head 11 comes closer to the disk 1 than a magnetic head of the non-contacting type, the magnetic field acting upon the disk 1 is higher in intensity, and consequently, the recording power can be reduced.

By the way, with the magnetic head 11 described above, there is the possibility that, when it is acted upon by an impact from the outside, it may be spaced away from the disk 1.

The supporting mechanism for the magnetic head 11 described above is shown as a model in FIG. 90. Referring to FIG. 90, the magnetic head 11 is supported on a head arm 18 by way of a spring member 17 so that it is normally held in resilient contact with a surface 1a of the disk 1 under the resilient force of the spring member 17.

Now, if it is assumed that an acceleration a is applied to the head arm 18 and the disk 11 from an external force, then when the acceleration a acts in the downward direction, the magnetic head 11 will be spaced away from the disk 1 since it tries to keep its present position due to the magnetism. In particular, in the configuration shown in FIG. 90, a force F which is equal to the product of the acceleration a and the mass of the magnetic head 11 is generated in the upward direction. Accordingly, the magnetic head 11 and the disk 1 will be spaced away from each other if a spring force greater than the force F but acting in the opposite direction does not act upon the magnetic head 11.

Accordingly, for an external impact, a method is taken wherein a load force which increases in proportion to a forecast acceleration a is applied to the sliding member of the magnetic head. Consequently, the sliding resistance is increased, and as a result, there is the possibility that the damage to the disk 1 may be increased and the load to a spindle motor for driving the disk 1 to rotate may be increased. Further, abrasion of the sliding member 15 may not be ignored any more.

Furthermore, where there is some irregular variation in profile such as a bump 16 on the surface 1a of the disk 1, when the sliding member 15 of the magnetic head 11 passes the bump 16, the magnetic head 11 will be caused to jump by an amount of the height h1 of the bump 16 and be spaced away from the surface 1a of the disk 1. Consequently, the recording capacity is dropped. Accordingly, in order to maintain the recording capacity of the magnetic head 11, the magnetic head 11 must have a high output.

Further, since the apparent weight of the sliding type magnetic head 11 then is, according to the conventional supporting mechanism, the mass of the magnetic head 11 itself, the impact upon the disk 1 is high. If the impact is excessively high, then the disk 1 will slide on the magnetic head 11, resulting in a defocused condition of the optical system.

In order to reduce the impact, it seems an effective measure to reduce the mass of the magnetic head 11 and accordingly reduce the size and weight of the head 11 itself. However, if the magnetic head 11 is made small, then the head output is reduced contrary to the object of using a head of a high output described above.

SUMMARY OF THE INVENTION

It is an object of the present invention to provide a sliding type magnetic head for magneto-optical recording which can prevent a jump thereof caused by a variation in profile of a surface of a disk.

It is another object of the present invention to provide a sliding type magnetic head for magneto-optical recording which can realize reduction of a load force and provide a countermeasure against an external impact.

In order to attain the objects, according to an aspect of the present invention, there is provided a sliding type magnetic head for magneto-optical recording, which comprises a head body including a head element including a coil and a magnetic core, the head body further including a sliding element on one side of the head element for slidably contacting with a record medium.

With the sliding type magnetic head for magneto-optical recording, since the head body which includes the head element and the sliding element on the one side of the head element for slidably contacting with a record medium is employed, contact of the magnetic core with the record medium is prevented. Accordingly, the magnetic head can be slidably contacted with the record medium without damaging the record medium.

Preferably, the center of gravity of the head body is positioned intermediately between the head element and the sliding element. When a variation in profile of a surface of a record medium such as, for example, a bump collides with the sliding element, the head body is pivoted around the center of gravity thereof in a direction in which the head element approaches the surface of the record medium. Consequently, a drop of the recording capacity of the magnetic head can be prevented, and contrary to this, enhancement of the recording capacity can be anticipated.

Preferably, the head element is held spaced away from a surface of a record medium when the sliding element of the head body contacts with the surface of the record medium. When a record medium has a variation in profile of a surface thereof such as, for example, a bump, it will pass between the head element and the surface of the record medium. Accordingly, the bump will not lift the head element to space it away from the surface of the record medium. Consequently, the recording capacity of the magnetic head is not determined by such variation in profile of the record medium.

According to another aspect of the present invention, there is provided a sliding type magnetic head for magneto-optical recording, which comprises a head body including a head element including a coil and a magnetic core, the head body further including a sliding element on one side of the head element for slidably contacting with a record medium, and a spring member for resiliently pressing the sliding element of the head body against a surface of a record medium and for spacing the head element away from the surface of the record medium.

With the sliding type magnetic head for magneto-optical recording, since it comprises the head body and the spring member for resiliently pressing the sliding element of the head body against a surface of a record medium and for spacing the head element away from the surface of the record medium, it can follow up a variation in profile of the surface of the record medium and can achieve a countermeasure for an external impact with a simple structure.

Preferably, the position at which the head body is supported is a position corresponding to or in the proximity of the position of the center of gravity of the head body. The head body is thus supported in a leftwardly and rightwardly well-balanced condition. Accordingly, since the sliding element is positioned at a location displaced from the position of the center of gravity of the head body, at a point of time when a bump or the like of the surface of the record medium collides with the sliding element, the equivalent weight of the head body as viewed from the bump is reduced, and consequently, the impact upon the record medium is decreased and a bad influence upon an optical system is decreased.

According to a further aspect of the present invention, there is provided a sliding type magnetic head for magneto-optical recording, which comprises a head body including a head element including a magnetic core and a coil wound on the magnetic core, the head body further including a sliding element on one side of the head element for slidably contacting with a record medium, and a spring member for resiliently pressing the sliding element of the head element toward the record medium, the head body being supported at a position corresponding to an intermediate position thereof between the center of the magnetic core and the sliding element.

With the sliding type magnetic head for magneto-optical recording, since the spring member is disposed on the sliding element of the head body which has the sliding portion on the one side of the head element and the head body is supported at the position corresponding to the intermediate position thereof between the center of the magnetic core and the sliding element, even when the surface of a record medium has a variation in profile such as a bump, the head body will not be caused to jump by the bump but will be pivoted around the supported position thereof. As a result, the head element will approach the record medium. Accordingly, even if the magnetic head has a low output, it can be used practically. Consequently, reduction in size and weight can be achieved.

According to a still further aspect of the present invention, there is provided a sliding type magnetic head for magneto-optical recording, which comprises a head body including a head element including a magnetic core and a coil wound on the magnetic core, the head body further including a sliding element for slidably contacting with a record medium, and a first arm on which the head body is mounted, the first arm being supported for pivotal motion at a position corresponding to or in the proximity of the position of the center of gravity of the first arm including the head body.

With the sliding type magnetic head for magneto-optical recording, since the head body is mounted on the first arm and the first arm is supported for pivotal motion at the position corresponding to or in the proximity of the position of the center of gravity of the first arm including the head body, the head body is supported in a leftwardly and rightwardly well-balanced condition on the first arm, and also the first arm is supported in a leftwardly and rightwardly well-balanced condition. In the thus balanced systems, even if an external impact is applied, the well-balanced condition will not be lost, and as a result, the influence of the external impact can be controlled.

According to a yet further aspect of the present invention, there is provided a sliding type magnetic head for magneto-optical recording, which comprises a head body including a head element including a magnetic core and a coil wound on the magnetic core, the head body further including a sliding element for slidably contacting with a record medium, a first arm on which the head body is mounted, a second arm on which the first arm is supported for pivotal motion at a position corresponding to or in the proximity of the position of the center of gravity of the first arm including the head body, and a spring member interposed between the second arm and the sliding element of the head body.

With the sliding type magnetic head for magneto-optical recording, since the first arm is supported for pivotal motion on the second arm and the spring member is interposed between the second arm and the sliding element, the magnetic head can cope with a variation in profile of the surface of a record medium and an external impact and the spring pressure of the spring member can be made low. Consequently, the load force can be reduced and the sliding resistance to the magnetic head can be reduced.

According to a yet further aspect of the present invention, there is provided a sliding type magnetic head for magneto-optical recording, which comprises a head body including a head element including a coil and a magnetic core, the head body further including a sliding element on one side of the head element for slidably contacting with a record medium, and a spring member on which the head member is supported at the sliding element thereof.

With the sliding type magnetic head for magneto-optical recording, since the head body is supported at the sliding element thereof by the spring member, the sliding element can be contacted with the surface of a record medium with a suitable load while maintaining a required distance between the head element and the surface of the record medium.

Preferably, the position at which the head body is supported on the spring member is displaced to an end of the head body with respect to the center of the sliding element. Thus, otherwise possible concentration of the load upon the end of the head body on the head element side caused by lateral deflection of the record medium out of its plane can be prevented.

According to a yet further aspect of the present invention, there is provided a sliding type magnetic head for magneto-optical recording, which comprises a head body including a head element including a coil and a magnetic core, the head body further including a sliding element on one side of the head element for slidably contacting with a record medium, a spring member on which the head member is supported, and a fixing member to which the spring member is fixed, the fixing member having a stopper portion for stopping the spring member at a position at which a predetermined restoring force remains with the spring member.

With the sliding type magnetic head for magneto-optical recording, since the head body is supported on the spring member and the fixing member to which the spring member is fixed has the stopper portion for stopping the spring member at the position at which the predetermined restoring force remains with the spring member, the head body contacts with the surface of a record medium under a predetermined spring pressure. Accordingly, the variation of the pressing force of the head body against the surface of the record medium can be controlled small within a tolerance of lateral deflection of the record medium.

The spring member may be a leaf spring member. The spring member which copes with lateral deflection of a record medium and also with a variation in profile of the surface of the record medium can be obtained readily.

Preferably, the leaf spring member is made of an insulating material and has a wiring line formed on a surface thereof. Thus, the leaf spring member itself can be made to serve also as a flexible circuit board which electrically connects to the head body. Accordingly, an influence (reactive force) which may be had on the head body when a flexible circuit board is provided as a separate member is eliminated, and consequently, the head body can be maintained in good posture. Further, since wiring lines on the leaf spring member can be formed with a comparative great thickness and width, the resistance of the wiring lines is reduced and reduction of the power dissipation can be achieved.

The leaf spring member may have a wiring line formed thereon with an insulator layer interposed therebetween, the insulator being formed over the entire area or part of the area of the surface of the leaf spring member. Thus, also in this instance, the leaf spring member can serve as a flexible circuit board, and consequently, the advantages described above can be achieved.

A pair of wiring lines may be formed on the opposite side faces of a portion of the leaf spring member adjacent the head body on the opposite sides of the head body. The leaf spring member is thus improved in balance in resiliency.

Preferably, a grounding wiring line for electrostatic shielding is formed in the proximity of the wiring line. Consequently, electrostatic noise which may be produced from the wiring line can be prevented.

The wiring line may be formed at a portion of the leaf spring member adjacent the head body. The portion of the leaf spring member serves as a flexible circuit board, and also in this instance, an influence which may be had on the head body when a flexible circuit board is provided as a separate member can be reduced or eliminated.

According to a yet further aspect of the present invention, there is provided a sliding type magnetic head for magneto-optical recording, which comprises a head body including a head element including a coil and a magnetic core, the head body further including a sliding element on one side of the head element for slidably contacting with a record medium, and a leaf spring member on which the head member is supported at the sliding element thereof by way of a gimbal.

With the sliding type magnetic head for magneto-optical recording, since the head body is supported at the sliding element thereof on the leaf spring member by way of the gimbal, the follow-up performance of the head body for lateral deflection of a record medium is high.

According to a yet further aspect of the present invention, there is provided a sliding type magnetic head for magneto-optical recording, which comprises a head body including a head element including a coil and a magnetic core, the head body further including a sliding element on one side of the head element for slidably contacting with a record medium, and a leaf spring member on which the head member is supported at the sliding element thereof by way of a pivot shaft.

With the sliding type magnetic head for magneto-optical recording, since the head body is supported at the sliding element thereof on the leaf spring member by way of the pivot shaft, the follow-up performance of the head body for lateral deflection of a record medium is high.

According to a yet further aspect of the present invention, there is provided a sliding type magnetic head for magneto-optical recording, which comprises a leaf spring member having an end fixed, and a head body supported at the other end of the leaf spring member, the leaf spring member having a pair of independent spring portions on the head body supporting side and the fixed side.

With the sliding type magnetic head for magneto-optical recording, since the head body is supported on the leaf spring member which has the pair of independent spring portions on the head body supporting side and the fixed side, the spring portion on the head body supporting side can cope with a bump on the surface of a record medium while the other spring portion on the fixed side can cope with lateral deflection of the record medium. Consequently, the magnetic head can operate well.

Preferably, the spring portion of the leaf spring member on the fixed side is curved such that it may be convex toward a record medium. Even if the record medium is deflected laterally from and to its plane, displacement of the head element is cancelled or offset by deformation of the spring portion on the fixed side, and substantial displacement is prevented or minimized. Consequently, the magnetic field insuring region from a center magnetic pole core of a magnetic core member of the head body can be minimized. This will result in reduction of the power dissipation.

Preferably, the opposite side edge portions of the leaf spring member are laterally bent intermediately between the independent spring portions to separate the independent spring portions from each other. The spring portions on the head body supporting side and the fixed side can thus be separated readily from each other.

According to a yet further aspect of the present invention, there is provided a sliding type magnetic head for magneto-optical recording, which comprises a spring member having an end fixed, and a head body supported at the other end of the leaf spring member, the frequency of natural vibrations of the head body which includes the spring portions of the leaf spring member being set to a value lower than an equivalent frequency of a bump on a surface of a record medium.

With the sliding type magnetic head for magneto-optical recording, since the frequency of natural vibrations of the head body which includes the spring portions of the leaf spring member is set to a value lower than an equivalent frequency of a bump on a surface of a record medium, the head body can be operated stably.

According to a yet further aspect of the present invention, there is provided a sliding type magnetic head for magneto-optical recording, which comprises a spring member, and a head body supported on the spring member, a portion of the spring member on the head body supporting side including two spring portions lying in a same plane, the head body being present across the opposite sides of the plane when the magnetic head is in use.

With the sliding type magnetic head for magneto-optical recording, since the portion of the spring member on the head body supporting side includes the two spring portions lying in the same plane and the head body is disposed such that it is present across the opposite sides of the plane when the magnetic head is in use, the two spring portions are disposed such that they extend along an axial line passing the center of gravity of the head body or a location in the proximity of the axial line. Consequently, even when the head body collides with a variation in profile of the surface of the record medium such as, for example, a bump so that the head body is pivoted around the center of gravity thereof, the two spring portions are also pivoted around a portion corresponding to the center of gravity. Accordingly, pivotal motion of the head body is performed smoothly.

The spring member may be a wire-like spring member produced by bending a wire-like element. The magnetic head is simplified in structure.

According to a yet further aspect of the present invention, there is provided a sliding type magnetic head for magneto-optical recording, which comprises a wire-like spring member produced by bending a wire-like element so that a pair of opposite portions with respect to a central portion thereof extend laterally from the opposite ends of the central portion so as to extend alongside with each other such that the distance between them increases gradually toward free ends thereof, a fixing member to which the free ends of the wire-like spring member are fixed, and a head body supported for pivotal motion at the central portion of the wire-like spring member.

With the sliding type magnetic head for magneto-optical recording, since it comprises the wire-like spring member produced by bending a wire-like element so that the pair of opposite portions with respect to the central portion thereof extend laterally from the opposite ends of the central portion so as to extend alongside with each other such that the distance between them increases gradually toward free ends thereof, the head body can be positioned with certainty in its widthwise direction and does not undergo displacement thereof.

According to a yet further aspect of the present invention, there is provided a sliding type magnetic head for magneto-optical recording, which comprises a head body including a head element including a coil and a magnetic core, the head body further including a sliding element for slidably contacting with a record medium, and a shielding ring-shaped conductor disposed so as to surround the coil of the head element.

With the sliding type magnetic head for magneto-optical recording, since the shielding ring-shaped conductor is disposed so as to surround the coil of the head element, radiation of electromagnetic noise which may otherwise be radiated from the coil itself to the outside can be prevented.

According to a yet further aspect of the present invention, there is provided a sliding type magnetic head for magneto-optical recording, which comprises a head body including a head element and a sliding element on one side of the head element for slidably contacting with a record medium, a support member for supporting the head body at the position of the center of gravity of the head body by way of a gimbal portion, and a spring member for resiliently pressing the head body at a position corresponding to the sliding element.

With the sliding type magnetic head for magneto-optical recording, since the head body is supported at the position of the center of gravity thereof on the support member by way of the gimbal portion and the head body is resiliently pressed at the position thereof corresponding to the sliding element by the spring member, inadvertent movement of the head body can be prevented and the fundamental posture of the head body can be maintained well. Further, the magnetic head can bear an external impact.

Preferably, the sliding type magnetic head for magneto-optical recording further comprises a balance weight provided on the support member. Thus, the head body side and the balance weight side of the support member are balanced well with respect to a position nearer to the fixed side of the support member, and the magnetic head can bear an external impact better.

Thus, according to the present invention, a sliding type magnetic head for magneto-optical recording is provided which prevents a jump thereof caused by a variation in profile of a surface of a record medium such as a magneto-optical disk and can realize reduction of the load force and a countermeasure for an external impact at a time.

Further, an object sliding type magnetic head for magneto-optical recording can be constructed readily.

Furthermore, a sliding type magnetic head for magneto-optical recording can be provided which eliminates an influence of a flexible circuit board had on a head body and wherein the magnetic head can maintain a good posture.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 6A and 6B are a plan view and a sectional view of a slider arm of the magnetic head;

FIG. 7 is a perspective view, partly in section, of the slider arm;

FIG. 10A is a diagrammatic view illustrating a general balanced system, and FIG. 10B is a similar view but illustrating a balanced system of an equivalent model of the magnetic head of FIG. 1;

FIGS. 11 and 12 are schematic front elevational views illustrating pivotal movements of the head body when it is contacted in the opposite directions with a bump on a surface of a magnetic disk;

FIGS. 60A and 60B are schematic side elevational views showing different shapes of an inclined portion of a leaf spring member;

DETAILED DESCRIPTION OF THE PREFERRED EMBODIMENTS

Figure 1:
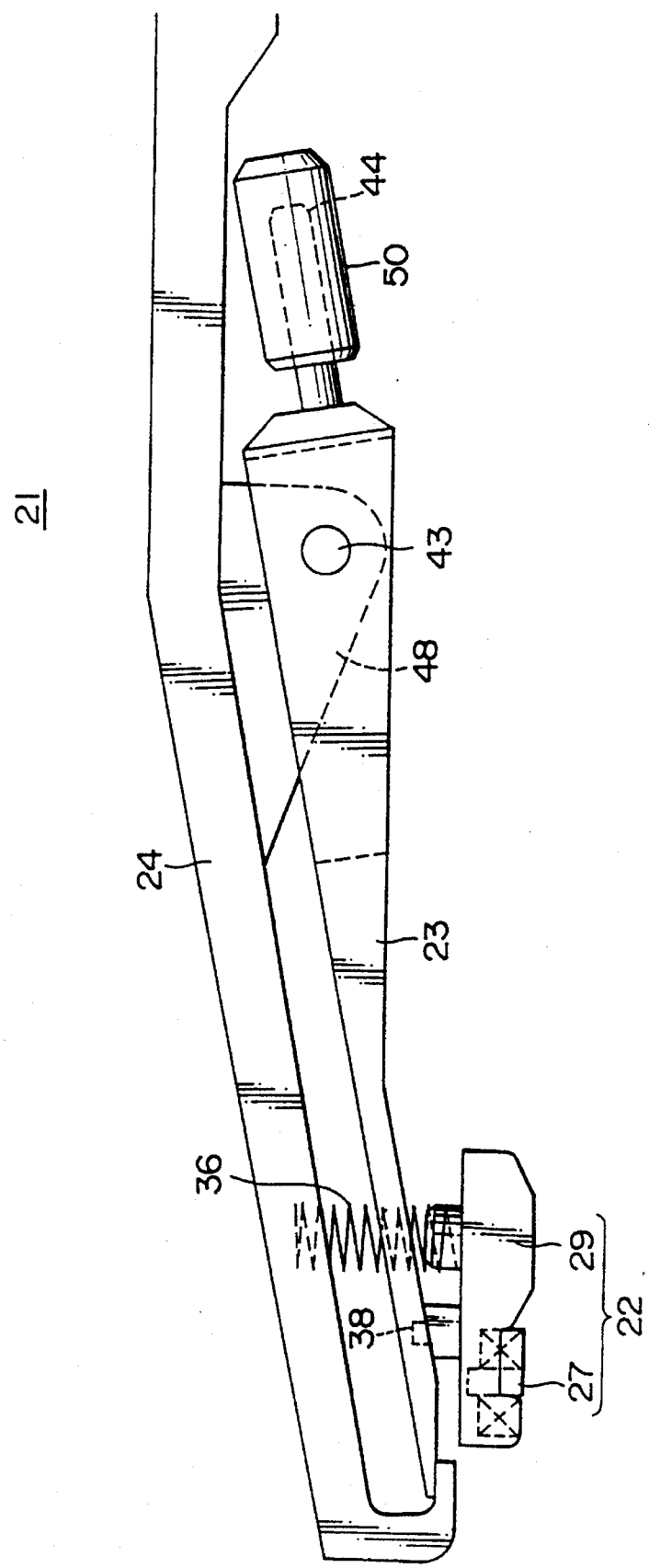
FIG. 1 is a schematic view of a sliding type magnetic head for magneto-optical recording showing a preferred embodiment of the present invention.
Figure 2:
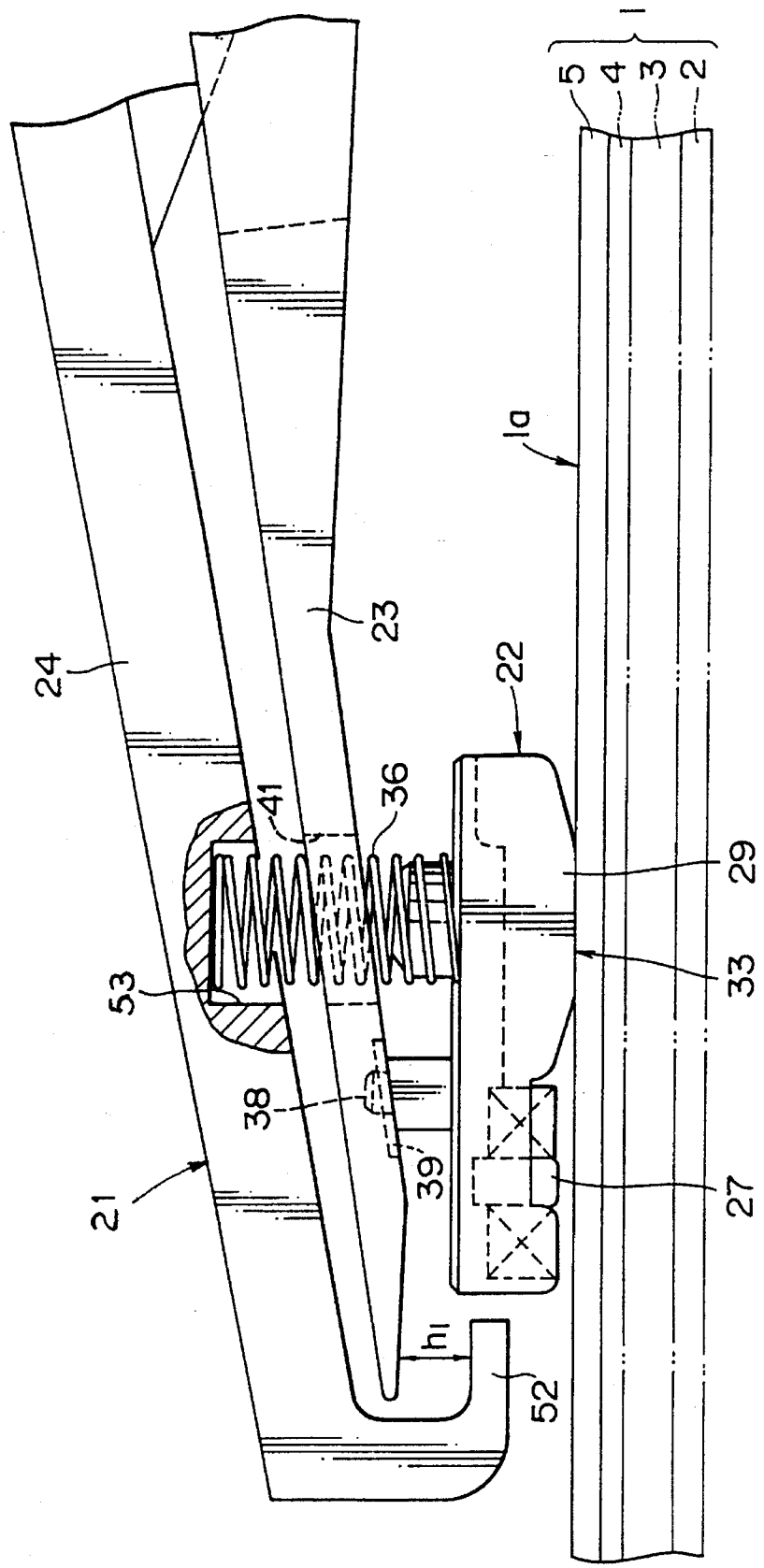
FIGS. 2 and 3 are enlarged front elevational views, partly in section, showing part of the magnetic head at different positions.
Figure 3:
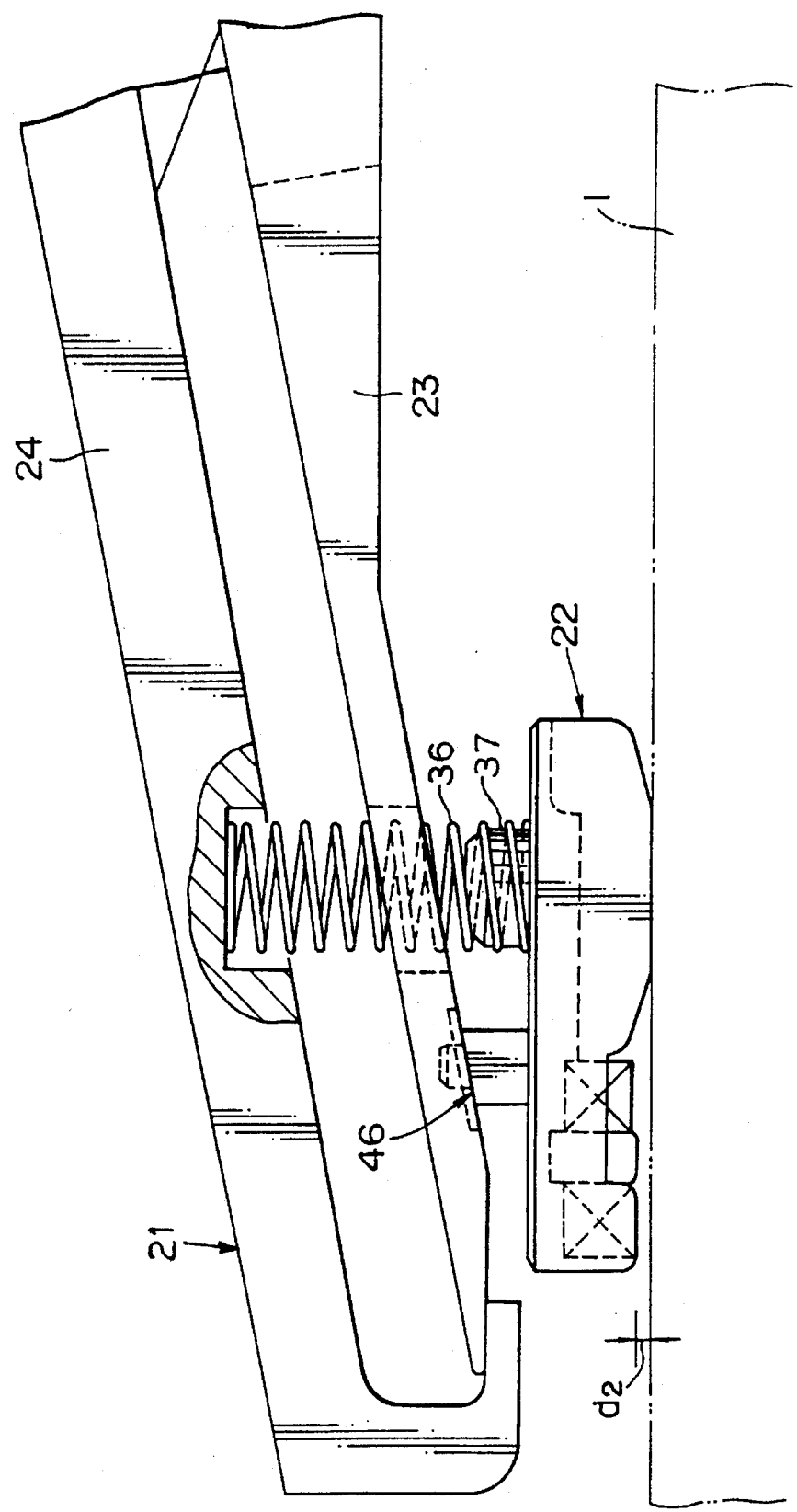

Referring first to FIGS. 1 to 3, there is shown a sliding type magnetic head for magneto-optical recording according to a preferred embodiment of the present invention. The sliding type magnetic head for magneto-optical recording is generally denoted at 21 and includes a magnetic head body 22, a slider arm 23 for supporting the magnetic head body 22 thereon, and a head arm 24 supporting the slider arm 23 for pivotal motion thereon and movable in a radial direction of a magneto-optical disk 1.

Figure 4:
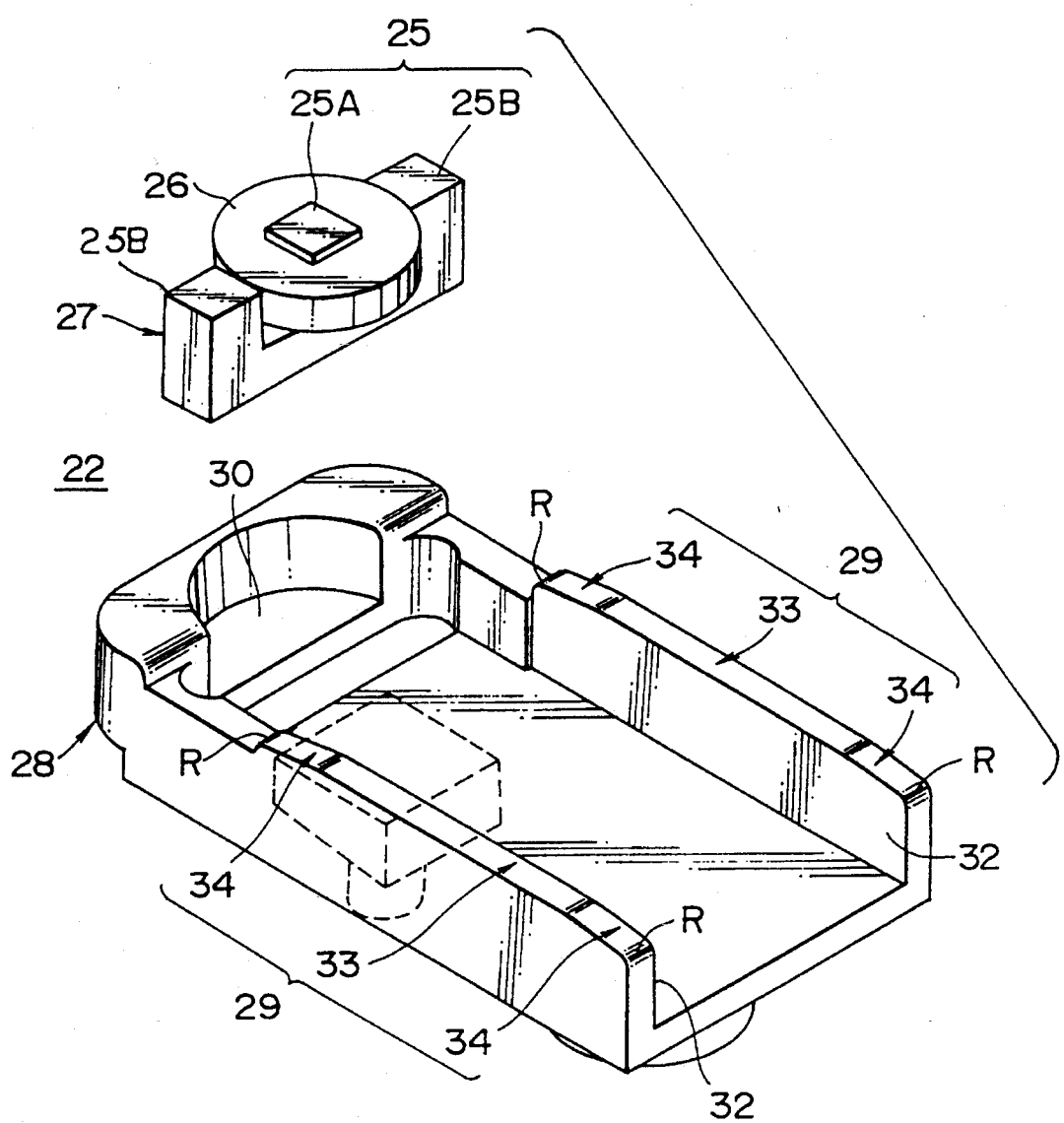
FIG. 4 is a fragmentary perspective view of a head body of the magnetic head.
Figure 5:
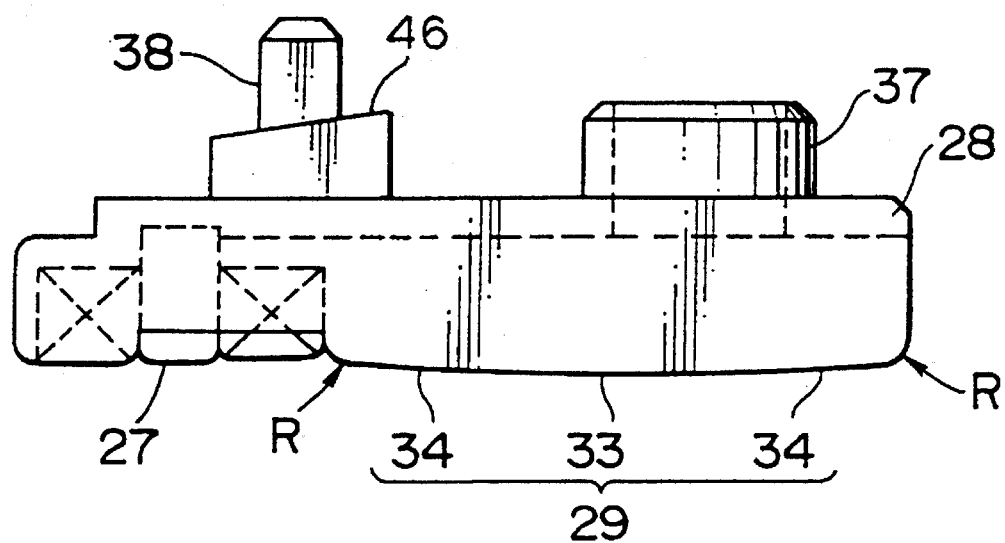
FIG. 5 is a front elevational view of the head body.

Referring also to FIGS. 4 and 5, the magnetic head body 23 includes a magnetic head element 27 which includes a ferrite magnetic core member 25 having a center magnetic pole core 25A and a pair of side magnetic pole cores 25B and having a substantially E-shaped profile, and a coil 26 wound on the center magnetic pole core 25A of the ferrite magnetic core member 25. The magnetic head body 23 further includes a slider 28 having a sliding portion 29 which directly contacts with and slides on the magnetic disk 1. The magnetic head element 27 is mounted integrally at an end portion of the sliding portion 29 of the slider 28.

It is to be noted that the head element 27 may otherwise be of a different type wherein a so-called barrel type magnetic core member having a side magnetic pole core surrounding a center magnetic pole core and a coil is wound on the center magnetic pole core of the barrel type magnetic core member.

The slider 28 is formed, for example, by injection molding of a resin having a low coefficient of friction and has a mounting recessed portion 30 for the magnetic head element 27 adjacent an end of the sliding portion 29. The sliding portion 29 generally has, for example, a substantially inverted U-shaped cross section and has a pair of leg portions 32 which substantially serve as the sliding portion 29. Each of the leg portions 32 has a flat face 33 provided at a central portion thereof in the sliding direction thereof with respect to the disk 1 for directly contacting with a disk 1 and has a pair of curved faces 34 formed adjacent the opposite ends of the flat face 33 such that they are, for example, tapered so that the leading and trailing end sides of each leg portion 32 in the sliding direction with respect to the disk 1 are spaced away from the disk 1 and they are rounded at individual corners thereof.

The head body 22 is thus constructed by mounting the magnetic head element 27 in the mounting recessed portion 30 located adjacent the end of the sliding portion 29.

A mounting portion 37 is formed integrally on an upper face of the slider 28 and receives thereon an urging spring member such as, for example, a coil spring 36 which urges the slider 28 to contact the flat faces 33 of the sliding portion 29 with the disk 1. A support shaft 38 is formed integrally at a position of the upper face of the slider 28 corresponding to the position of or in the proximity of the center of gravity of the head body 22 and supports the head body 22 on the slider arm 23. The mounting portion 37 for the coil spring 36 is located at a position corresponding to the center of the flat faces 33 of the sliding portion 29 of the slider 28.

With the head body 22 on which the magnetic head element 27 is mounted, when the flat faces 33 of the sliding portion 29 thereof contact with the disk 1, the end face of the magnetic core 25 of the head element 27 is spaced from the surface 1a of the disk 1 by a very small distance d2 (refer to FIG. 3), for example, by 20 to 30 μm or so where the head body 22 is used for a very small size magneto-optical disk (64 mm in diameter).

Further, the head body 22 is in a leftwardly and rightwardly well balanced condition with respect to the center of the support shaft 38 when it is supported on the slider arm 23.

The head body 22 is supported on the slider arm 23 with the support shaft 38 thereof force fitted in a central mounting hole 40, shown in FIG. 6A of a gimbal 39 provided at an end portion of the slider arm 23. The head body 22 is well balanced, when it is supported on the slider arm 23, with respect to the fulcrum provided by the mounting portion 38 thereof by the equal weights of the left and right portions.

Referring to FIGS. 6A, 6B and 7, the slider arm 23 has the gimbal 39 formed integrally at a reduced thickness portion at an end portion thereof and has a perforation 41 formed at a location thereof in the proximity of the gimbal 39. The coil spring 36 extends through the perforation 41 of the slider arm 23. The slider arm 23 further has a mounting portion 44 having a support shaft 42 for the head arm 24 mounted at an end portion thereof and having a balance weight 50, shown in FIG. 1, mounted at the other end portion thereof.

The gimbal 39 has such slits 45A and 45B as shown in FIG. 6A formed therein so that it can turn around an axis in the X direction and another axis in the Y direction in FIG. 6A. The support shaft 38 of the head body 22 is force fitted in the central mounting hole 40 of the gimbal 39 to mount the head body 22 on the slider arm 23. The support shaft 38 has thereon an inclined step face 46 having a predetermined angle as seen in FIGS. 2, 3 and 5, and the gimbal 39 contacts with the inclined step face 46 of the support shaft 38, thereby defining the mounting angle of the head body 22 with respect to the slider arm 23.

The slider arm 23 is supported on the head arm 24 with the support shaft 42 thereof pivotally supported on a mounting portion 48, shown in FIG. 1, of the head arm 24. A balance weight 50 is mounted at a threaded portion of the mounting portion 44 of the slider arm 23.

The position of the support shaft 42 of the slider arm 23 corresponds to the position of or in the proximity of the center of gravity of the slider arm 23 when the head body 22 and the balance weight 50 are mounted on the slider arm 23. Accordingly, when the slider arm 23 is supported for pivotal motion on the head arm 24, the head body 22 and the balance weight 50 are balanced with each other with respect to the support shaft 42. It is to be noted that, since, in the arrangement shown, the balance weight 50 is screwed on the mounting portion 44 of the slider arm 23, the position of the center of gravity of the slider arm 23 can be adjusted substantially to the position of the support shaft 42 by adjusting the position of the balance weight 50 screwed on the mounting portion 44 of the slider arm 23.

Figure 8:
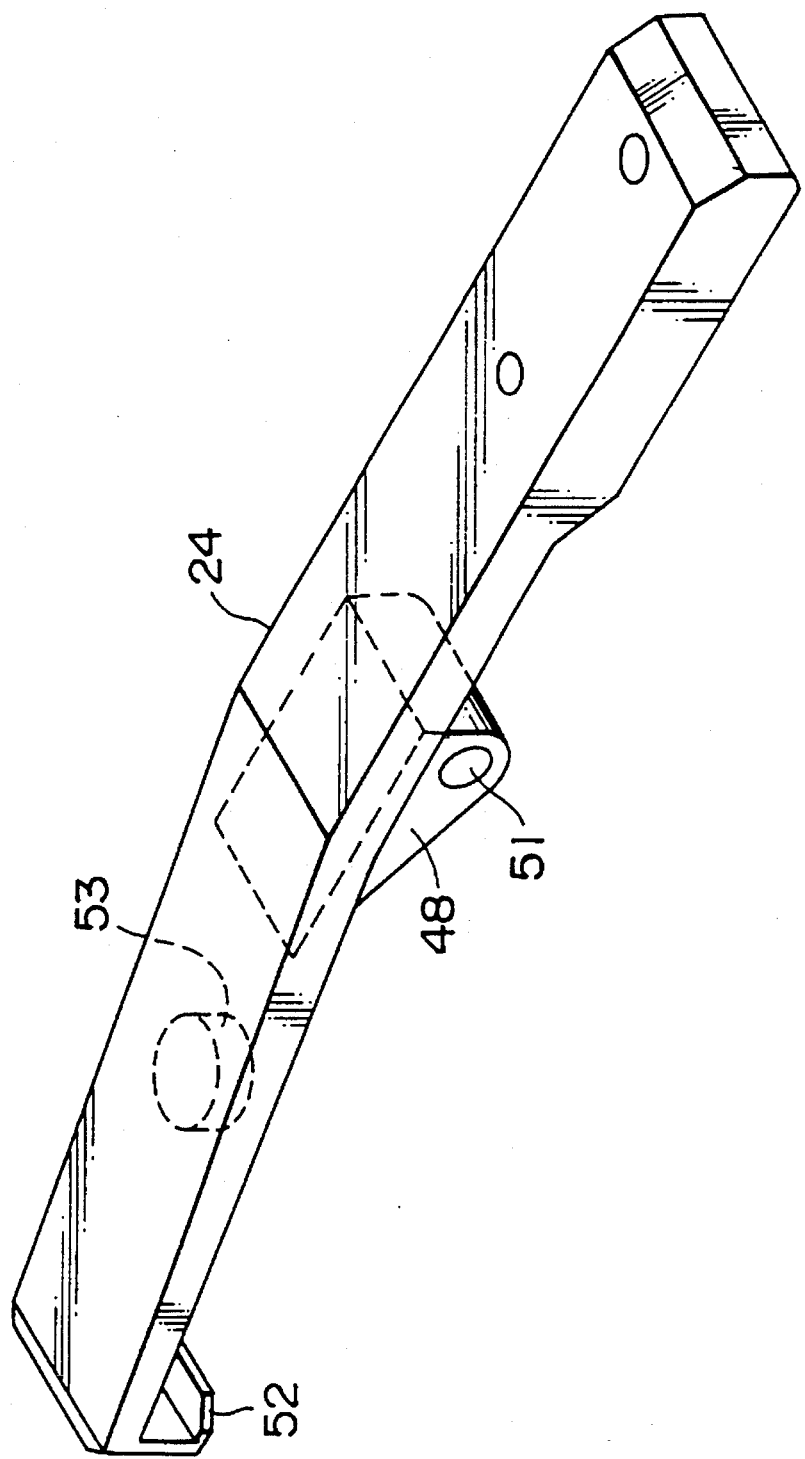
FIG. 8 is a perspective view of a head arm of the magnetic head.
Figure 9:
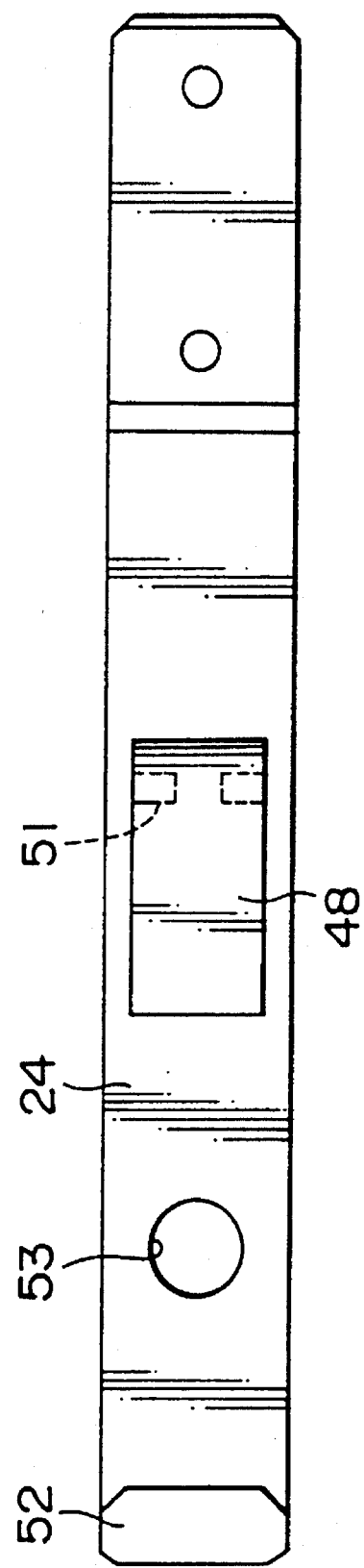
FIG. 9 is a plan view of the head arm.

Referring now to FIGS. 8 and 9, the head arm 24 has the mounting portion 48 formed at a central portion thereof. A supporting hole 51 is formed in the mounting portion 48 of the head arm 24, and the support shaft 42 of the slider arm 23 is inserted in the supporting hole 51. The head arm 24 has a stopper portion 52 in the form of a bent tab formed at a free end thereof for engaging an end of the slider arm 23.

The stopper portion 52 is provided to restrict the range of movement of the head body 22 by the coil spring 36, and the position and the configuration thereof are determined so that the end of the slider arm 23 can move within the range of a tolerance for lateral deflection of the disk 1. In particular, referring to FIG. 2, the distance $h_1$ makes the tolerance for lateral deflection of the disk 1. For example, in the case of such a very small size magneto-optical disk as described above, since the tolerance of the lateral deflection of the disk 1 is ±0.7 mm, the distance $h_1$ is 1.4 mm.

Referring back to FIGS. 8 and 9, the head arm 24 further has formed thereon a recessed or protruded portion for receiving the coil spring 36, in the arrangement shown, a recessed portion 53.

Referring also to FIGS. 2 and 3, the coil spring 36 is interposed between and received in the recessed portion 53 of the head arm 24 and the mounting portion 37 of the head body 22 and extends through the perforation 41 of the slider arm 23.

The slider 28 is preferably made of a material which is required to provide a high degree of accuracy in dimension, have a high heat resistance, have a high sliding performance, be not chargeable and be light in weight. The material of the slider 28 may be, for example, polyphenylene sulfide (PPS), polyacetal (POM), polyarylate (PAR), polyimide 6 (6 nylon), polyamide 66 (66 nylon), polyethylene terephthalate (PET), polybutylene terephthalate (PBT), ultra-high molecular polyethylene (UHMW-PE), or high molecular polyethylene (HMW-PE) or any of the compounds in which carbon is contained, for example, by 30 weight percent.

The slider arm 23 and the head arm 24 can be formed by injection molding, and the material of them may be any of the resin materials which can be applied to the slider 28 or copolymer of acryronitrile-butadiene-styrene (ABS) or the like.

In the sliding type magnetic head 21 for magneto-optical recording having such construction as described above, while the head arm 24 is movable within a plane parallel to the surface 1a of the disk 1 in order to move the head body 22 in a radial direction of the disk 1, it is fixed in a perpendicular direction with respect to the surface 1a of the disk 1. Accordingly, the disk 1 will move within the tolerance of the lateral deflection with respect to the head arm 24. In the case of, for example, the very small size magneto-optical disk of 64 mm mentioned hereinabove, the disk 1 moves within ±0.7 mm. Thus, FIG. 2 shows the magnetic head 21 and the disk 1 when the disk 1 moves by 0.7 mm, and FIG. 3 shows the magnetic head 21 and the disk 1 when the disk 1 moves by −0.7 mm.

In the magnetic head 21, the flat faces 33 of the sliding portion 29 of the head body 22 slidably contact with the surface 1a of the disk 1, which is rotating at a predetermined speed, under the resilient force of the coil spring 36.

Then, when an external impact is applied to the head arm 24, since the head body 22 is supported in a leftwardly and rightwardly well-balanced condition on the slider arm 23 and also the slider arm 23 is supported in a leftwardly and rightwardly well-balanced condition on the head arm 24 due to the presence of the balance weight 50, the head body 22 and the slider arm 23 are not brought out of the well-balanced conditions. Accordingly, an influence of the external impact can be controlled.

In particular, a system is considered here wherein the masses $M_1$ and $M_2$ are supported in a well-balanced condition at a fulcrum 61 on an arm 60 as shown in FIG. 10A. If it is assumed that an acceleration a is applied downwardly to the system in the well-balanced condition by an external force so that the fulcrum 61 is moved downwardly, then a force $F_1$ equal to the product of the mass $M_1$ and the acceleration a is produced on the mass $M_1$ side while another force $F_2$ equal to the product of the mass $M_2$ and the acceleration a is produced on the mass $M_2$ side. In this instance, the upward torque to the mass $M_1$ is given by $F_1 \times L_1$ and the upward torque to the mass $M_2$ is given by $F_2 \times L_2$, and the equation $F_1 \times L_1 = F_2 \times L_2$ stands.

Accordingly, in such well-balanced system as shown in FIG. 10A, the well-balanced condition is not lost even if the fulcrum 61 of the system is moved at the acceleration a.

An equivalent model of the balanced system of the construction of the magnetic head 21 is shown in FIG. 10B. Referring to FIG. 10B, the mass $M_1$ corresponds to the head body 22; the mass $M_2$ corresponds to the sliding portion 29; and the mass $M_3$ corresponds to the balance weight 50. Further, the support shafts 38 and 42 correspond to the fulcra for the masses $M_1$ and $M_2$ and for the masses $M_1$ and $M_2$ and the mass $M_3$, respectively.

When the equation $M_1 \times L_1 = M_2 \times L_2$ stands, the head body 22 and the sliding portion 29 are balanced with each other, and when the equation $(M_1 + M_2) \times L_3 = M_3 \times M_4$ stands, the entire system is balanced.

Accordingly, when an acceleration a is applied downwardly to the balanced system of FIG. 10B by an external force, since the balanced system of FIG. 10B is different only in number of fulcra from the balanced system of FIG. 10A, the balanced conditions at the fulcra 38 and 42 are not lost, and consequently, the entire system can be maintained in the well-balanced condition.

Accordingly, even if an external impact is applied to the magnetic head 21, since the entire magnetic head 21 is maintained in the well-balanced condition, an upward force which is equal to the product of the acceleration a which occurs with the head body 22 and the mass of the head body 22 is controlled. Consequently, a jump of the head body 22 does not likely occur. As a result, the supporting mechanism for the head body 22 is tough against an external impact.

From this reason, a countermeasure employing an urging spring member which is conventionally employed in order to prevent possible damage to the head body 22 by an external impact is basically unnecessary, and it is possible to keep the sliding portion 29 of the head body 22 in contact with the surface 1a of the disk 1 only by applying a weak spring force to the head body 22 by means of the coil spring 36. In other words, the spring force may be so weak as to merely contact the sliding portion 29 of the head body 22 with the surface 1a of the disk 1. Consequently, the load force applied to the sliding portion 29 of the head body 22 is decreased, and the sliding resistance to the surface 1a of the disk 1 is reduced.

The reduction of the sliding resistance prevents possible damage to the surface 1a of the disk 1 and reduces the output power of a motor for driving the disk 1.

Meanwhile, also when there is a variation in profile of the surface 1a of the disk 1 such as, for example, a bump 16 as shown in FIG. 11, the influence of the bump 16 is reduced. Normally, when such bump 16 exists, naturally the bump 16 has kinetic energy, and accordingly, the sliding portion 29 of the head body 22 is lifted by an amount equal to the height of the bump 16 with respect to the bump 16. The lifting of the sliding portion 29 of the head body 22 by the bump 16 takes place within the time of Δt to cause an impulse, and the magnetic head element 27 is lifted upwardly while the disk 1 is pushed downwardly. Consequently, the distance between the magnetic head element 27 and the disk 1 is increased so that the recording capacity is reduced and at worst it becomes impossible to effect writing onto the disk 1. Even if confirmation after writing proves that writing has failed, the same condition will occur at the position of the bump 16, and consequently, re-writing there is impossible. Further, if the disk 1 moves down at a certain rate, the servo mechanism of the optical pickup system cannot follow up such downward movement of the disk 1, and consequently, an out-of-servo-control condition will take place.

With the magnetic head 21, when the disk 1 is rotated, for example, in the direction indicated by an arrow mark A in which the disk 1 approaches the magnetic head 21 from the head element 27 side as seen in FIG. 11, even if the bump 16 having an allowable height comes to the magnetic head 21, it will first pass a gap between the head element 27 and the disk 1. Then, the bump 16 will abut with an end portion of the sliding portion 29 of the slider 22. However, since the point $W_1$ at which the bump 16 and the end portion of the sliding portion 29 abut with each other is positioned on the right-hand side in FIG. 11 with respect to the position P of the center of gravity of the head body 22, the head body 22 will be pivoted in the counterclockwise direction around the position P of the center of gravity, whereupon the magnetic head element 27 approaches the surface 1a of the disk 1. Accordingly, in this instance, the recording capacity may be increased but will not be decreased.

Figure 12:
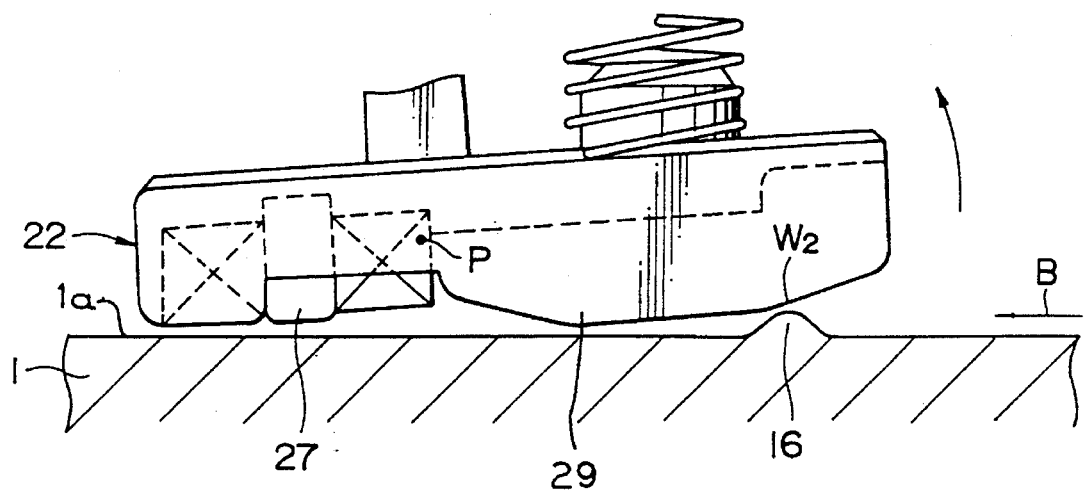
Figure 12:
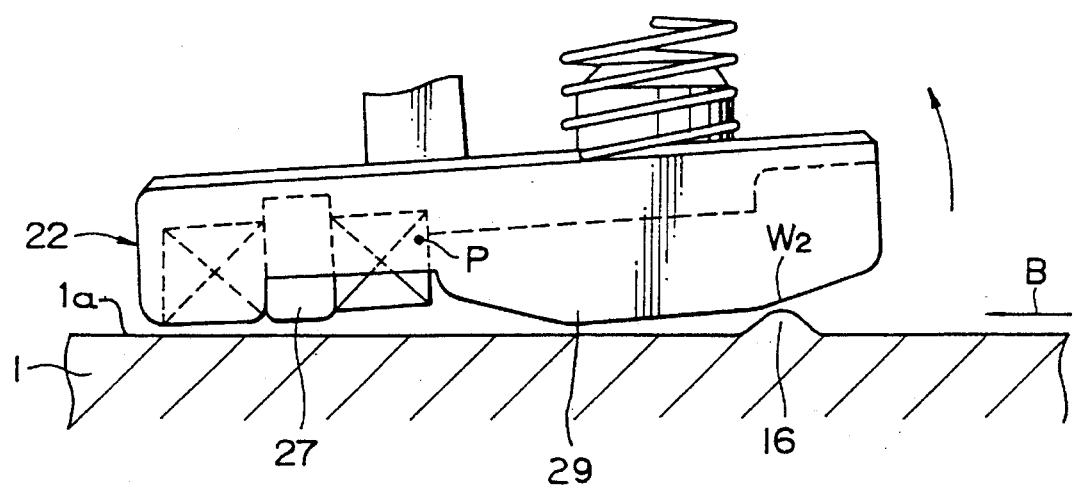

On the other hand, also when the disk 1 is rotated in the reverse direction indicated by an arrow mark B in FIG. 12, if the bump 16 abuts with an end portion of the sliding portion 29 of the head body 22, then the head body 22 is pivoted in the counterclockwise direction around the position P of the center of gravity in a similar manner as described above. Thereupon, the magnetic head element 27 approaches the surface 1a of the disk 1, and consequently, reduction of the recording capacity is prevented. Accordingly, in either case, the magnetic head 27 will not be caused to jump by the bump 16.

Further, when the abutting points $W_1$ and $W_2$ at each of which the bump 16 abuts with an end portion of the sliding portion 29 of the head body 22 are spaced away from the position P of the center of gravity of the head body 22, the head body 22 can be pushed up light by the principle of the lever. This signifies that the equivalent weight of the head body 22 as seen from the bump 16 is low. Accordingly, also the energy provided to the disk 1 when the bump 16 abuts with the head body 22 is low, and consequently, the disk 1 is not likely vibrated and the out-of-servo-control condition of the optical pickup system does not likely take place.

Figure 90:
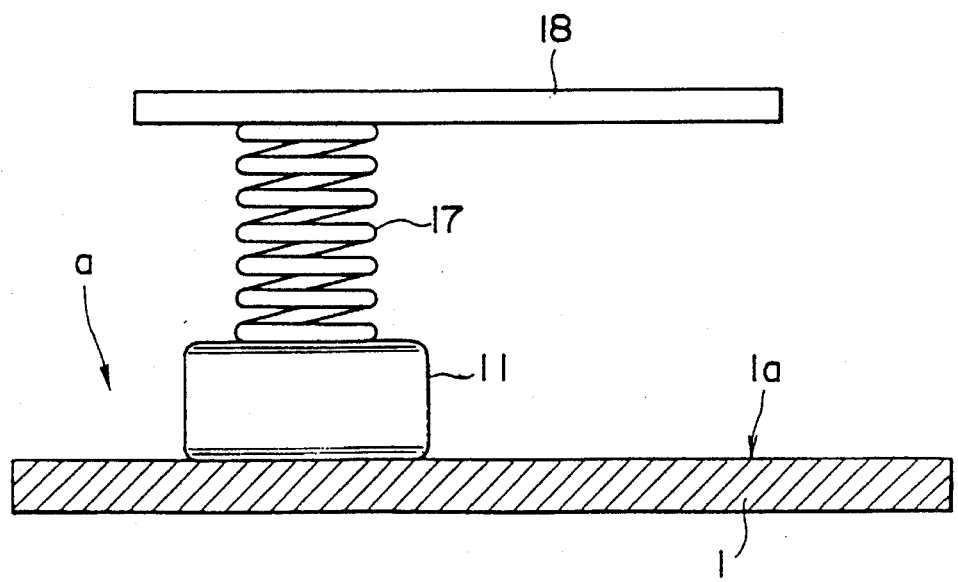
FIG. 90 is a side elevational view, partly in section, schematically showing detailed construction of the magnetic head of FIG. 88.

Incidentally, an amplitude when the disk 1 was vibrated was measured. When the magnetic head 21 of the embodiment shown in FIG. 1 was employed, the amplitude was reduced to one fifth or so comparing with that when a magnetic head of FIG. 90 was employed, and it was found out that vibrations of the disk 1 were reduced.

When the head body 22 is disposed such that, as described hereinabove with reference to FIG. 11, the disk 1 advances toward the head body 22 from the head element 27 side in the direction A of rotation of the disk 1 and leaves the head body from the sliding portion 29 side, yawing of the head body 22 does not likely take place. In particular, the sliding portion 29 of the head body 22 normally receives a force in the direction A of rotation of the disk 1. This force urges to pivot the sliding portion 29 of the head body 22 in the counterclockwise direction around the position P of the center of gravity. Accordingly, when the bump 16 abuts with an end portion of the sliding portion 29 of the head body 22, pivotal motion of the head body 22 in the counterclockwise direction around the position P of the center of gravity occurs smoothly, and the friction between the sliding portion 29 and the disk 1 is reduced. Consequently, yawing of the head body 22 is prevented. The yawing preventing effect is higher than that with the arrangement of FIG. 12 wherein the head body 22 is disposed in the opposite direction.

On the other hand, when the head body 22 is disposed in such orientation as shown in FIG. 12 with respect to the direction of rotation of the disk 1, since the distance between the position $W_2$ at which the bump 16 abuts with the sliding portion 29 of the head body 22 and the position P of the center of gravity serving as a fulcrum is long, the equivalent weight of the head body 22 as seen from the bump 16 is low. Consequently, the effect of controlling vibrations of the disk 1 is high.

With the sliding portion 29 of the head body 22 shown in FIGS. 4 and 5, since it is formed including the opposite side leg portions 32, the area over which the sliding portion 29 contacts with the disk 1 is small. Further, since the leg portions 32 are located at positions spaced from the center of the load in the widthwise direction of the slider 28, the urging force of the head body 22 is divided into two components so that the contacting pressure of the sliding portion 29 with the disk 1 is decreased. Accordingly, possible damage to the disk 1 is further reduced.

Further, since the rounded and tapered curved faces 34 are formed at the opposite end portions of the sliding portion 29 in the sliding direction, the time until the sliding portion 29 is lifted to the height of the bump 16 is increased. Consequently, the impact upon the head body 22 by the bump 16 can be reduced.

FIGS. 13A to 17C show various modifications to the slider 28, particularly, to the sliding portion 29 of the slider 28.

Figure 13A:
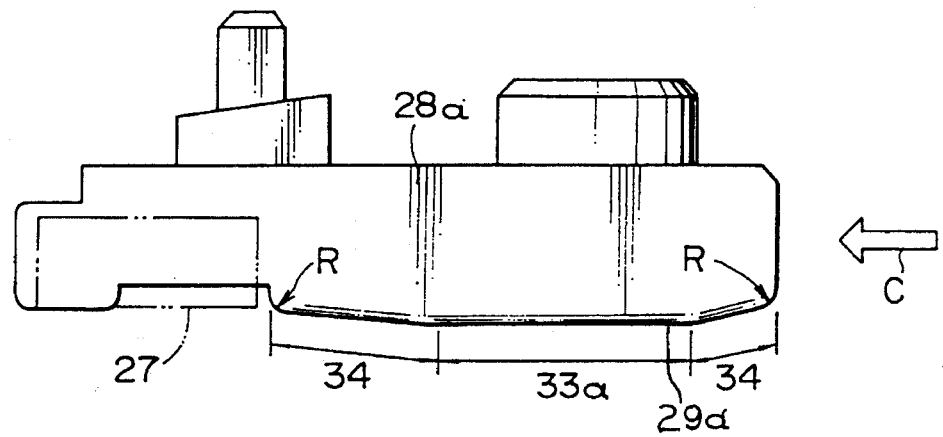
FIGS. 13A, 13B and 13C are front elevational views showing different modifications to a slider of the magnetic head.

FIG. 13A shows a modified slider 28a having similar construction to that of the slider 28 shown in FIG. 4. The modified slider 28a, however, has an aspect ratio equal to or lower than 1/10.

Figure 13B:
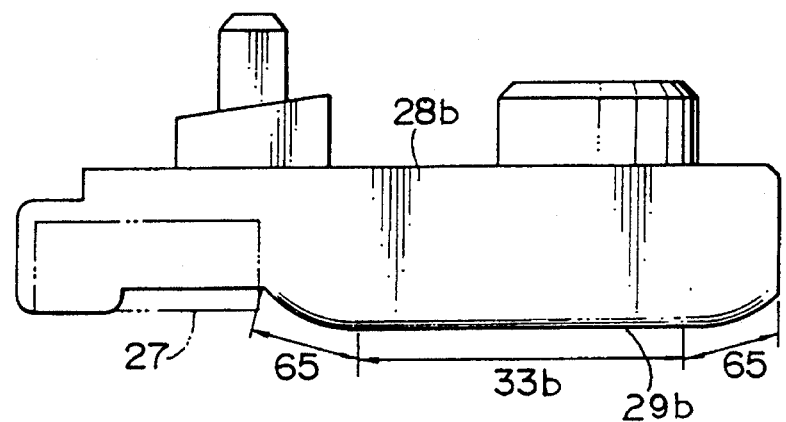

FIG. 13B shows another modified slider 28b which is modified in the sliding portion 29b thereof such that a pair of rounded faces 65 are formed contiguously to each of the flat faces 33b. Also the modified slider 28b of FIG. 13B has an aspect ratio equal to or lower than 1/10.

Figure 13C:
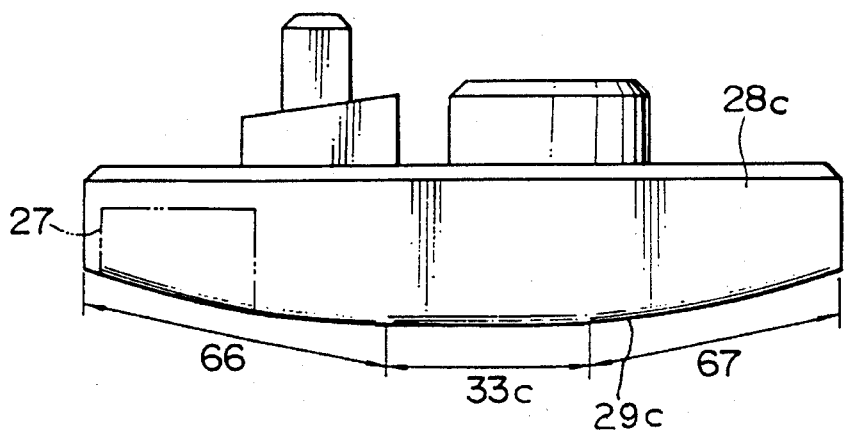

FIG. 13C shows a further modified slider 28c which is modified in the sliding portion 29c thereof such that a pair of rounded curved faces 66 and 67 are formed contiguously to each of the flat faces 33c and extend to the opposite ends of the slider 28c.

FIGS. 14A to 14D show modified sliders wherein the sliding portion 29 has different cross sectional shapes as viewed in the direction indicated by an arrow mark C in FIG. 13A.

Figure 14A:
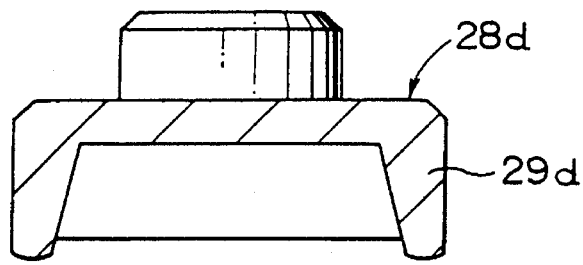
FIGS. 14A, 14B, 14C and 14D are side elevational cross sectional views showing different modifications to the slider.

The sliding portion 29d of the modified slider shown in FIG. 14A has a substantially inverted U-shaped section similar to that of the slider 28 shown in FIG. 4.

Figure 14B:
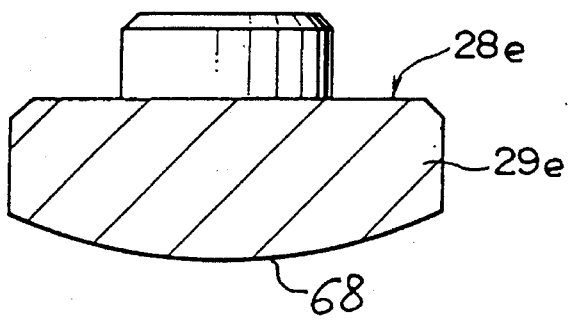

The sliding portion 29e of the modified slider 28e shown in FIG. 14B has a cross sectional shape wherein the lower face thereof makes an arcuate face 68. With the sliding portion 29e of the construction, it contacts along a line with the disk 1.

Figure 14C:
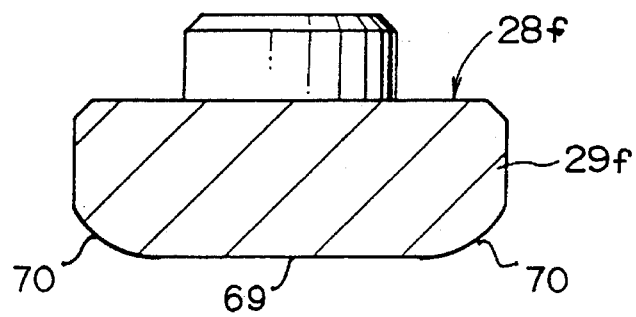

The sliding portion 29f of the modified slider 28 shown in FIG. 14C has a cross sectional shape wherein a central portion of the lower face thereof is a flat face 9 and the opposite end portions of the lower face are rounded as at 70.

Figure 14D:
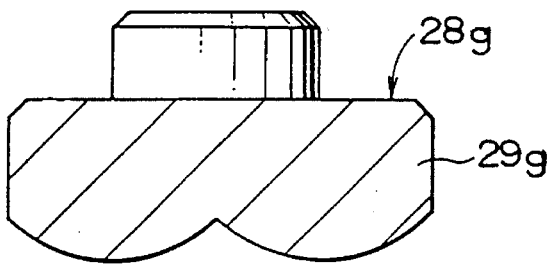

The sliding portion 29g of the modified slider 28g shown in FIG. 14D has a cross sectional shape wherein the lower face thereof provides two arcuate faces 71. Also with the present modified slider 28, it contacts along two lines with the disk 1.

Figure 15A:
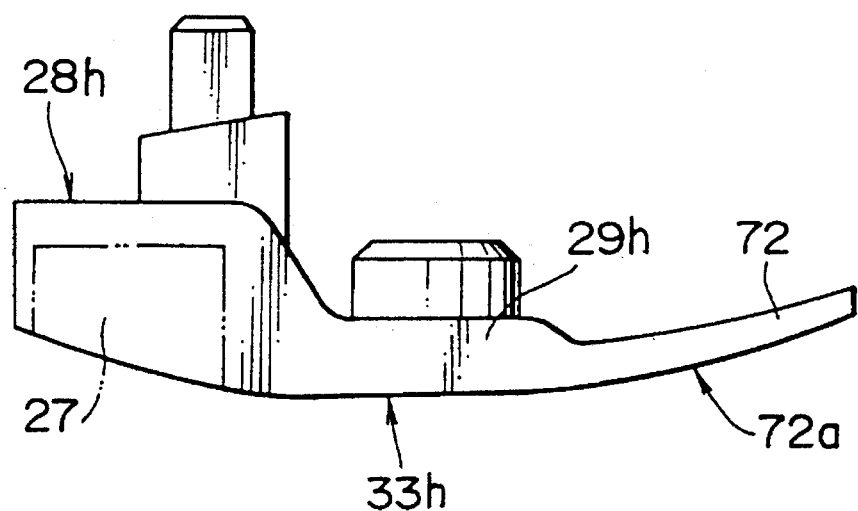
FIGS. 15A and 15B are a front elevational view and a side elevational view, respectively, showing a still further modification to the slider.
Figure 15B:
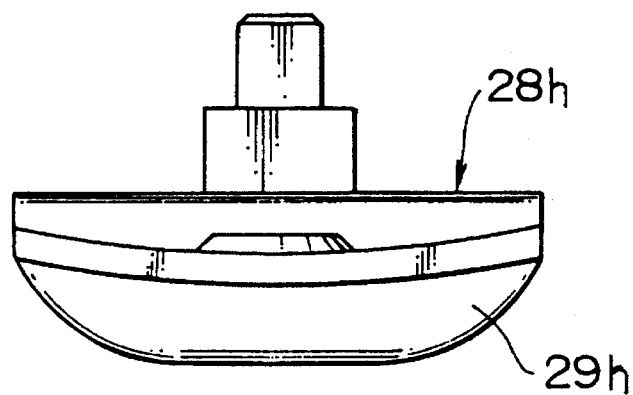

FIGS. 15A and 15B show a different modified slider 28h wherein it is increased in thickness at a portion thereof at which the head element 27 is mounted while the sliding portion 29h thereof is reduced in thickness and is further reduced in a portion 72 thereof which extends from the flat faces 33h to a free end of the sliding portion 29h with the lower face of the portion 72 formed as an end face 72a. Also the lower face of a portion of the sliding portion 29f which extends from the flat faces 33h to a portion at which the head element 27 is mounted is formed as a rounded curved face. With the modified slider 28h of the construction just described, the position of the center of gravity of the head body 22 is displaced toward the head element 27 side and is generally reduced in weight.

Figure 16A:
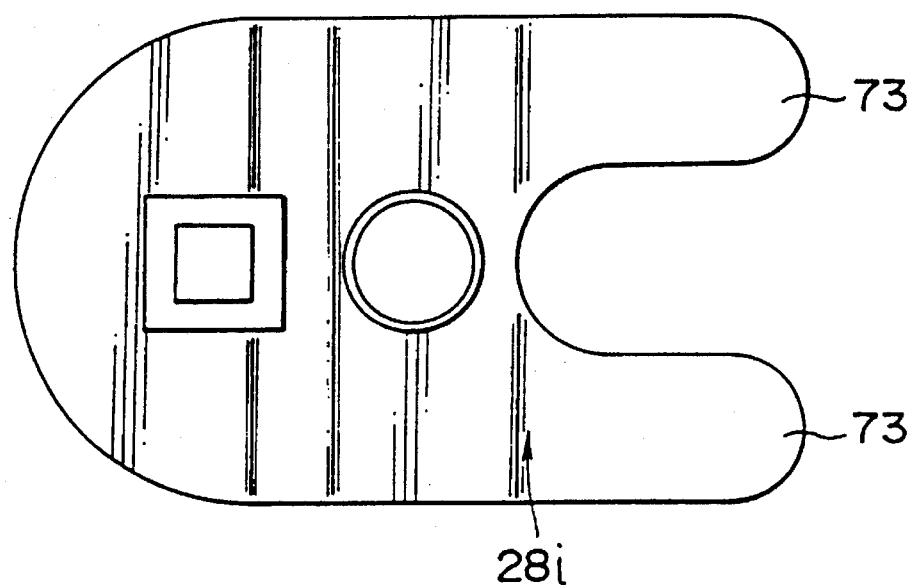
FIGS. 16A and 16B are a plan view and a front elevational view, respectively, showing a yet further modification to the slider.
Figure 16B:
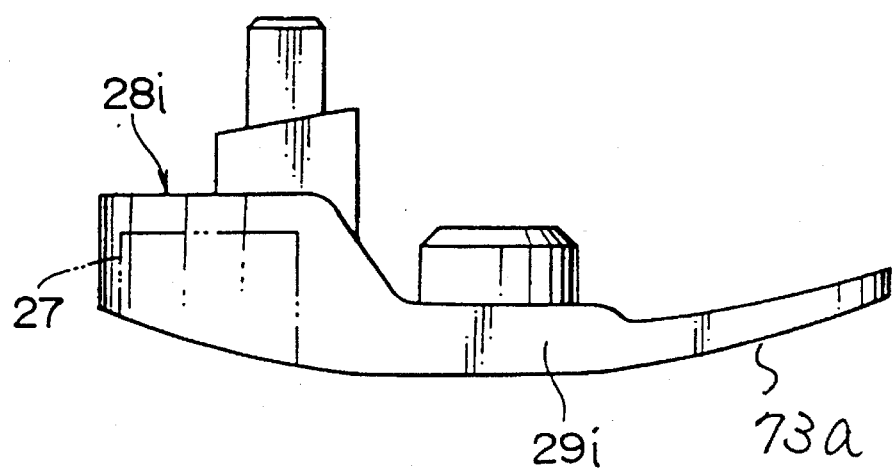

FIGS. 16A and 16B show another different modified slider 28i wherein the slider 28h shown in FIGS. 15A and 15B is modified such that a portion of the sliding portion 29i thereof which extends to the free end of the sliding portion 29i is formed into a pair of extensions 73 each having a lower face formed as a spherical face 73a. In this instance, the two extensions 73 are made resilient. Consequently, when a bump 16 abuts with either of the extensions 73 of the sliding portion 29i, non-resilient collision takes place, and the impact energy is absorbed. Consequently, a substantial impact force can be reduced.

Figure 17A:
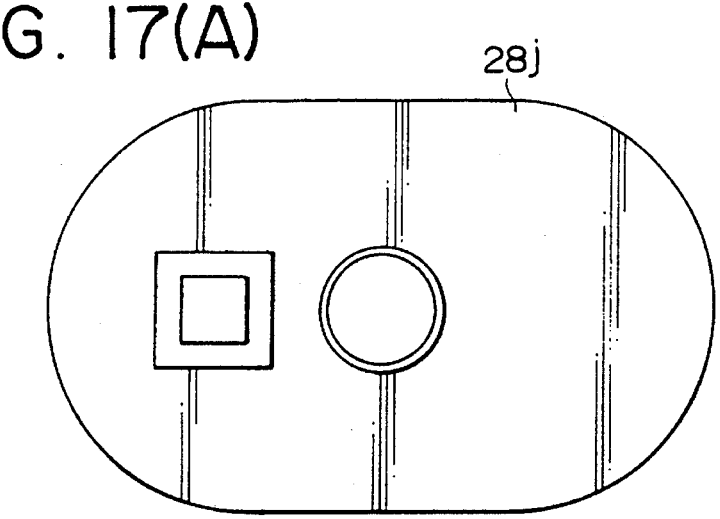
FIGS. 17A, 17B and 17C are plan views showing yet further modifications to the slider.
Figure 17B:
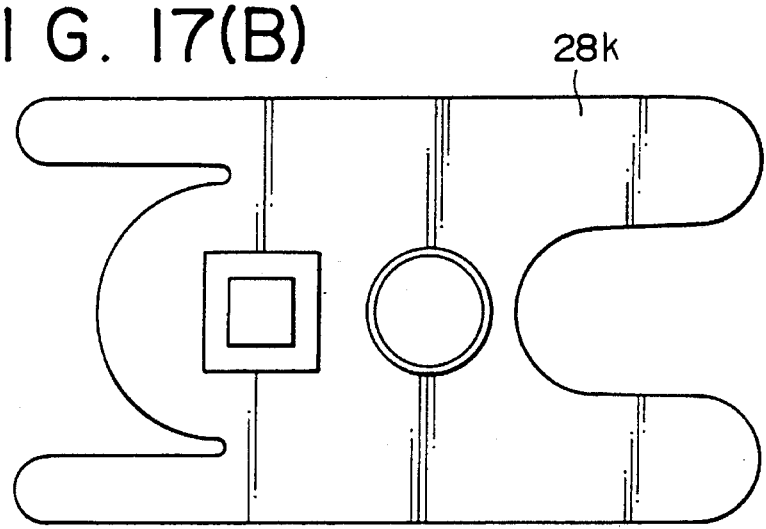
Figure 17C:
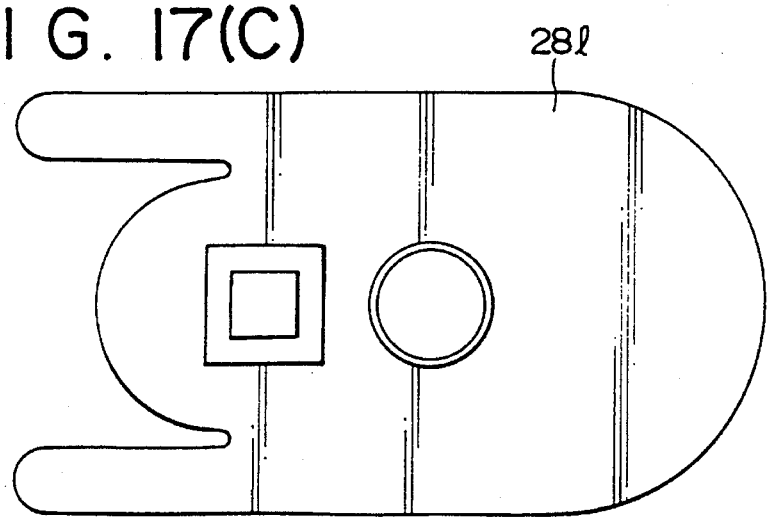

FIGS. 17A to 17C show further different modified sliders 28j, 28k and 28l wherein the slider 28j, 28k and 28l has various profiles in plan.

Thus, the head body 22 can be constructed with a combination of the profiles shown in FIGS. 13A to 17C.

Figure 18:
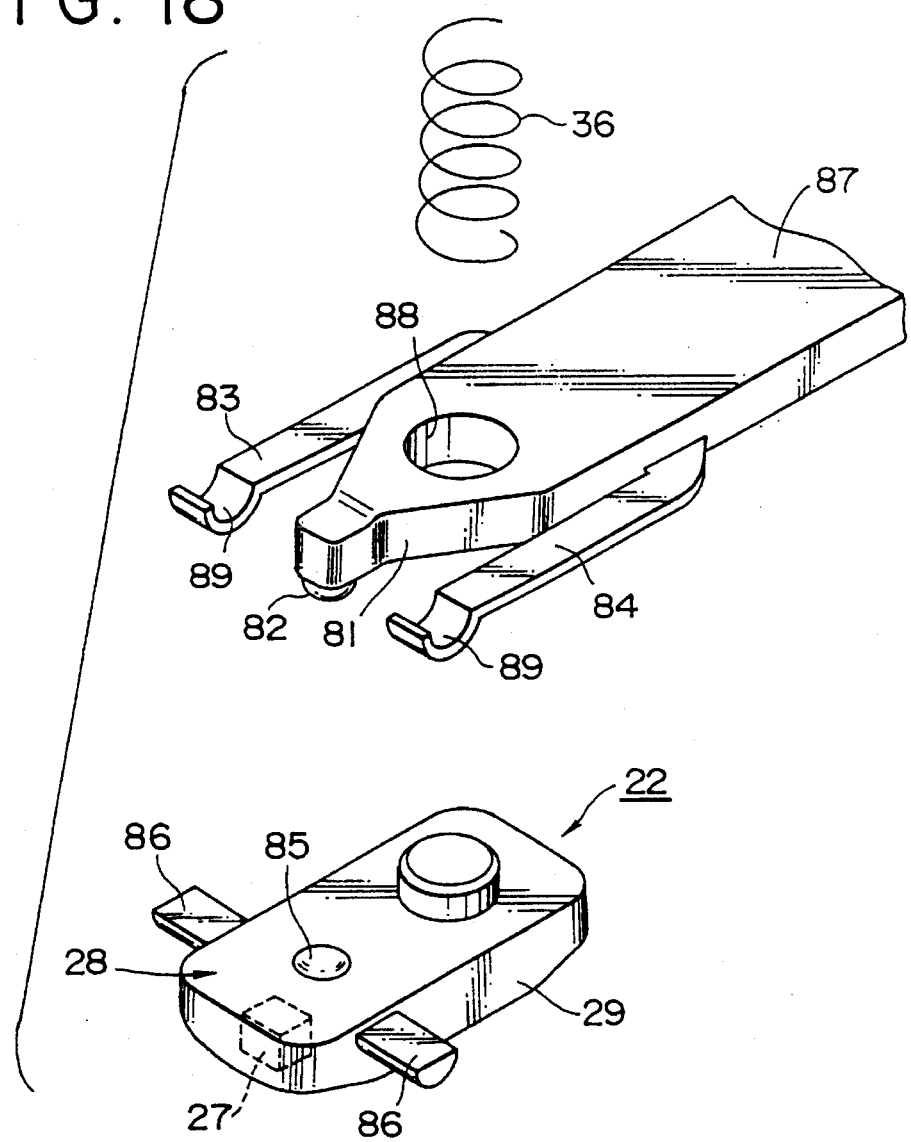
FIG. 18 is a fragmentary perspective view of part of another sliding type magnetic head for magneto-optical recording showing another preferred embodiment of the present invention.
Figure 19:
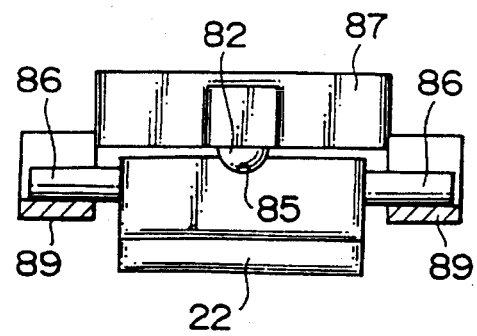
FIG. 19 is a side elevational view of the magnetic head of FIG. 18.

Referring now to FIGS. 18 and 19, there is shown a sliding type magnetic head for magneto-optic recording according to another preferred embodiment of the present invention.

The magnetic head of the present embodiment eliminates the gimbal 39 of the slider arm 23 of the head body 22 of the preceding embodiment described above and includes a slider arm 87 in place of the slider arm 23. The slider arm 87 is branched at an end portion thereof into three portions including a central piece 81 having a comparatively great thickness and a pair of side pieces 83 and 84 extending in parallel from the opposite sides of the central piece 81. The central piece 81 has a semi-spherical engaging element 82 formed on the lower face thereof. Meanwhile, the side pieces 83 and 84 are made sufficiently thinner so as to provide suitable resiliency thereto and each has a curved receiving portion 89 at an end thereof. An insertion hole 88 for a coil spring 36 is formed in the central piece 81 of the slider arm 87.

Meanwhile, a slider 28 constituting a head body 22 has a semi-spherical recess 85 for engaging the engaging element 82 of the central piece 81 of the slider arm 87 formed at a location on an upper face thereof in the proximity of a head element 27 mounted on the slider 28. A pair of wing portions 87 are formed integrally on the opposite sides of the slider 28. Each of the wing portions 86 has a semi-cylindrical section so as to engage the receiving portions 89 of the side pieces 83 and 84 of the slider arm 86.

The semi-spherical engaging element 82 of the central piece 81 of the slider 28 is received for turning motion in the recess 85 on the upper face of the slider 28 while the receiving portions 89 of the side pieces 83 and 84 of the slider 28 are held in resilient engagement from below with the wing portions 86 of the slider 28 so that the head body 22 is resiliently supported by and held between the end portions 81 and 83, 84 of the slider 28 of the head body 22.

The head body 22 is not permitted to pivot in its rolling direction but is permitted to pivot only in the pitch direction Y. Also the movement of the head body 22 in its yawing direction can be prevented. With the structure of the head body 22 and the slider arm 87, the center of pivotal motion defined by the wing portions 86 of the head body 22 and the receiving portions 89 of the slider arm 87 can be positioned nearer to the head element 27.

With the magnetic head of the construction described above, since the center of pivotal motion of the head body 22 can be set to the position of the center of gravity of the head body 22, when a bump 16 abuts with the head body 22, the head body 22 can be pivoted easily. Further, the mounting angle of the head body 22 can be defined readily by the angle of the wing portions 86. Furthermore, the spring constant corresponding to a gimbal can be varied by controlling the thickness of the side pieces 83 and 84 of the slider arm 87. In addition, the load force characteristic can be varied by varying the profile of the bottom faces of the wing portions 86 of the head body 22.

With the construction described above, since the bottom face of the sliding portion 29 of the head body 22 has a generally flattened arcuate profile and consequently contacts along a line with the disk 1, the head body 22 is only required to pivot in the pitch direction Y.

Figure 20A:
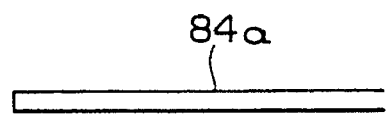
FIGS. 20A, 20B, 20C, 20D and 20E are schematic side elevational views showing modifications to a supporting mechanism for the magnetic head of FIG. 18.
Figure 20B:
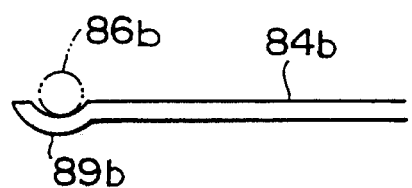
Figure 20C:
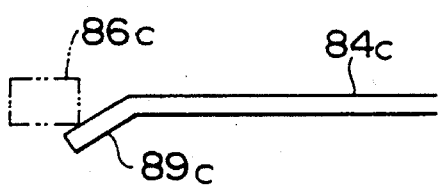
Figure 20D:
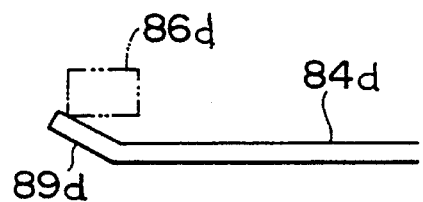
Figure 20E:
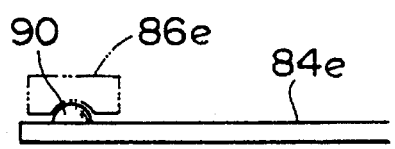

Various modified forms of the side pieces 83 and 84 of the slider arm 87 and the wing portions 86 of the head body 22 are shown in FIGS. 20A to 20E. In particular, each of the wing portions 86 may have, for example, such a cylindrical profile as shown in FIG. 20B, such a rectangular shape in cross section as shown in FIG. 20C or 20D or such a profile having a semispherical engaging portion as shown in FIG. 20E.

Meanwhile, each of the side pieces 83 and 84 of the slider arm 87 may have, for example, such a plate-formed configuration as shown in FIG. 20A, such a structure having a semi-spherical receiving portion 89 for engaging a cylindrical or semi-cylindrical wing portion 86b as shown in FIG. 20B, such a structure having a receiving portion 89c formed by bending an end portion of a plate obliquely downwardly as shown in FIG. 20C, such a structure having a receiving portion 89d formed by bending an end portion of a plate obliquely upwardly as shown in FIG. 20D or such a structure having a semispherical engaging element 90 for engaging a semispherical engaging portion of a wing portion 86e as shown in FIG. 20E.

Figure 23:
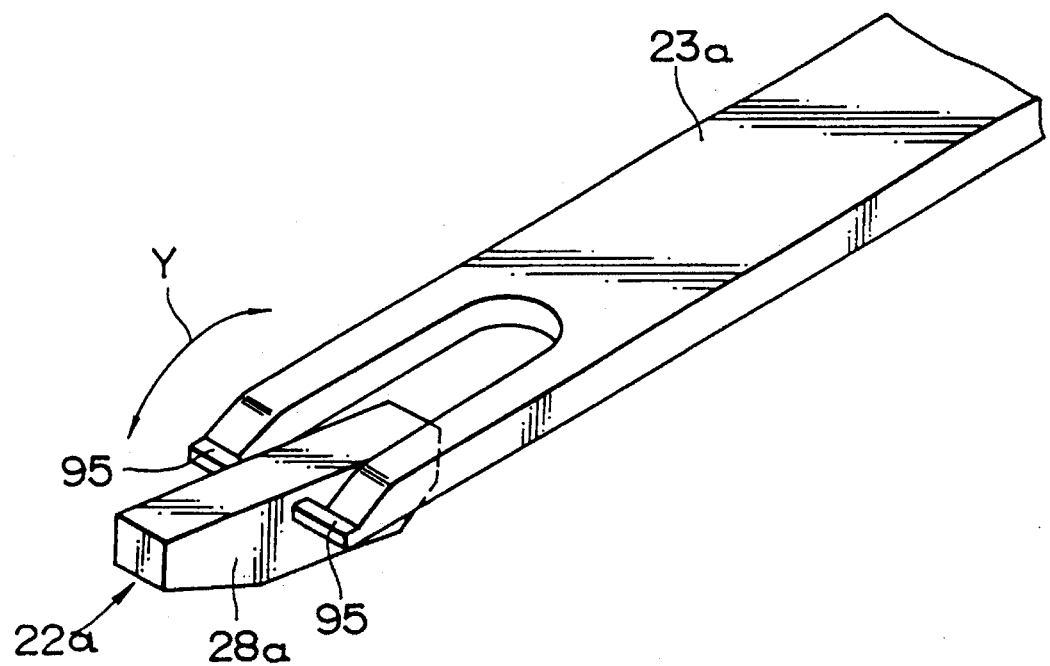
FIG. 23 is a perspective view of part of a further sliding type magnetic head for magneto-optical recording showing a further preferred embodiment of the present invention.

Further, the head body 22a, and accordingly the slider 28 and the slider arm 23 which are the components of the head body 22a, can be formed as a unitary member by injection molding as shown in FIG. 23. Referring to FIG. 23, in this instance, the slider 28a is connected to the slider arm 23a, which is formed with a comparatively great thickness, by way of a pair of thin connecting portions 95 on the opposite sides of the slider 28a such that it can be pivoted only in the pitch direction Y around the axis of the connecting portions 95.

Figure 21:
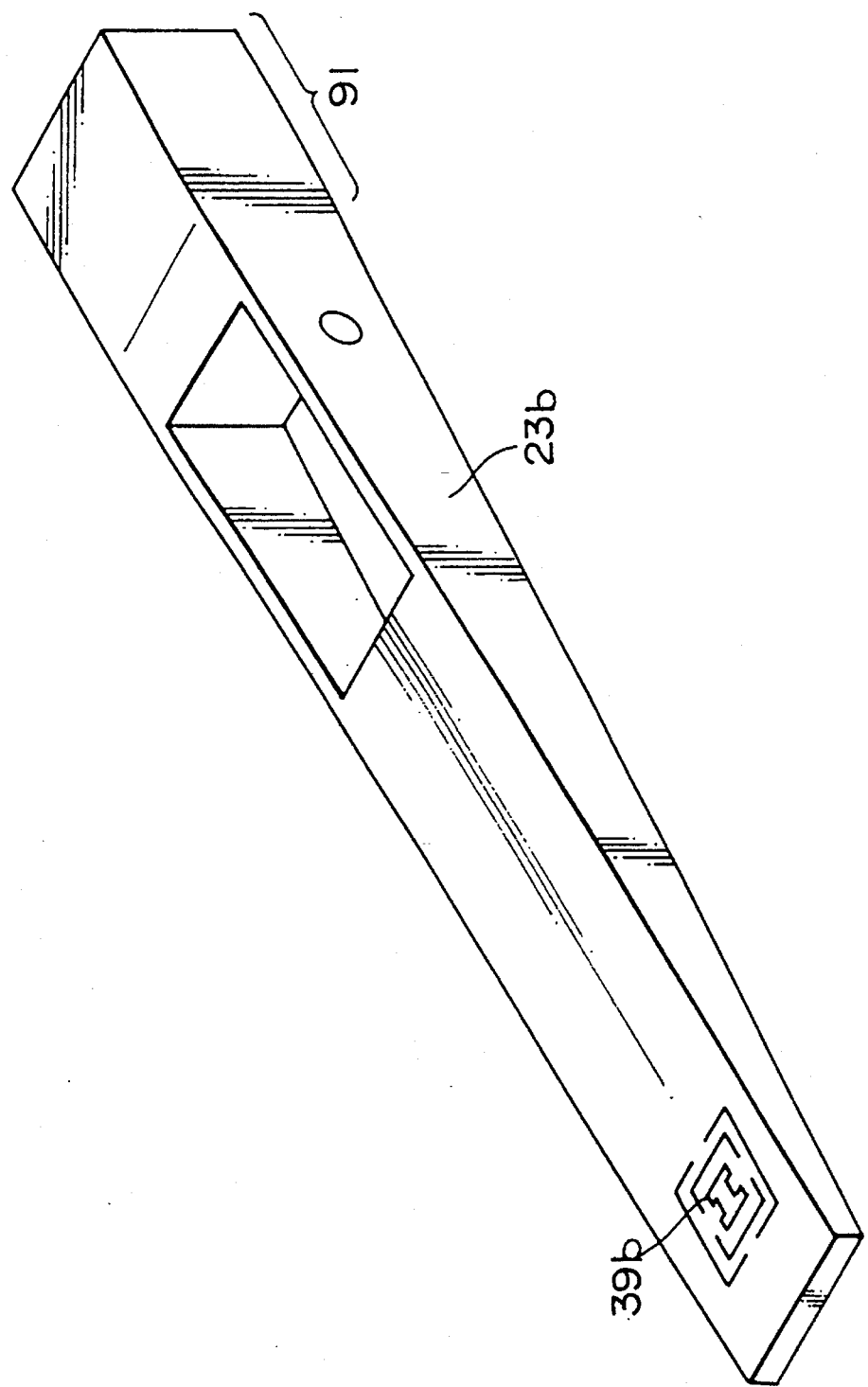
FIG. 21 is a perspective view of another form of a slider arm of the magnetic head of FIG. 18.

FIG. 21 shows another form of the slider arm 23b.

While the slider arm 23 described hereinabove with reference to FIG. 1 is constructed such that the balance weight 50 is provided as a separate member and screwed to the mounting portion 44 at an end of the slider arm 23 so as to allow adjustment thereof with respect to the slider arm 23 to assure a well-balanced condition, the slider arm 23b shown in FIG. 21 is constructed such that a balance weight 91 is formed integrally with the slider arm 23b. In particular, the slider arm 23b has a gimbal 39b at an end thereof and has the balance weight 91 at the other end thereof and is formed by integral molding of a resin material.

Figure 22A:
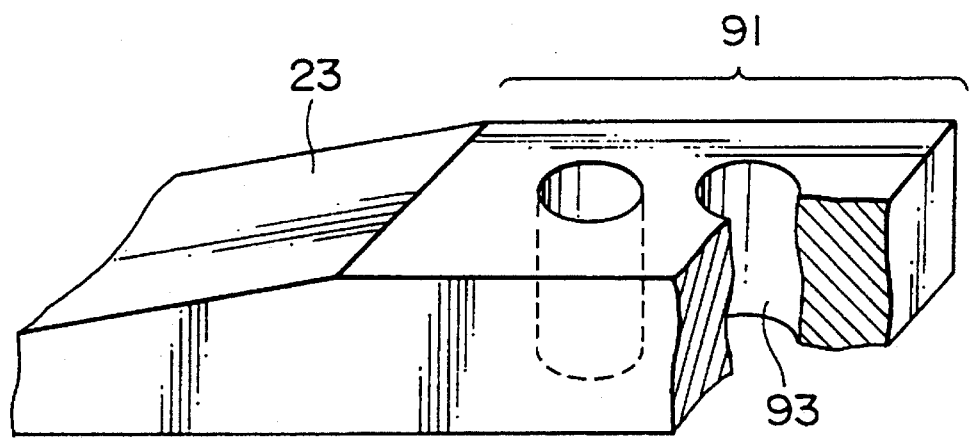
FIGS. 22A and 22B are perspective views, partly in section, showing further forms of the slider arm of the magnetic head of FIG. 18.
Figure 22B:
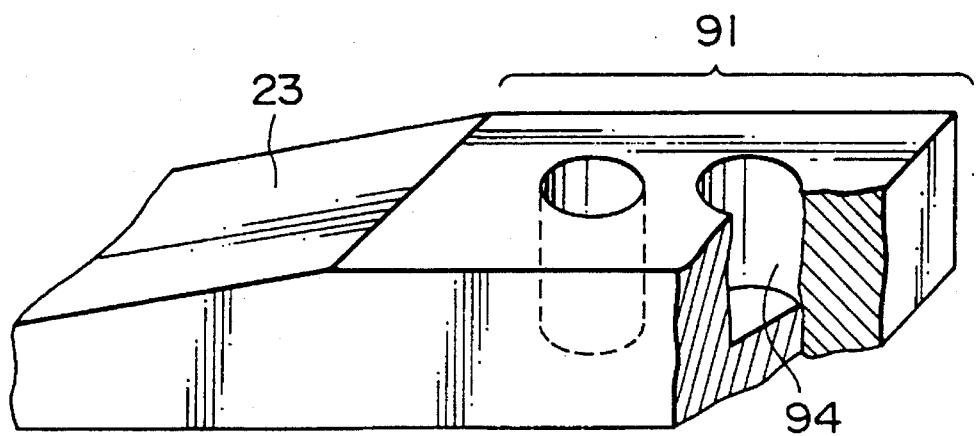

In this instance, since the balance weight 91 of the slider arm 23b is formed with a comparatively great thickness, in order to prevent a so-called "sink" there upon injection molding, preferably a cave portion such as, for example, a through-cave 93 or a recessed cave 94 is formed at a central portion of the balance weight 91 as shown in FIG. 22A or 22B. The cost of the magnetic head can be reduced by forming the gimbal 39b and the balance weight 91 integrally with the slider arm 23b in this manner.

Figure 24:
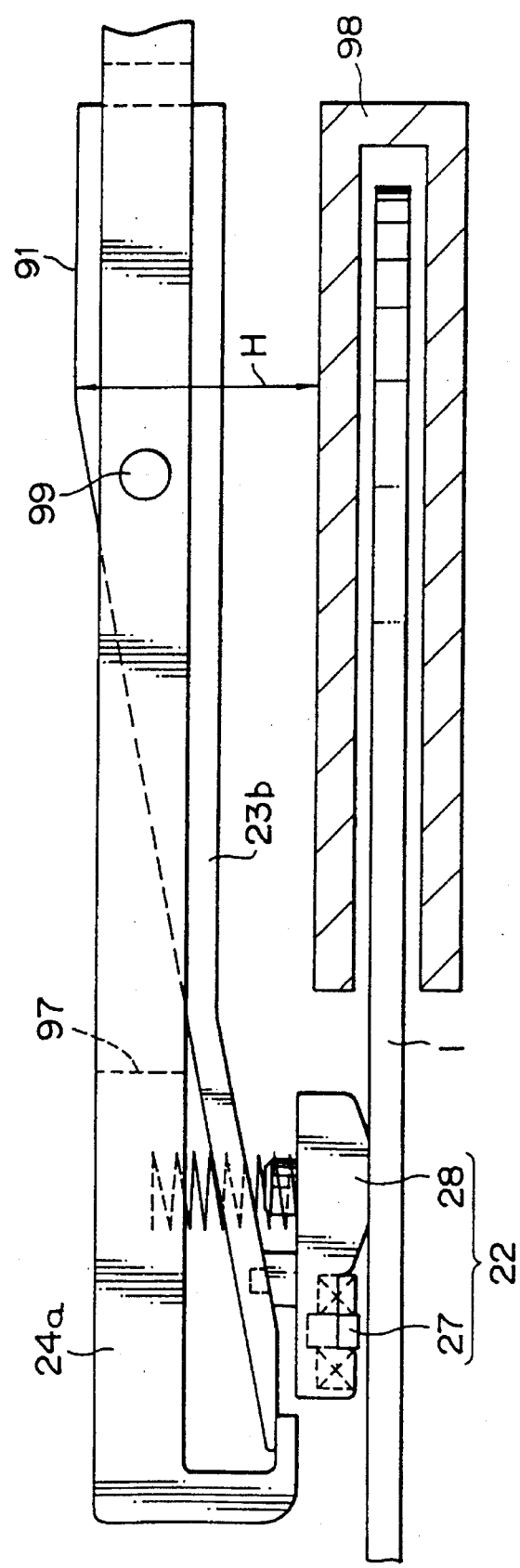
FIG. 24 is a side elevational view, partly in section, of a still further sliding type magnetic head for magneto-optical recording showing a still further preferred embodiment of the present invention.

Referring now to FIG. 24, there is shown a sliding type magnetic head for magneto-optical recording according to a further preferred embodiment of the present invention. The magnetic head of the present embodiment is generally constructed such that a head arm 24a has a comparatively small height leaving a range of movement of a slider arm 23b. In particular, the head arm 24a has an opening 97 formed therein, and, using the slider arm 23b on which, for example, a balance weight 91 described above is formed integrally and a head body 22 is mounted, the slider arm 23b is disposed such that a portion thereof on the balance weight 91 side is fitted in the opening 97 of the head arm 24a. Further, the slider arm 23b is supported for pivotal motion in the opening 97 by means of a shaft 99.

With the magnetic head of the construction described above, the height or vertical dimension H from the top face of a casing 98 of a magneto-optical disk 1 to the top face of the magnetic head can be made comparatively small. Accordingly, a magneto-optical recording and/or reducing apparatus can be formed with a comparatively small thickness.

Figure 25A:
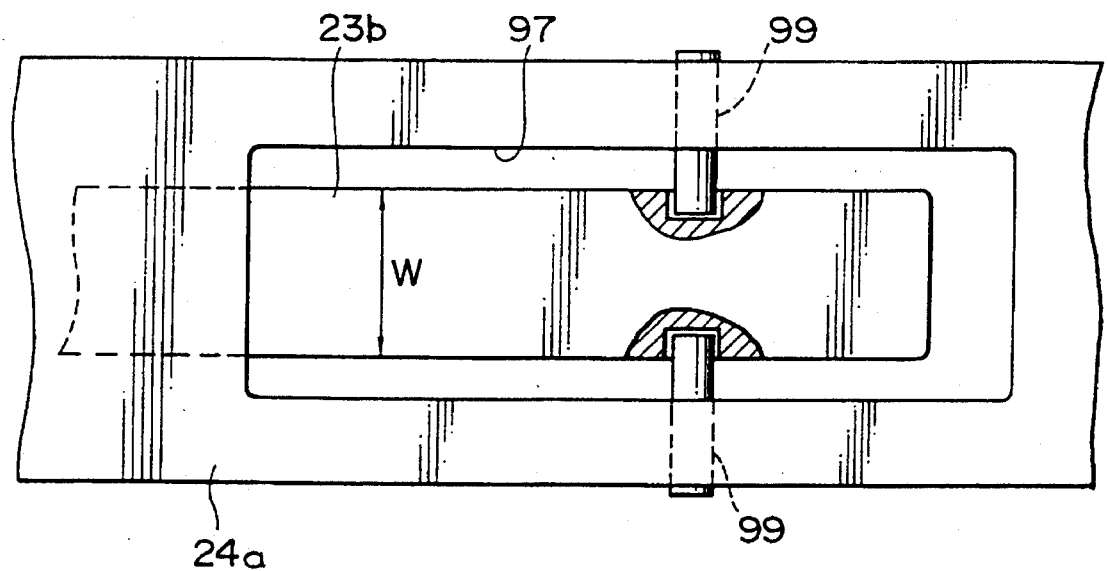
FIGS. 25A and 25B are plan views showing different forms of part of the magnetic head of FIG. 23.

Here, the slider arm 23b can be assembled for pivotal motion to the head arm 24a by means of a snap-fitted or force-fitted shaft or the like. Further, the positioning accuracy of the head body 22 can be enhanced by taking a great dimension for the width W (refer to FIG. 25A) of a portion of the slider arm 23b at which the slider arm 23b is mounted on the head arm 24a.

Figure 25B:
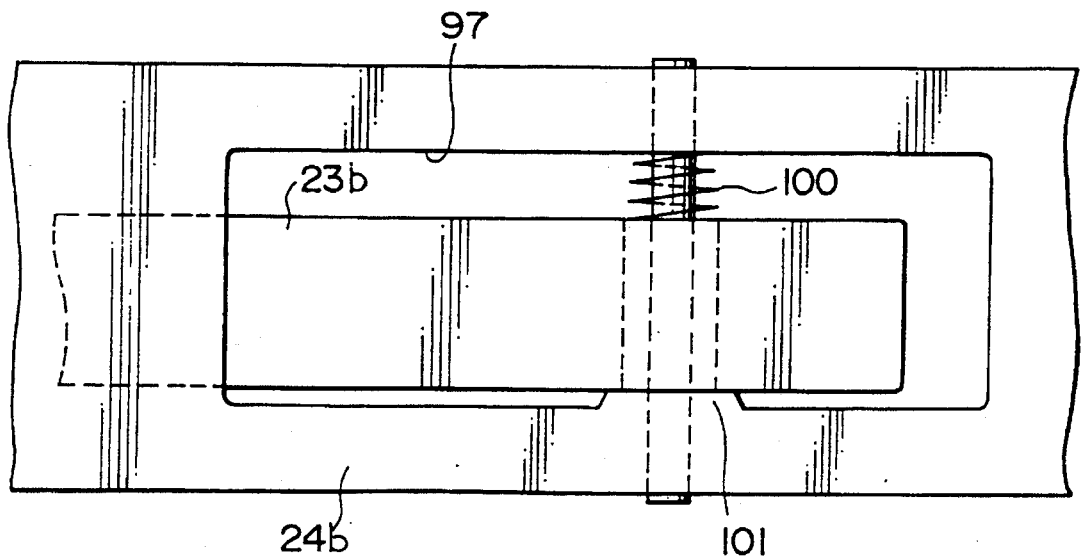

Further, when the head arm 24b is to be assembled to the slider arm 23b, a predetermined clearance is assured between the slider arm 23b and the head arm 24b in order to assure smooth movement of the slider arm 23b irrespective of a temperature variation or a degree of working accuracy. Since a play appears in this instance, a spring 100 is interposed between an inner face of the head arm 24b and an opposing face of the slider arm 23b as shown in FIG. 25B so that the slider arm 23b may be resiliently pressed against the other inner face of the head arm 24b. In this instance, preferably an oil-impregnated washer is interposed between them. Or else, if a datum surface of a projection 101 is provided, then such oil-impregnated washer can be omitted. It is to be noted that the construction of the magnetic head shown in FIG. 24 may be modified such that the slider arm 23 is of the alternative structure shown in FIG. 1 wherein the balance weight 50 is mounted as a separate member on it.

Figure 26:
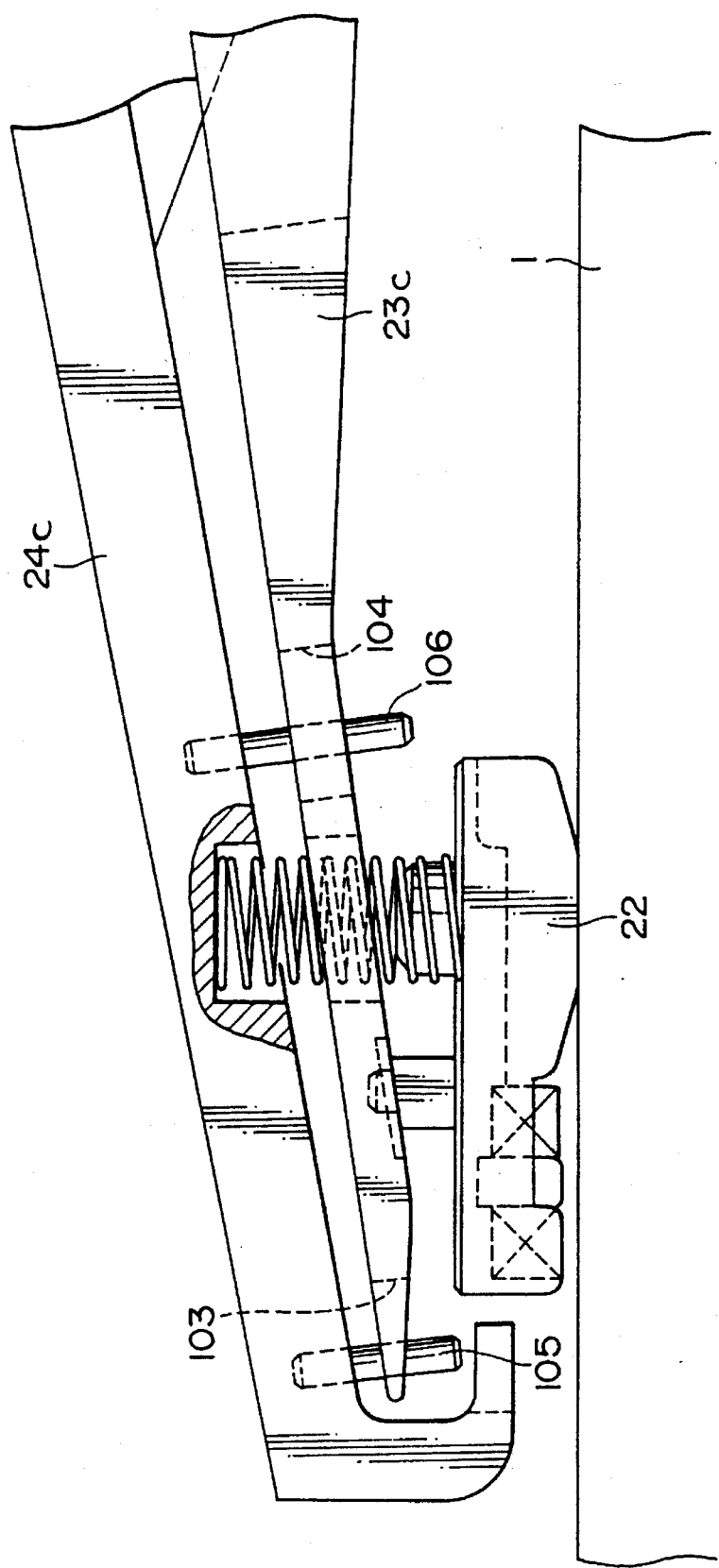
FIG. 26 is a schematic side elevational view, partly in section, of a yet further sliding type magnetic head for magneto-optical recording showing a yet further preferred embodiment of the present invention.
Figure 27A:
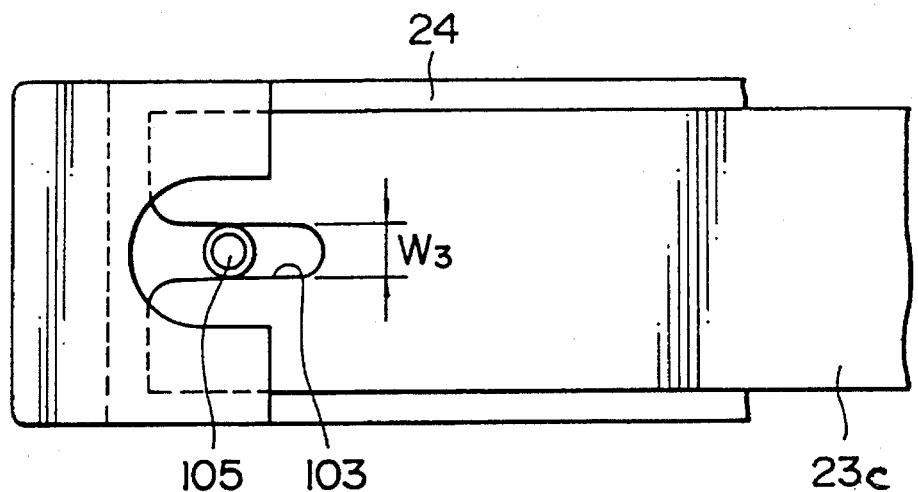
FIGS. 27A and 27B are bottom plan views showing different forms of the magnetic head of FIG. 26.
Figure 27B:
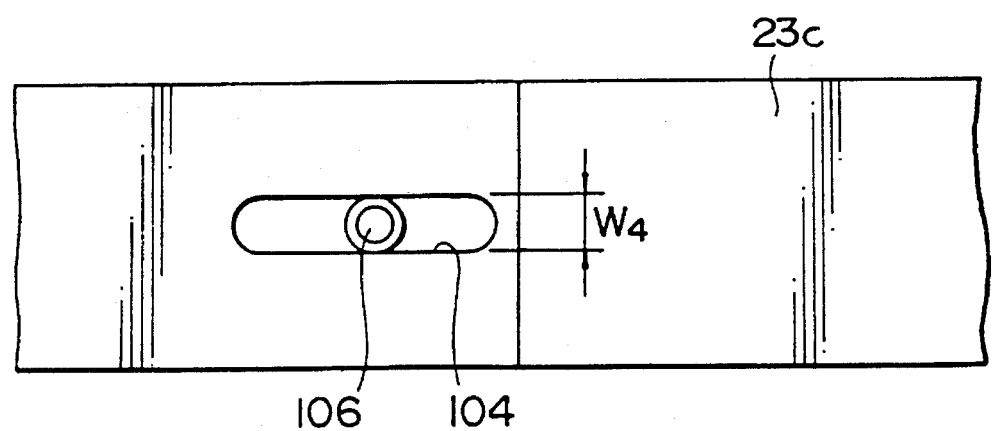

Referring now to FIGS. 26, 27A and 27B, there is shown a sliding type magnetic head for magneto-optical recording according to a still further embodiment of the present invention.

With the magnetic head described hereinabove with reference to FIG. 1, there is the possibility that, when there is some play between the support shaft 43 and the slider arm 23 or the head arm 24, the head body 22 may become liable to move in a direction perpendicular to the plane of FIG. 1 thereby to deteriorate the positioning accuracy of the head body 22.

The magnetic head shown in FIGS. 26, 27A and 27B is improved in this regard. In particular, in the magnetic head of the present embodiment, a slider arm 23c has formed at an end portion or an intermediate portion thereof an elongated recess 103 which has the width $W_3$ of, for example, 1.23±0.03 mm or an elongated hole 104 which has the width $W_4$ of, for example, 1.23±0.03 mm as shown in FIG. 27A or 27B. A positioning pin 105 or 106 having the diameter of, for example, 1.2±0.03 mm is force fitted in or formed integrally with a head body 24c and received in the recess 103 or the elongated hole 104 as shown in FIG. 27A or 27B.

The positioning pin 105 or 106 may be made of SUS, Teflon, brass or a resin material of a head arm.

With the magnetic head of the construction described above, even if there is some play around a support shaft 43 which interconnects the slider arm 23 and the head arm 24c, the slider arm 23c is positioned with respect to the head arm 24c by the positioning pin 105 or 106. Accordingly, the positioning accuracy of the head body 22 is enhanced.

Figure 28:
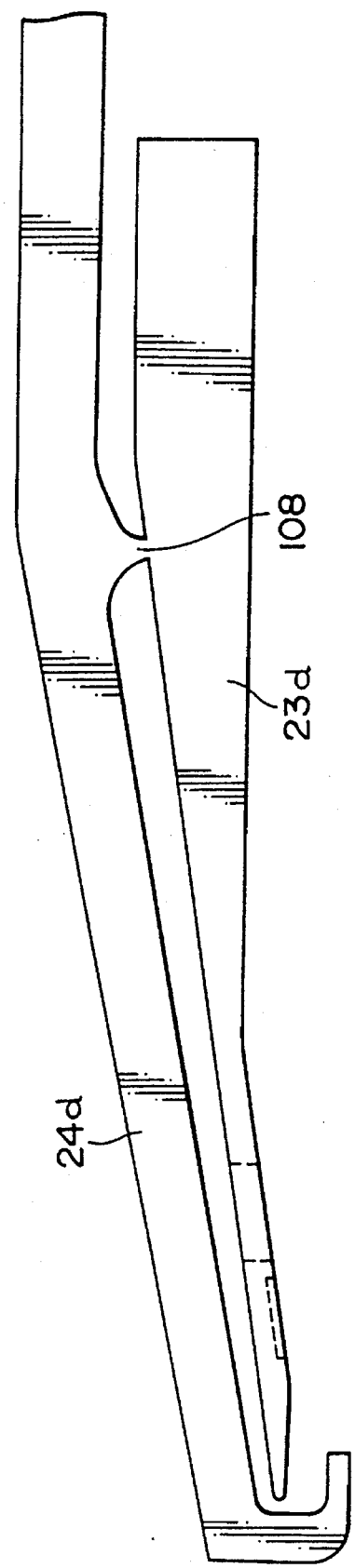
FIG. 28 is a schematic side elevational view of part of a yet further sliding type magnetic head for magneto-optical recording showing a yet further preferred embodiment of the present invention.

FIG. 28 shows a sliding type magnetic head for magneto-optical recording according to a yet further preferred embodiment of the present invention. In the magnetic head of the present embodiment shown, a head arm 24d and a slider arm 23d are formed as a unitary member by injection molding of a resin material. In particular, a connecting portion between the head arm 24 and the slider arm 23 is formed as a so-called mold hinge mechanism 108 which is reduced in thickness at or in the neighborhood of the center of gravity of the slider arm 23 on which the head body 22 and a balance weight 91 or 50 are provided.

It is to be noted that, while the head arm 24, the slider arm 23 and the mold hinge mechanism 108 are formed into a unitary member by a single injection molding operation, alternatively the mold hinge mechanism 108 may be formed integrally with the slider arm 23 or the head arm 24, whereafter it is joined to the other arm by a suitable means such as welding.

With the magnetic head of the construction described above, since the position of the head body 22 is settled, the manufacturing process is facilitated and magnetic heads are suitably manufactured in a mass. The mold hinge mechanism 108 can be applied also to the construction shown in FIG. 24 wherein the slider arm 23 is inserted in the opening 97 of the head arm 24.

Figure 29:
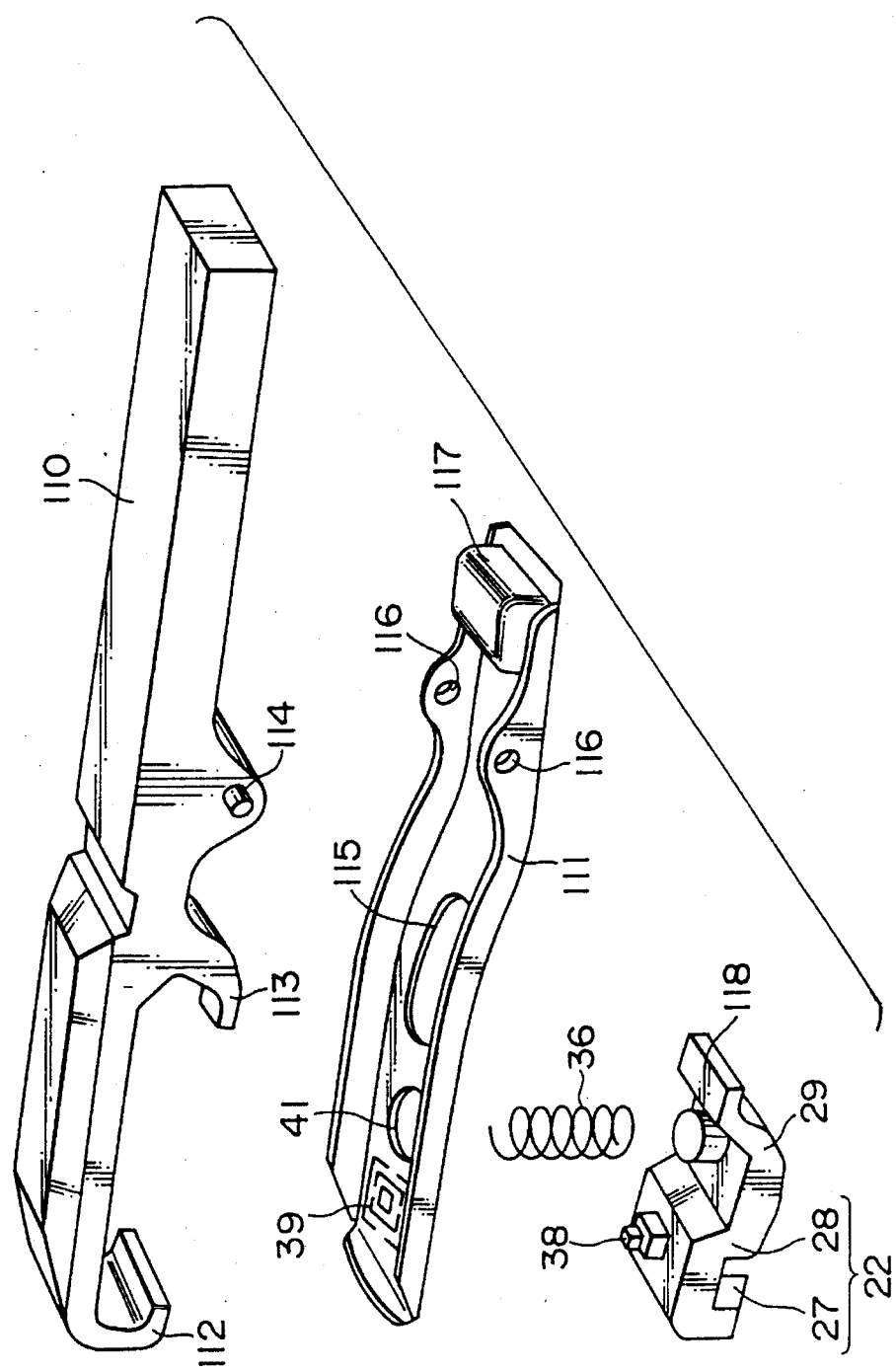
FIG. 29 is a fragmentary perspective view of part of a yet further sliding type magnetic head for magneto-optical recording showing a yet further preferred embodiment of the present invention.
Figure 30:
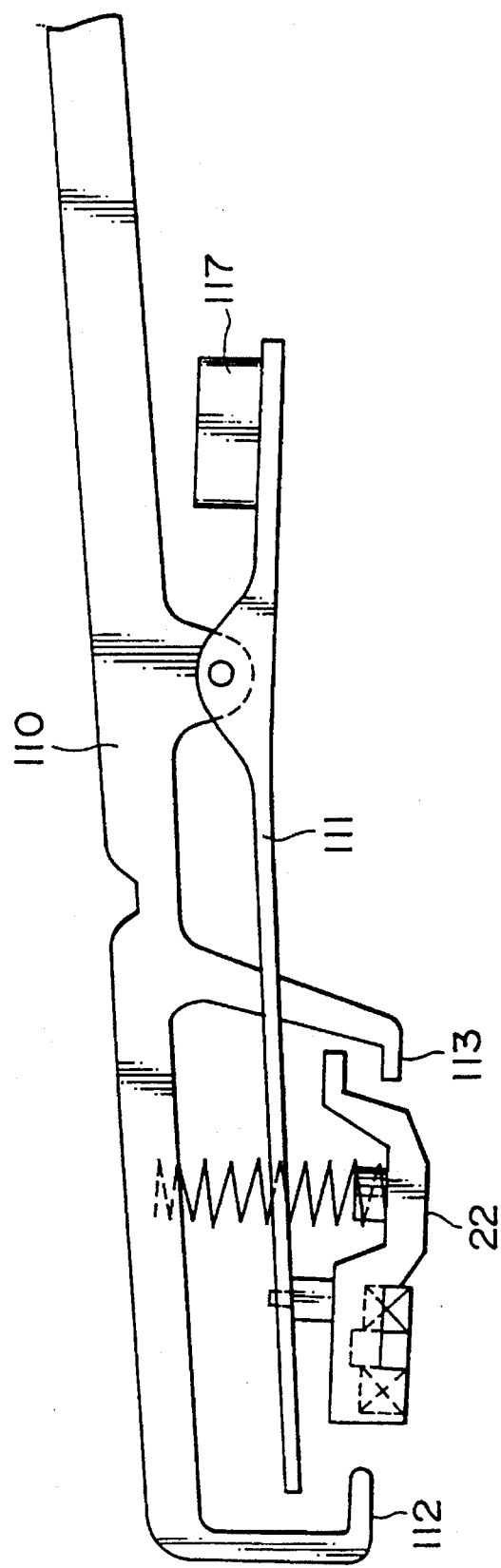
FIG. 30 is a side elevational view of the magnetic head of FIG. 29 but in an assembled condition.

Referring now to FIGS. 29 and 30, there is shown a sliding type magnetic head for magneto-optical recording according to a yet further preferred embodiment of the present invention. The magnetic head shown includes a head arm 110, a slider arm 111 and a head body 22. The head arm 110 is made of, for example, an engineering plastic material and has an inwardly extending first stopper portion 112 integrally formed at an end thereof. The head arm 110 further has a second stopper portion 113 integrally formed thereon in an opposing relationship to the first stopper portion 112 and has a support shaft 114 integrally formed at an intermediate portion thereof. The slider arm 111 is supported on the support shaft 114.

The slider arm 111 may be made by punching of a metal material such as, for example, SUS304 or a Be—Cu alloy and has a gimbal 39 integrally formed at an end thereof. The slider arm 111 has a through-hole 41 for a coil spring 36 and an insertion hole 115 for the second stopper portion 113 formed therein. The slider arm 111 extends uprightly at the opposite sides thereof, and a pair of engaging holes 116 for receiving the support shaft 114 therein are formed in the upright portions of the slider arm 111. A balance weight 117 is mounted at the other end of the slider arm 111.

The head body 22 includes a slider 28 having a sliding portion 29 and a head element 27. The slider 28 is formed by molding of a resin such as PPS, PC or POM. The slider 28 has an arresting portion 118 formed at an end portion thereof remote from the head element 27 for engaging the second stopper portion 113.

The head body 22 is supported with the support shaft 38 thereof force fitted in the gimbal 39 of the slider arm 111. Further, the support shaft 114 of the head arm 110 is fitted for pivotal motion in the engaging hole 116 of the slider arm 111. The coil spring 36 is interposed between the head arm 110 and the slider 28 and extends through the through-hole 115 of the slider arm 111.

Figure 31:
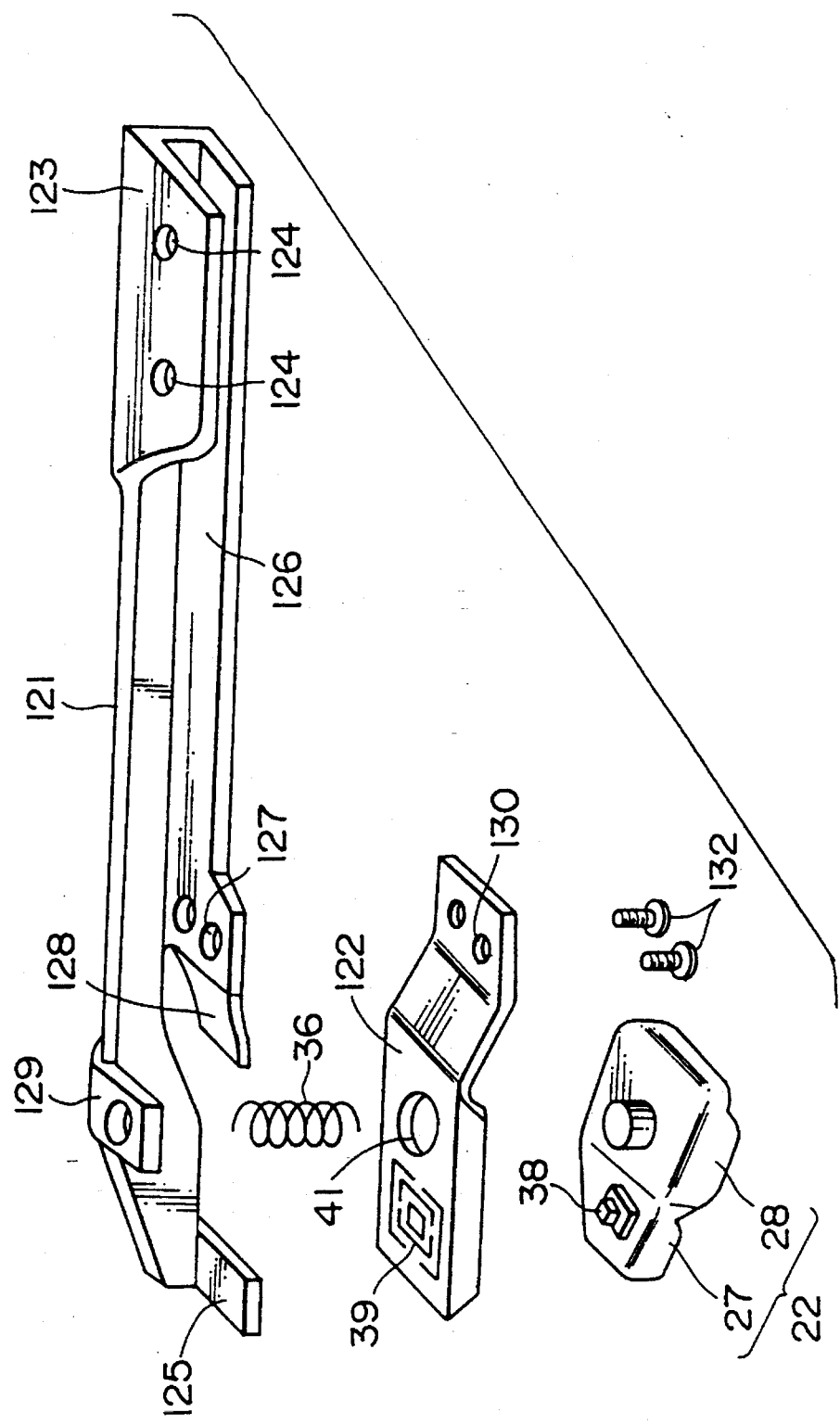
FIG. 31 is a fragmentary perspective view of a yet further sliding type magnetic head for magneto-optical recording showing a yet further preferred embodiment of the present invention.
Figure 32:
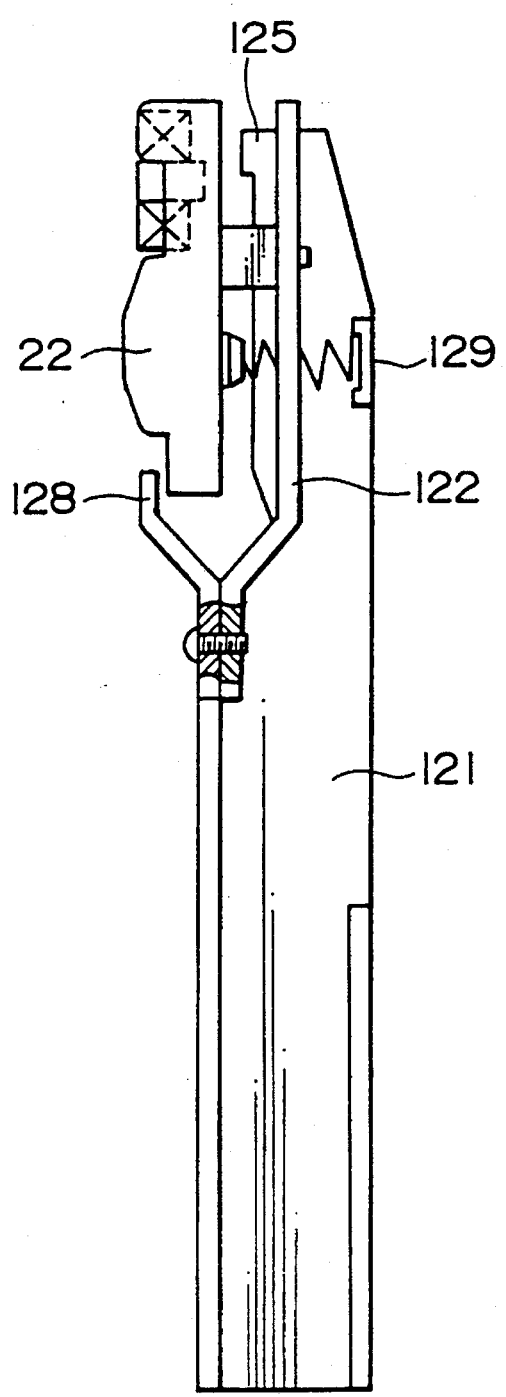
FIG. 32 is a side elevational view of the magnetic head of FIG. 31 but in an assembled condition.

Referring now to FIGS. 31 and 32, there is shown a sliding type magnetic head for magneto-optical recording according to a yet further preferred embodiment of the present invention. The magnetic head shown includes a head arm 121, a head body 22 and an auxiliary support member 122 for supporting the head body 22. The head arm 121 is formed from a plate-formed member and is bent at upper and lower edges at a base end portion thereof perpendicularly in the same directions to form upper and lower bent portions 123 and 126. A pair of mounting holes 124 are formed in the upper bent portion 123, and a pair of lead threads 127 are formed in the lower bent portion 126. The head arm 121 is further bent perpendicularly at a lower edge at the other free end thereof to form a stopper portion 125. A second stopper portion 128 extends from the lower bent portion 126 in an opposing relationship toward the first stopper 125. A supporting portion 129 in the form of a bent lug for receiving the coil spring 36 therein is formed from an upper edge of the head arm 121 intermediately between the first and second stopper portions 125 and 128.

The auxiliary support member 122 has a gimbal 39 formed at an end portion thereof and has a through-hole 41 for the coil spring 36 formed therein in the proximity of the gimbal 39. The auxiliary support member 122 further has a pair of lead threads 130 formed at the other end portion thereof. The head body 22 includes a slider 28 and a head element 27 provided integrally thereon.

A support shaft 38 of the head body 22 is force-fitted in the gimbal 39 to support the head body 22 on the auxiliary support member 122, and the coil spring 36 is interposed between the slider 28 and the supporting portion 129 of the head arm 121. In this condition, a pair of fastening screws 132 are screwed into the lead threads 130 and 127 of the auxiliary support member 122 and the head arm 121 to mount the auxiliary support member 122 onto the head arm 121.

Figure 33:
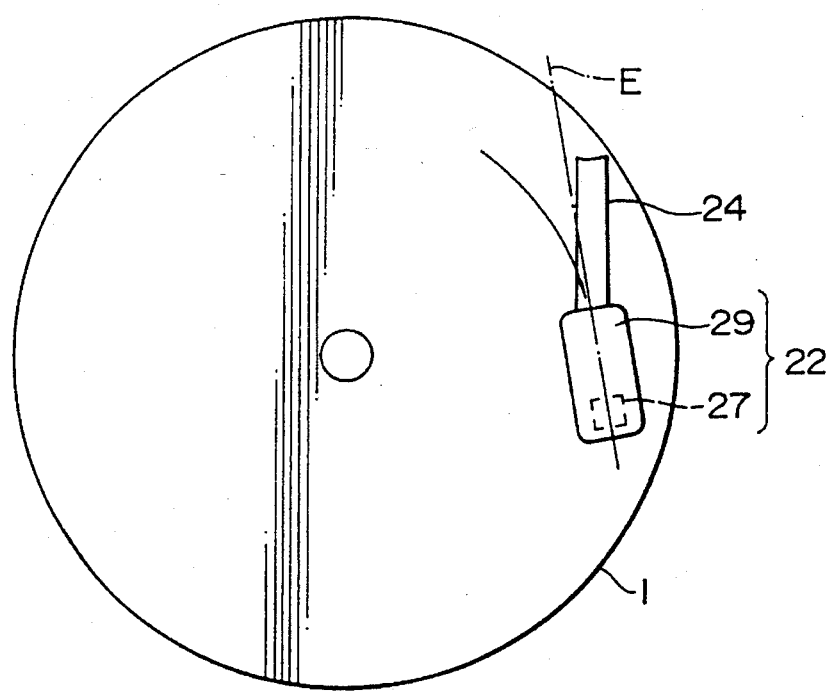
FIG. 33 is a schematic view illustrating a mounting angle of a head body according to the present invention.

FIG. 33 illustrates an example of a mounting angle of a head body on a head arm. In the arrangement shown, the head body 22 is mounted on the head arm 24 such that a line E extending in a longitudinal direction of the sliding portion 29 of the slider 28 from the center of the head element 27 may coincide with a tangential line to the disk 1.

With the arrangement, the sliding resistance between the disk 1 and the sliding portion 29 of the slider 28 is low.

Figure 34:
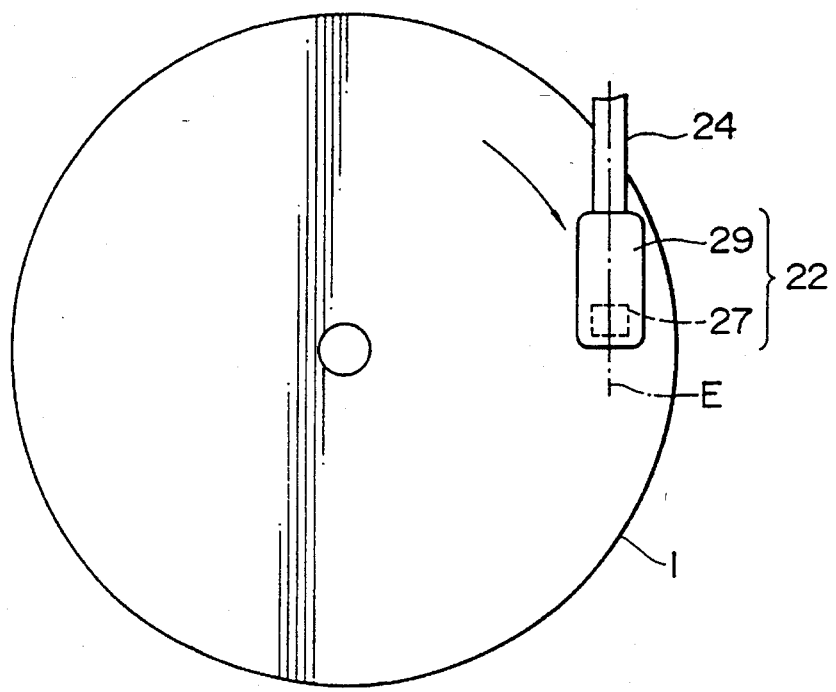
FIG. 34 is a similar view but illustrating another mounting angle of a head body for comparison.

Incidentally, if the head body 22 is mounted on the head arm 24 otherwise such that, as shown in FIG. 34, the line E extending in the longitudinal direction of the sliding portion 29 of the slider 28 from the head element 27 crosses a tangential line to the disk 1, the sliding resistance between the disk 1 and the sliding portion 29 is increased comparing with that in the arrangement shown in FIG. 33.

Figure 35:
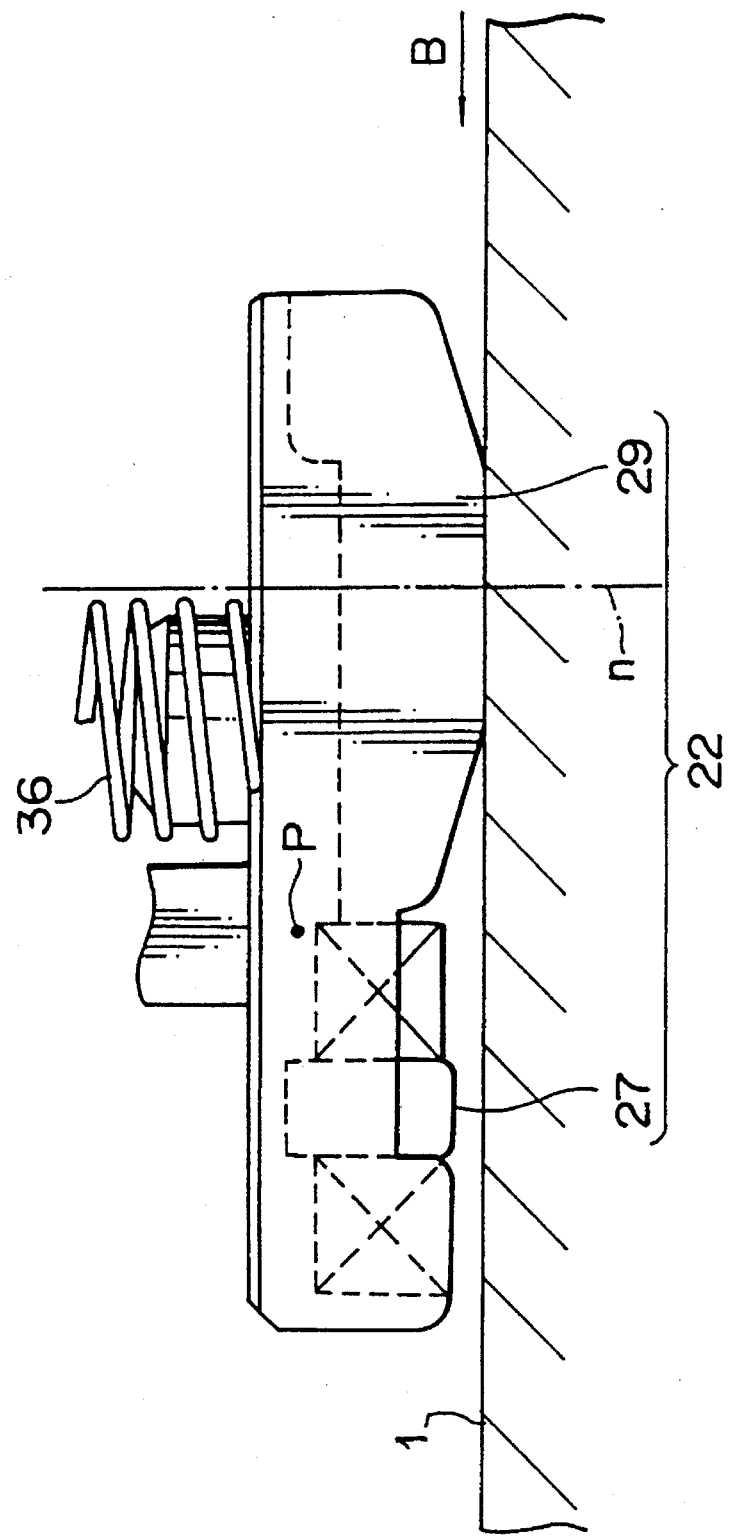
FIG. 35 is a schematic front elevational view of a yet further sliding type magnetic head for magneto-optical recording showing a yet further preferred embodiment of the present invention.

Referring now to FIG. 35, there is shown a sliding type magnetic head for magneto-optical recording according to a yet further preferred embodiment of the present invention.

When the direction B of rotation of a disk 1 is such that it first meets a sliding portion 29 of a slider 28 and then meets a head element 27 of a head body 22, where a coil spring 36 is interposed at a central position of the sliding portion 29, a force caused by the weight of the head body 22 and the spring force of the coil spring 36 acts at the center of the sliding portion 29 so that the head body 22 tends to be pivoted in the clockwise direction around the position P of the center of gravity thereof by a sliding force of the disk 1 in the direction B of rotation thereby to act to move the head element 27 away from the disk 1.

The magnetic head of the present embodiment is improved in this regard. In particular, the coil spring 36 is disposed at a position displaced toward the position P of the center of gravity of the head body 22 from the position n of the center of the sliding portion 29 of the slider 28, that is, an intermediate position between the center of the sliding portion 29 and the position P of the center of gravity.

With the magnetic head of the construction just described, since the coil spring 36 is displaced toward the position P of the center of gravity of the head body 22 from the center of the sliding portion 29 of the slider 28, the pivoting force of the head body 22 can be controlled to control an otherwise possible lift of the head element 27.

It is to be noted that, while the slider 28 is made of a resin material, it is otherwise possible to form the slider 28 from a metal material such as aluminum, an aluminum alloy or copper. For example, the slider 28 can be formed by punching of any of the metal materials.

When a metal material is used for the slider 28, preferably a resin film of, for example, the ultraviolet radiation setting type is coated on or a slip film is applied to the sliding surface of the slider 28. Where the slider 28 is formed from a metal material, the variation in dimension is smaller than that where it is formed from a resin material, and the slider 28 can be formed readily by drawing. Further, the slider 28 can be formed comparatively thin and light.

It is to be noted that, while, in the several embodiments described above, the gimbal 39 is formed integrally with the slider arm by molding, the gimbal 39 may otherwise be formed as a separate member from the slider arm and mounted later onto to the slider arm.

Further, when the sliding portion 29 of the slider 28 has a construction of a combination of the constructions of FIGS. 13A and 14B wherein the sliding face thereof has a flattened curved face so as to contact along a line with the disk 1, the gimbal 39 may be modified such that it omits the slit 45A of FIG. 6A leaving only the slit 45B so as to allow pivotal motion of the head body 22 only in one direction.

Figure 36:
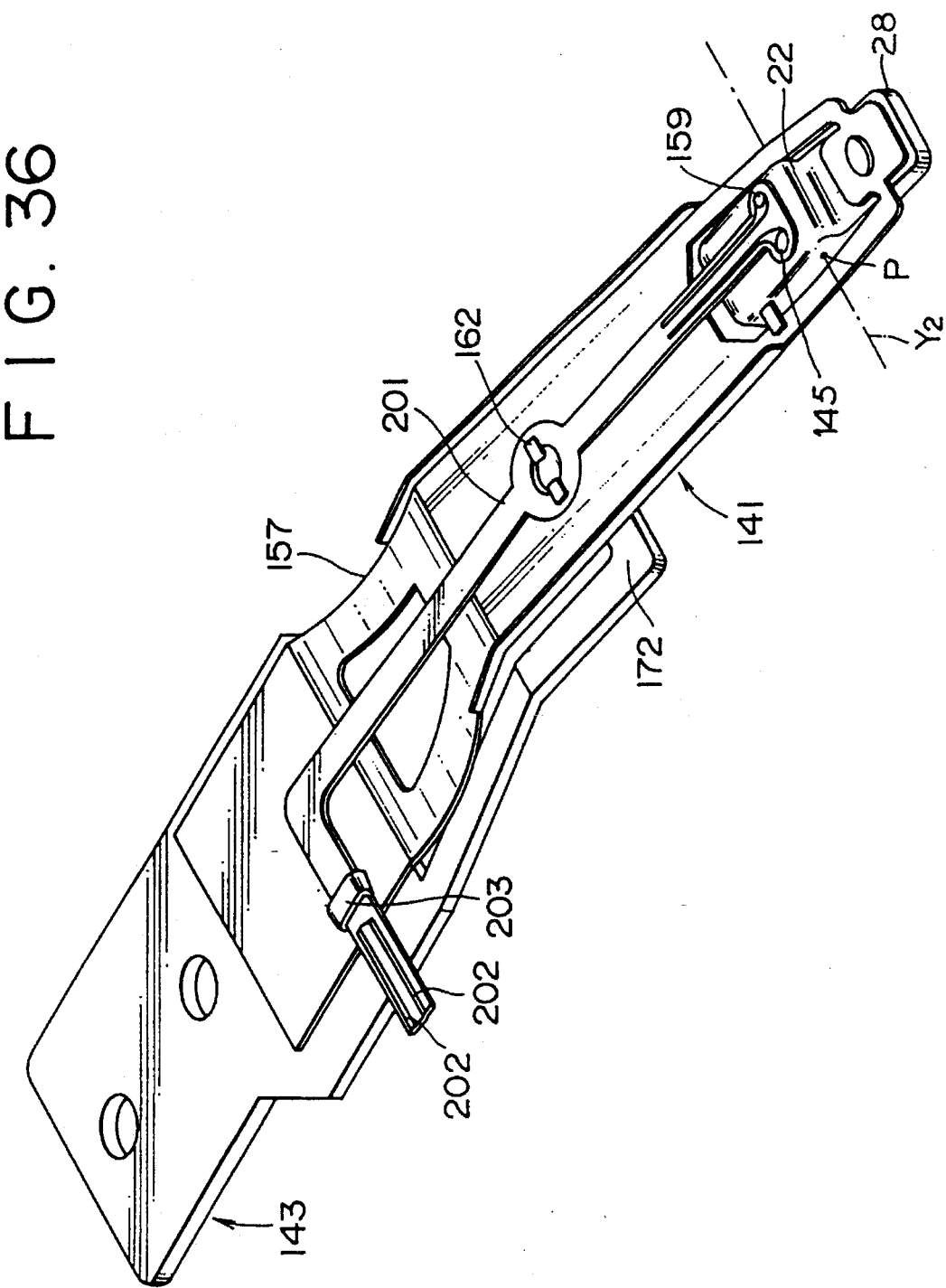
FIG. 36 is a schematic side elevational view of a yet further sliding type magnetic head for magneto-optical recording showing a yet further preferred embodiment of the present invention.
Figure 37:
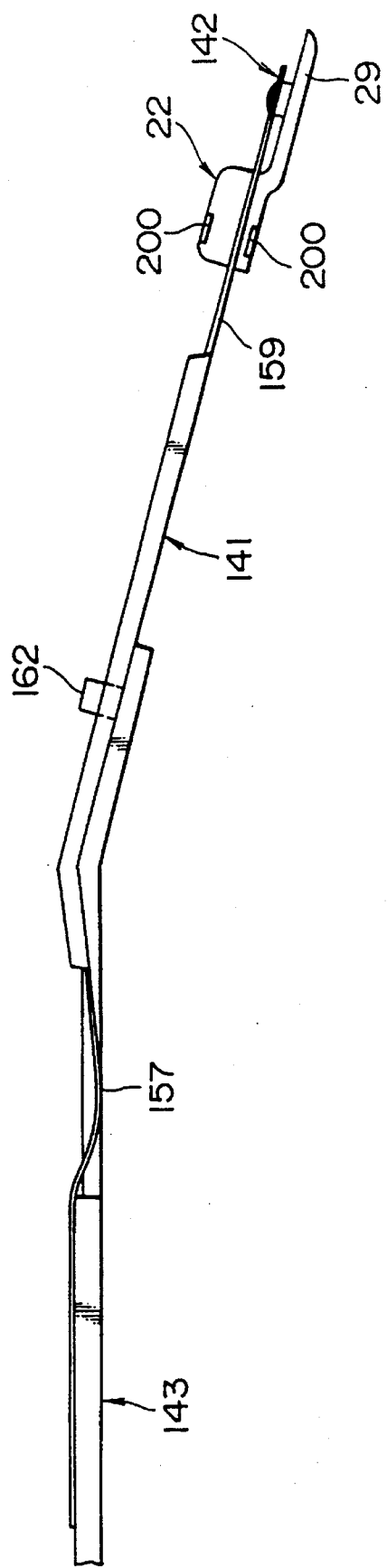
FIG. 37 is a front elevational view of the magnetic head of FIG. 36.

Referring now to FIGS. 36 and 37, there is shown a sliding type magnetic head for magneto-optical recording according to a yet further preferred embodiment of the present invention. The magnetic head shown includes a head body 22, a thin leaf spring member 141 for resiliently pressing a sliding portion 29 of a slider 28 of the head body 22 against a surface 1a of a disk 1, and a fixing member or head arm 143 on which the leaf spring member 141 is mounted. The head body 22 is mounted on a gimbal 142 at an end of the leaf spring member 141, and the leaf spring member 141 is mounted at the other end thereof on the fixing member 143.

Figure 38:
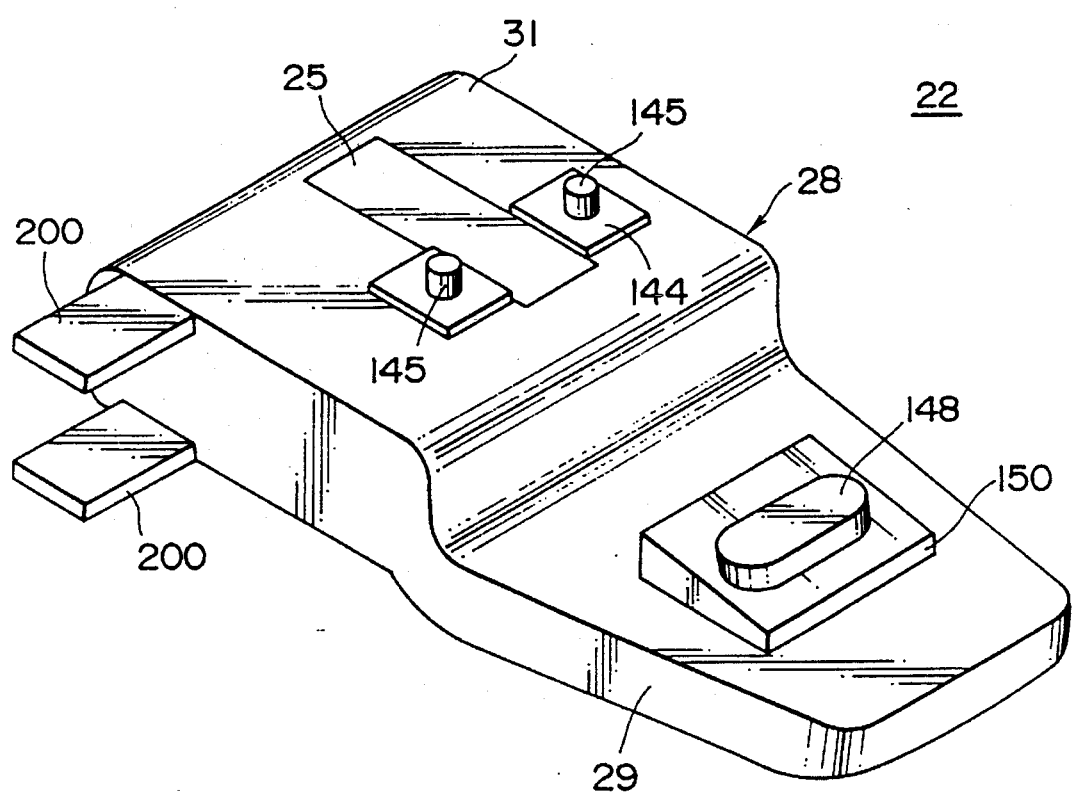
FIG. 38 is a perspective view of a head body of the magnetic head of FIG. 36.
Figure 39:
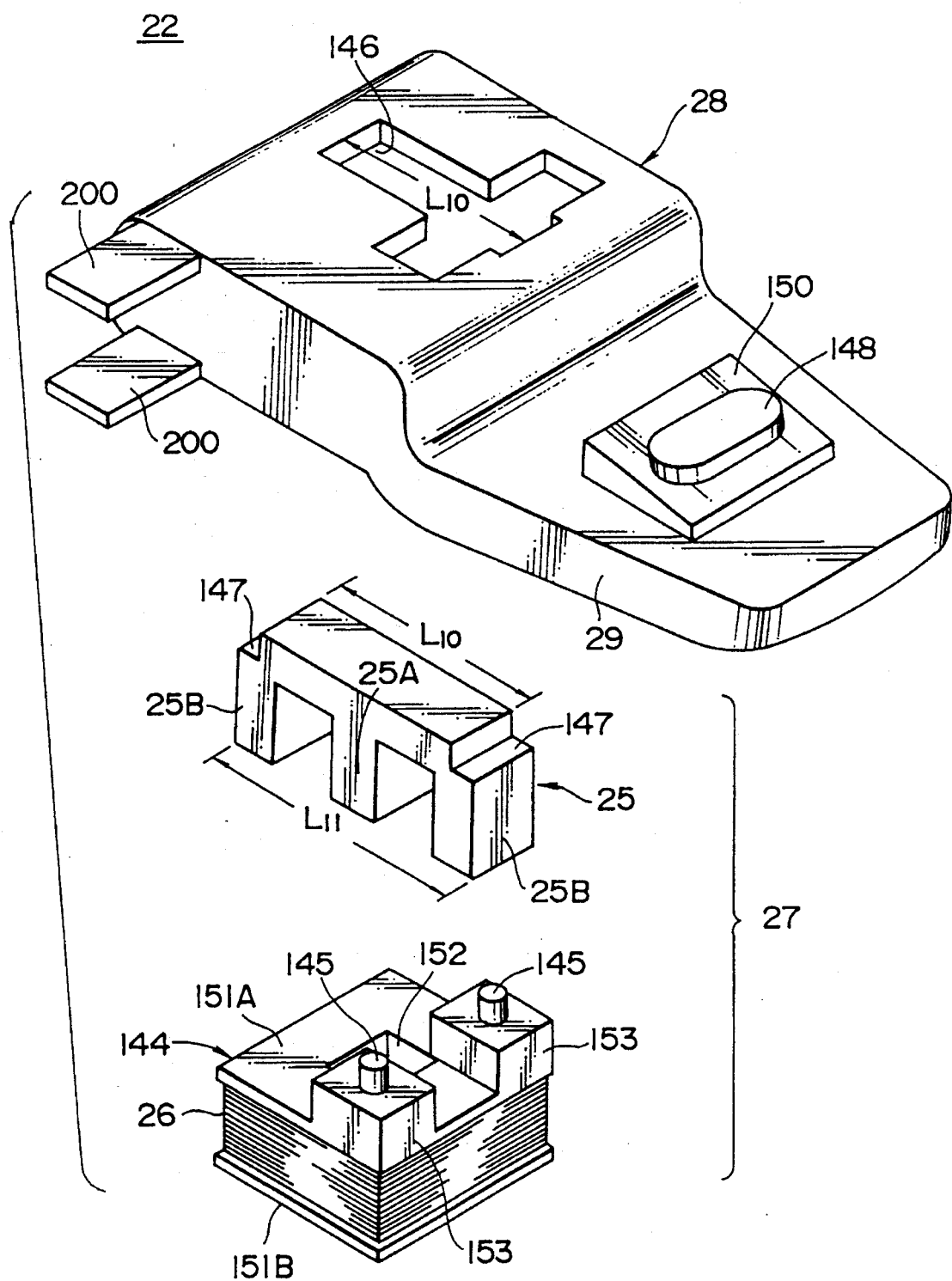
FIG. 39 is a fragmentary perspective view of the head body shown in FIG. 38.

Referring to FIGS. 38 and 39, the head body 22 includes a magnetic head element 27 mounted integrally adjacent a side of the sliding portion 29 of the slider 28 at which the slider 28 directly contacts with and slides on the magnetic disk 1. The magnetic head element 27 includes a ferrite magnetic core member 25 having a center magnetic pole core 25A and a pair of side magnetic pole cores 25B and having a substantially E-shaped profile, and a bobbin 144 mounted on the center magnetic pole core 25A of the magnetic core member 25 and having a coil 26 mounted thereon.

The bobbin 144 has a pair of flange portions 151A and 151B at the upper and lower ends thereof, respectively. The flange portions 151A and 151B are made of, for example, liquid crystal polymer and have through-holes 152 formed therein, and the center magnetic pole core 25A of the E-shaped magnetic core member 25 is fitted in the through-holes 152. A pair of terminal leading portions 153 are formed integrally on one side of an upper face of the upper flange 151A on the opposite sides of the through-hole 152 of the upper flange portion 151A, and a terminal pin 145 made of, for example, german silver is led out from each of the terminal leading portions 153.

Figure 40A:
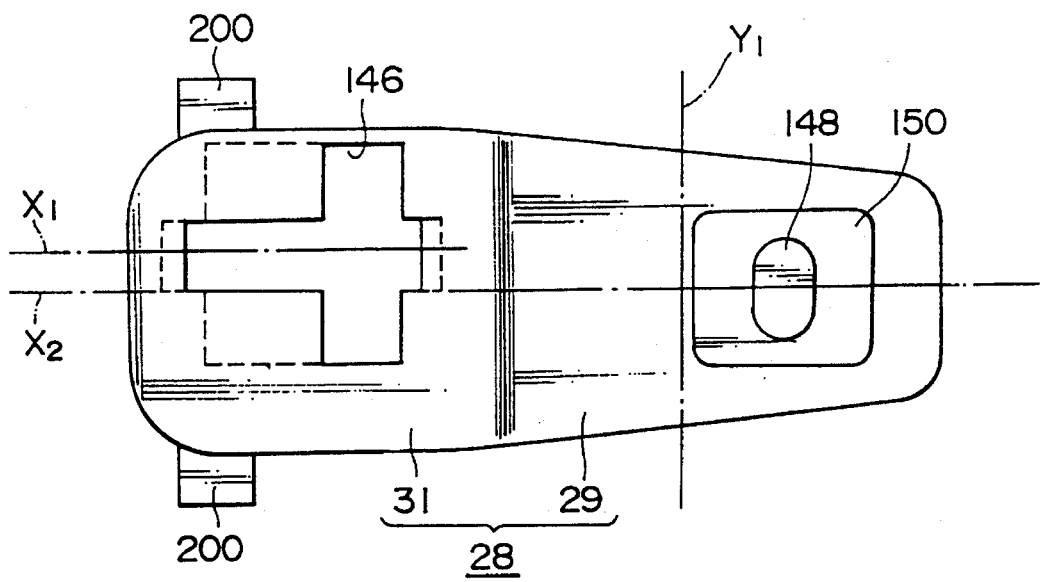
FIGS. 40A and 40B are a plan view and a cross sectional view, respectively, of a sliding member of the magnetic head of FIG. 36.
Figure 40B:
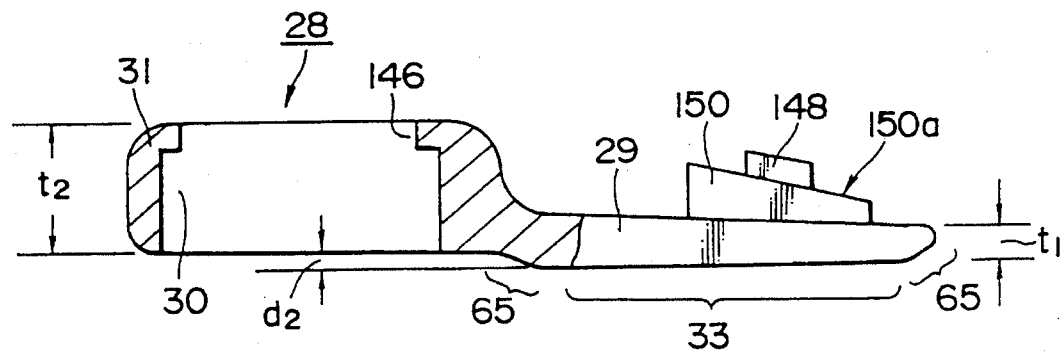

Referring to FIGS. 40A and 40B, the slider 28 is formed by injection molding of a resin having a low coefficient of friction and has the sliding portion 29 and a mounting portion 31 provided integrally thereon. The mounting portion 31 has a mounting recess 30 for the magnetic head element 27 formed at a side portion thereof. The sliding portion 29 is formed with a thickness $t_1$ smaller than the thickness $t_2$ of a portion of the head element 27 adjacent the mounting portion 31. A face of the mounting portion 31 along which the head element 27 is exposed is offset or retracted by a small distance $d_2$ from the sliding face of the sliding portion 29 as seen from FIG. 40B.

The lower or sliding face of the sliding portion 29 of the slider 28 has, as viewed in the transverse section, an arcuate shape similarly as that of the slider 28 shown in FIG. 14B and has, as viewed in the longitudinal section, a flat face 33 and a pair of rounded faces 65 on the opposite sides of the flat face 33 similarly as that of the slider 28 shown in FIG. 13B. Accordingly, the sliding portion 29 contacts along a line with the surface of the disk 1.

The mounting recess 30 located at a side portion of the sliding portion 29 of the slider 28 is formed contiguously to a substantially cross-shaped opening 146 so that the rear face of the magnetic core 25 of the head element 27 received therein is exposed and also the terminal pins 145 of the bobbin 144 are exposed through the opening 146 to the upper face of the slider 28.

The magnetic head element 27 is thus mounted in the mounting recess 30 of the slider 28 to construct the head body 22. A pair of upper and lower stoppers 200 are provided integrally on the opposite sides of the mounting portion 31 of the slider 28, in which the mounting recess 30 is formed, so as to prevent the head body 22 from being inadvertently removed from the leaf spring member 141.

The material used for the slider 28 is required to have a high sliding performance, be unlikely charged and be light in weight, and accordingly, particularly high molecular polyethylene or the like, or high molecular polyethylene in which carbon is contained, for example, by 8 percent by weight or the like, can be used as the material.

It is to be noted that, referring to FIG. 39, a pair of steps 147 are formed at the opposite ends of the rear face of the magnetic core 25, and the magnetic core 25 is formed such that the length $L_{10}$ of the opening 146 in which a portion of the magnetic core 25 above the upper face of the mounting recess 30 is received is made shorter by a distance equal to the height of the steps 147 than the length $L_{11}$ of the magnetic core 25. Consequently, positioning of the magnetic head element 27 upon mounting can be performed readily, and the outer face of the slider 28 and the rear face of the magnetic core 25 lie in the same plane.

Preferably, the mounting recess 30 is formed such that the center axis $X_1$ thereof is displaced from the center axis $X_2$ of the slider 28 as shown in FIG. 40A. The reason will be hereinafter described.

Referring to FIGS. 39, 40A and 40B, a mounting portion 148 for mounting the head body 22 on the gimbal 142 at the end of the leaf spring member 141 is provided integrally on the upper face of the sliding portion 29 of the slider 28. The mounting portion 148 is formed on a base seat 150 having a face 150a inclined at a predetermined angle for contacting with a face of the gimbal 142. Preferably, the mounting portion 148 is provided at a location displaced from the center $Y_1$ toward the end of the sliding portion 29. Also the reason will be hereinafter described.

Also with the head body 22 described above, the end face of the magnetic core 25 of the head element 27 is spaced by the small distance $d_2$ from the surface 1a of the disk 1 when the sliding portion 29 of the slider 28 contacts with the disk 1, similarly as described hereinabove.

Figure 42:
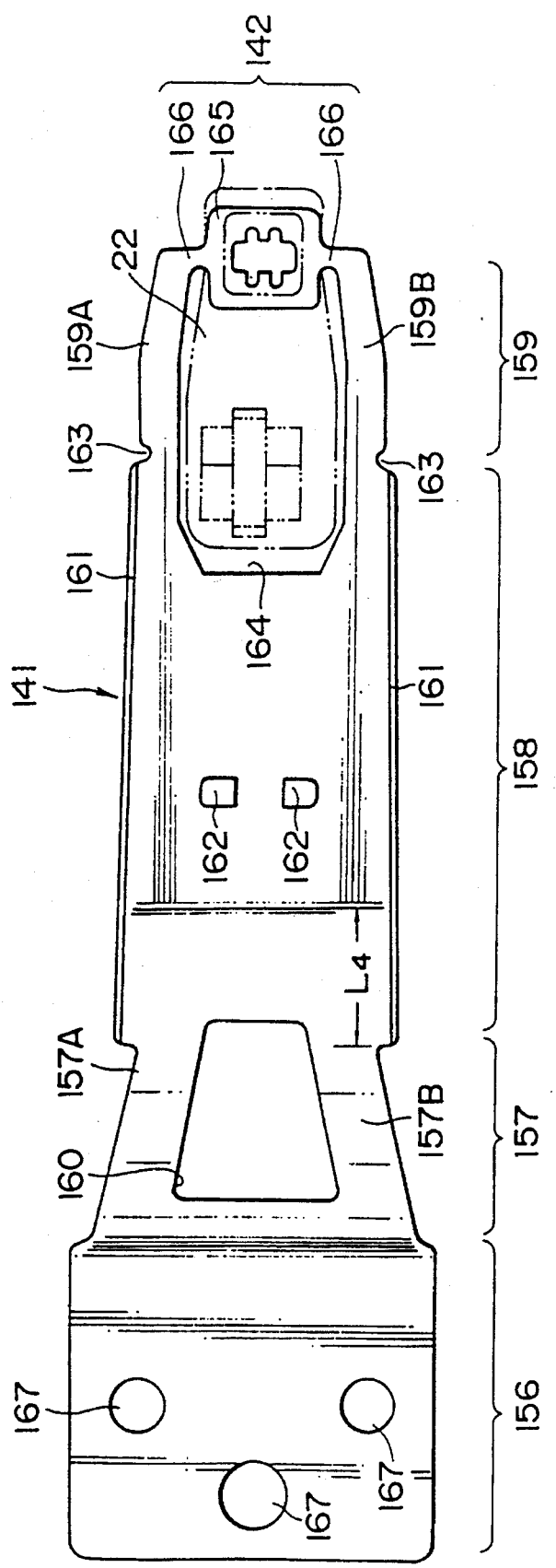
FIG. 42 is a plan view showing a leaf spring member of the magnetic head of FIG. 36.
Figure 43:
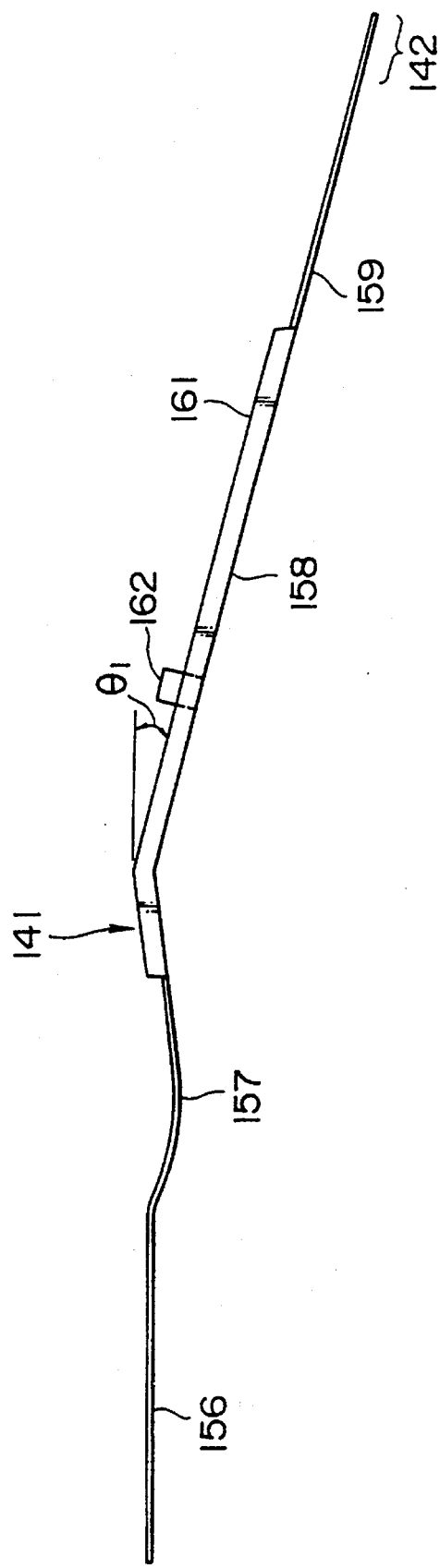
FIG. 43 is a front elevational view of the leaf spring member of FIG. 42.

Meanwhile, the leaf spring member 141 is formed from a thin plate of, for example, SUS304 or BeCu. Referring now to FIGS. 42 and 43, the leaf spring member 141 is formed as a unitary member and has a mounting portion 156 for mounting the leaf spring member 141 on the fixing member 143, a first spring portion or resilience providing portion 157 extending from the mounting portion 156 for following up lateral deflection of the disk 1 to and from its plane and for applying an entire load, an inclined portion 158 extending in an inclined relationship by a predetermined angle $\theta_1$ from the first spring portion 157, a second spring portion or resilience providing portion 159 extending from the inclined portion 158 for following up a variation of the profile of the surface of the disk 1 such as a bump 16, and the gimbal 142 provided at a free end of the second spring portion 159.

The mounting portion 156 of the leaf spring member 141 has a planar configuration and has three positioning holes 167 formed at predetermined locations thereof for positioning the leaf spring member 141 when it is to be assembled to the fixing member 143. The first spring portion 157 is in the form of a flat plate and has an opening 160 formed at the center thereof so as to provide resiliency to the first spring portion 157 by means of a pair of plate portions 157A and 157B on the opposite sides of the opening 160. The first spring portion 157 is thus formed generally in a curved configuration so that it may be convex on the side thereof opposing to the disk 1.

The inclined portion 158 of the leaf spring member 141 is inclined by the predetermined angle $\theta_1$ with respect to the first spring portion 157 leaving an extension 158a of a small length $L_4$ from the first spring portion 157. The inclined portion 158 has a pair of ribs 161 in the form of upwardly bent wide tabs on the opposite sides thereof.

A pair of arresting lugs 162 for arresting a flexible circuit board 201 as shown in FIG. 36, which is connected to the terminals of the coil 26 and will be hereinafter described, are formed in an opposing relationship at central locations of the inclined portion 158 of the leaf spring member 141 by cutting and bending portions of the inclined portion 158 uprightly.

The second spring portion 159 of the leaf spring member 141 is formed such that it extends from the opposite sides of the inclined portion 158 by way of constricted portions 163 at the boundary to the inclined portion 158, that is, it has a pair of spring portions 159A and 159B in the form of flat plates extending in parallel to each other in the same plane on the opposite sides of a spacing 164.

Further, the gimbal 142 of the leaf spring member 141 has a head mounting portion 165 and a pair of gimbal portions 166 in the form of thin strings and is formed such that it extends between the spring portions 159A and 159B of the second spring portion 159.

In the leaf spring member 141, the first spring portion 157 for coping with lateral deflection of the disk 1 and the second spring portion 159 for coping with a bump of the disk 1 are isolated in operation from each other by the inclined portion 158 reinforced by the ribs 161 so that they can operate independently of each other.

Figure 44:
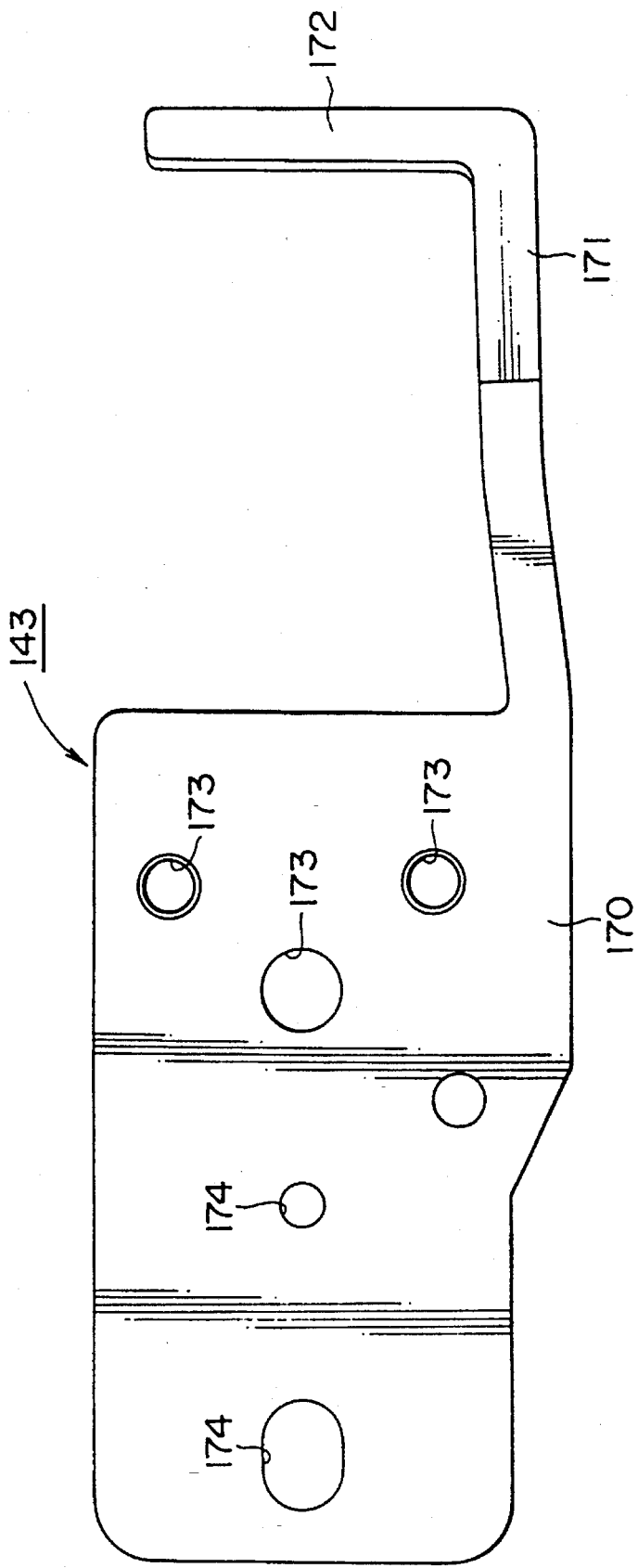
FIG. 44 is a plan view showing a fixing member of the magnetic head of FIG. 36.
Figure 45:
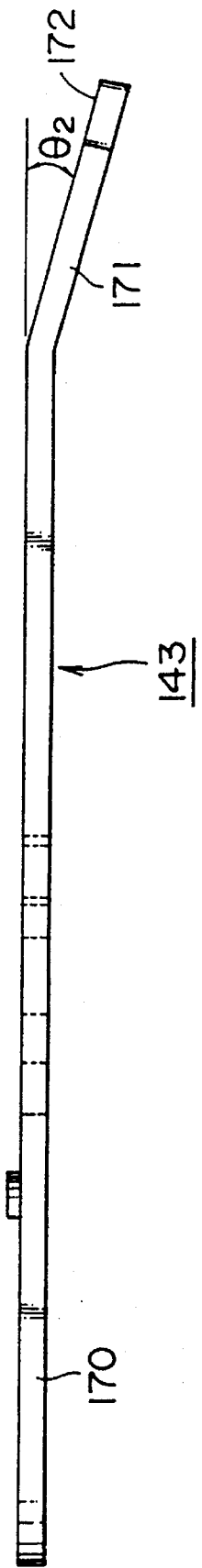
FIG. 45 is a front elevational view of the fixing member of FIG. 44.

Referring now to FIGS. 44 and 45, the fixing member 143 is formed as a unitary member from a metal plate of, for example, iron, steel, SUS or aluminum and has a mounting portion 170 for fixing the mounting portion 156 of the leaf spring member 141 to the fixing member 143, an inclined portion 171 extending from a side of the mounting portion 170 and inclined at a predetermined angle $\theta_2$ at a distance from the mounting portion 170 substantially equal to the distance from the mounting portion 156 of the leaf spring member 141 to the inclined portion 158 (the position at which the inclination actually begins), and a stopper portion 172 extending perpendicularly from an end of the inclined portion 172 such that it is opposed to the mounting portion 170.

In this instance, the inclination angle $\theta_2$ of the fixing member 143 is set smaller than the inclination angle $\theta_1$ of the leaf spring member 141 ($\theta_2<\theta_1$).

Then, positioning pins (not shown) are inserted into positioning holes 173 of the mounting portion 170 of the fixing member 143 and the positioning holes 167 of the mounting portion 158 of the leaf spring member 141 to position the fixing member 143 and the leaf spring member 141 relative to each other, and in this condition, the mounting portion 156 of the leaf spring member 141 is fixed to the mounting portion 170 of the fixing member 143 by suitable means such as laser welding or spot welding.

In this condition, the leaf spring member 141 is held in contact with the stopper portion 172 of the fixing member 143 leaving a predetermined restoring force from a difference between the inclination angles $\theta_1$ and $\theta_2$. In other words, the leaf spring member 141 is held in contact with and arrested at the stopper portion 172.

Subsequently, the mounting portion 148 of the head body 22 is fusion connected to the mounting portion 165 of the gimbal 142 to mount the head body 22 onto the leaf spring member 141.

Figure 46:
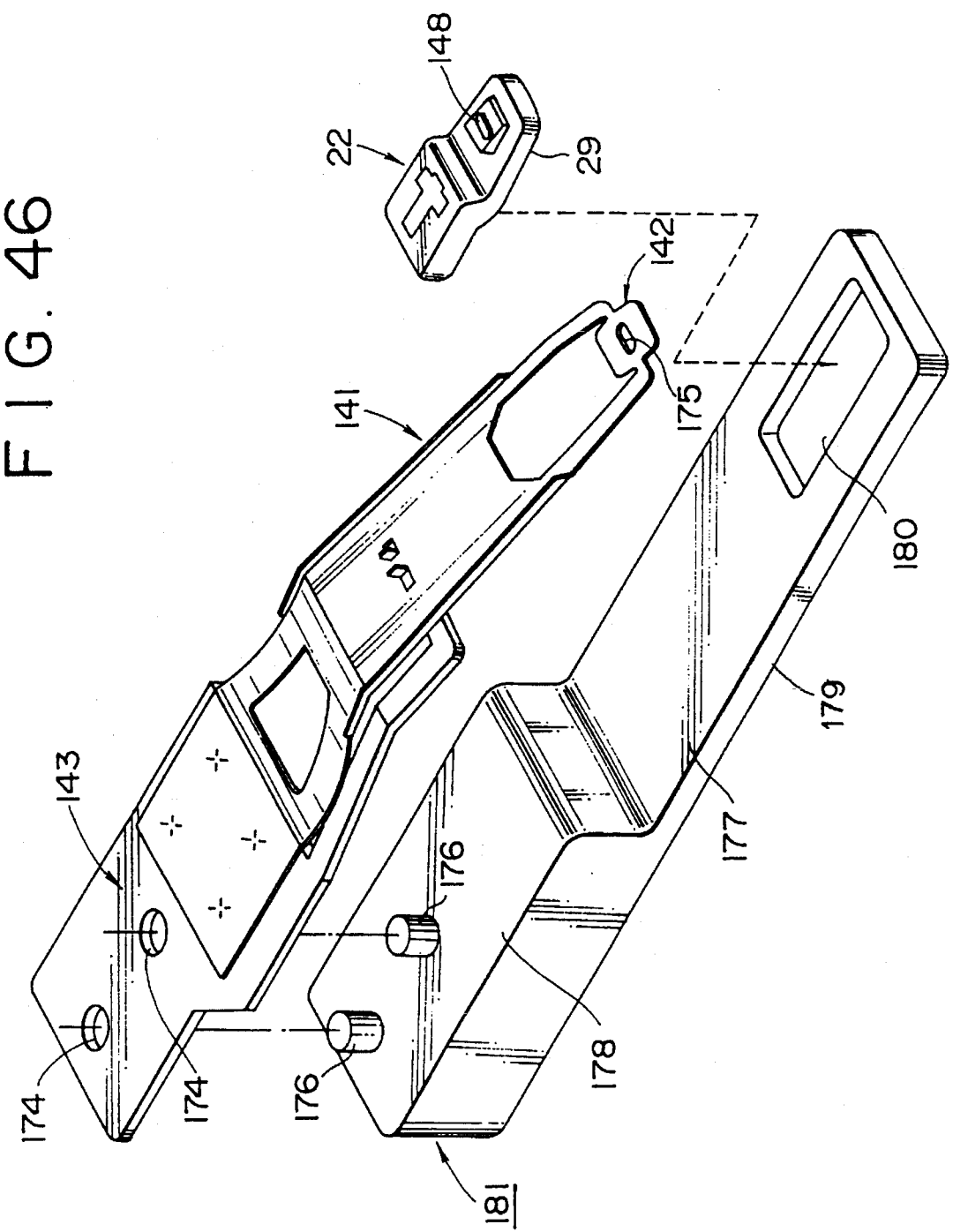
FIG. 46 is a schematic perspective view illustrating an assembling procedure of the magnetic head of FIG. 36.
Figure 47A:
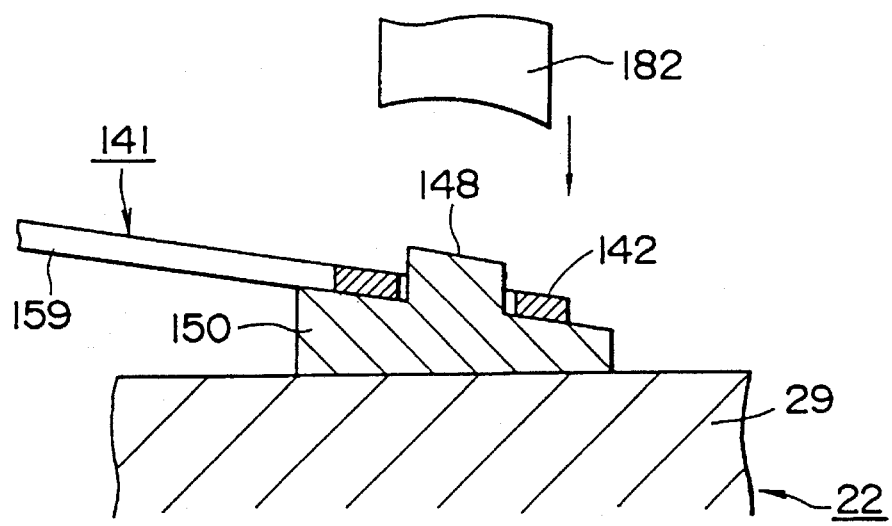
FIGS. 47A and 47B are schematic sectional views illustrating a step of welding a gimbal to a head body of the magnetic head of FIG. 36.
Figure 47B:
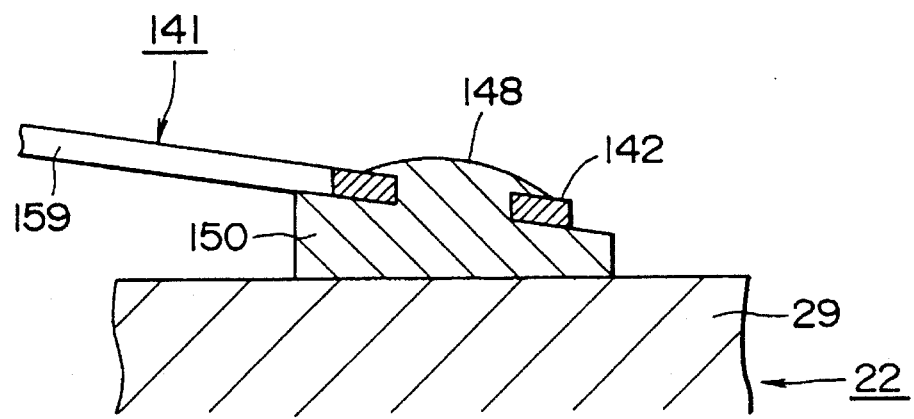
Figure 48:
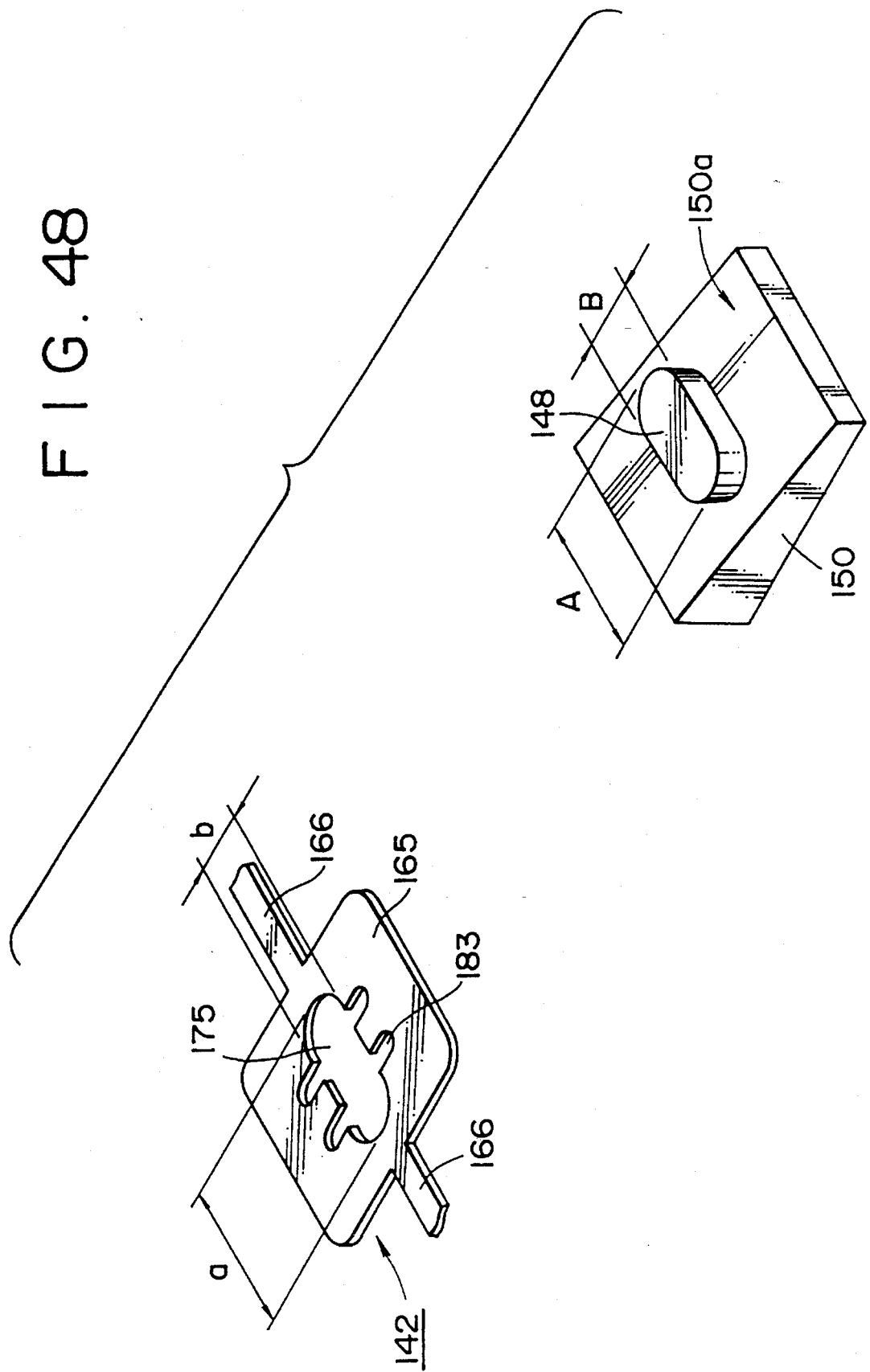
FIG. 48 is a perspective view showing configurations of the gimbal and a mounting portion of the head body of the magnetic head of FIG. 36.

The assembly proceeds in such a manner as illustrated in FIGS. 46 to 48. The length a and the width b of a hole 175 of the mounting portion 165 of the gimbal 142 are set greater than the length A and the width B (a>A and b>B), respectively, of the mounting portion 148 of the head body 22 in advance as seen from FIG. 48.

Meanwhile, a jig 181 is prepared wherein, as shown in FIG. 46, a pair of positioning pins 176 are implanted on an upper face of an upper step 178 of a stepped base 177 and a perforation 180 for receiving and positioning the head body 22 therein is formed in a lower step 179 of the stepped base 177.

Then, the head body 22 is first positioned in the perforation 180 in the jig 181, and the positioning pins 176 of the jig 181 are inserted into the positioning holes 174 of the fixing member 143 integrated with the leaf spring member 141 to position the fixing member 143 while the mounting portion 148 of the head body 22 is simultaneously inserted into the hole 175 of the gimbal 142 to position the head body 22 with respect to the leaf spring member 141.

In this instance, since the the hole 175 of the gimbal 142 is formed in a rather great size as described hereinabove, even if the head body 22 has some error in dimension, the hole 175 can be fitted readily with the mounting portion 148 of the head body 22. When the mounting portion 148 is inserted in position in the hole 175 of the gimbal 142, it extends upwardly above the hole 175 of the gimbal 142.

Thereafter, the mounting portion 148 of the head body 22 is softened using ultrasonic welding means 182 of the transverse oscillation type to weld and secure the head body 22 to the gimbal 142 as shown in FIGS. 47A and 47B. In this instance, if a plurality of slits 183 are formed contiguously to the hole 175 of the gimbal 142 as shown in FIG. 48, then the head body 22 can be welded further surely to the gimbal 142.

Here, the head body 22 is formed such that the center P of gravity thereof may be located intermediately between the sliding portion 29 of the slider 28, particularly the location thereof at which it contacts directly with the disk 1, and the head element 27, particularly the center magnetic pole core 25A of the head element 27 (refer to FIGS. 36, 37 and 39).

When the head member 22 is mounted on the gimbal 142, the head element 27 thereof is received in the opening 164, as shown in FIG. 42, between the two spring portions 159A and 159B of the second spring portion 159 of the leaf spring member 141 for coping with a bump. Then, preferably the head body 22 is supported such that the spring portions 159A and 159B of the second spring portion 159 extend, during use, along the axial line $Y_2$ passing the center P of gravity of the head body 22 (the line $Y_2$ corresponds to the center axis of pivotal motion of the head body 22 when the head body 22 collides with a bump 16), or a location in the proximity of the axial line $Y_2$. Accordingly, the head body 22 is supported such that it extends upwardly and downwardly across the plane of the spring portions 159A and 159B of the second spring portion 159 (refer to FIGS. 36 and 37).

Figure 49A:
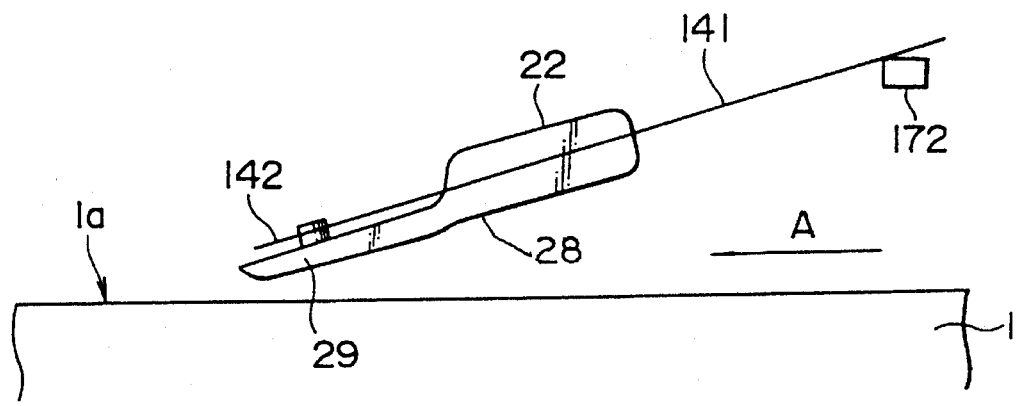
FIGS. 49A, 49B and 49C are schematic front elevational views illustrating operation of the magnetic head when the magnetic head is brought into contact with and slides on a surface of a disk.
Figure 49B:
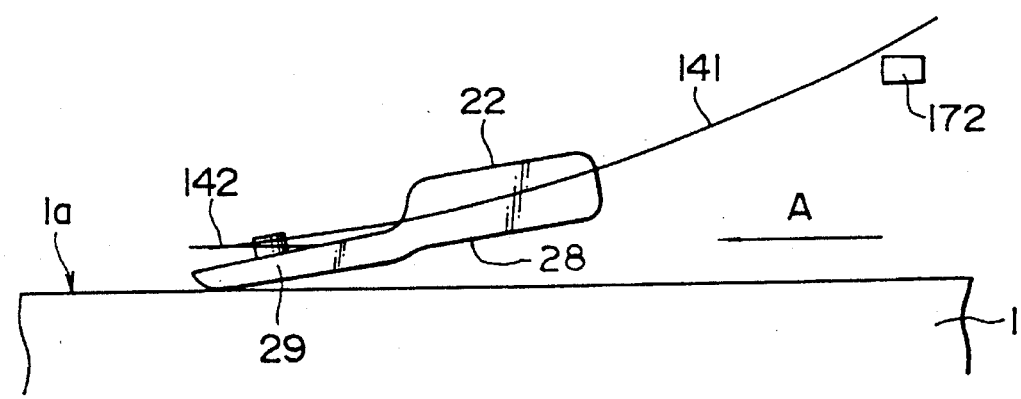
Figure 49C:
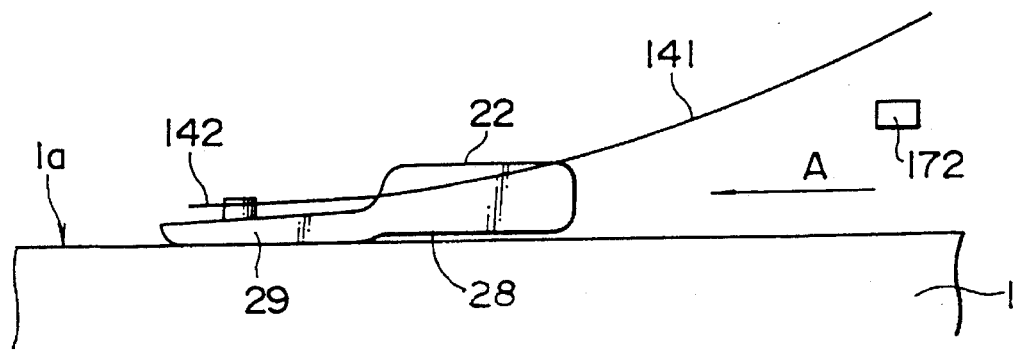

The magnetic head is mounted, in an assembled condition, in such an inclined condition that, taking a dispersion of products in manufacture into consideration, a front portion of the head body 22, that is, a portion adjacent the sliding portion 29 of the slider 28, approaches the disk 1 toward the advancing direction A of the disk 1 while a rear portion of the head body 22 adjacent the head element 27 is spaced away from the disk 1 as seen from FIGS. 49A to 49C.

Meanwhile, the frequency of natural vibrations of the head body 22 including the leaf spring member 141 is set to a value other than an equivalent frequency of a bump 16 upon sliding of the head body 22 on the disk 1 and another frequency of natural vibrations of the disk 1 itself, that is, to a value lower then those frequencies.

To this end, for example, the resonance frequencies of the two independent spring portions 157 and 159 of the leaf spring member 141 are set so that the requirement described above may be met.

Here, the equivalent frequency of the bump 16 is defined as a maximum amplitude frequency component caused by a bump 16 when the variation of the height of the disk 1 which moves at a linear velocity for use is represented in frequency.

Referring back to FIG. 36, the flexible circuit board 201 for leading out the terminals of the coil 26 has two wiring lines 202 having end rounded portions which are fitted onto and connected by soldering to the bobbin terminal pins 145 extending upwardly from the upper face of the slider 28. The flexible circuit board 201 extends on the leaf spring member 141 and has an arresting hole formed at an intermediate portion thereof. The arresting lugs 162 of the leaf spring member 141 are fitted in the arresting hole of the flexible circuit board 201 and bent laterally to secure the flexible circuit board 201 to the leaf spring member 41. The flexible circuit board 201 is also secured by another similar arresting lug 203.

In operation, the head body 22 is slidably contacted with the surface 1a of the disk 1 in such a manner as shown in FIGS. 49A to 49C. In particular, the gimbal 142 follows up to move from the position shown in FIG. 49A to the position shown in FIG. 49B so that the sliding portion 29 of the slider 28 of the head body 22 is contacted with the surface 1a of the disk 1, and thereafter, the sliding face of the sliding portion 29 is contacted in parallel with the surface 1a of the disk 1. Thereafter, the leaf spring member 141 is spaced away from the stopper portion 172 of the fixing member 143 and the head body 22 is slidably contacted with a predetermined load with the surface 1a of the disk 1.

The head body 22 moves within the tolerance of lateral deflection of the disk 1 out of its plane due to the action of the first spring portion 157, as shown in FIGS. 42 and 43, of the leaf spring member 141 and follows up a bump 16 of the surface 1a of the disk 1 due to the action of the second spring portion 159 of the leaf spring member 141. Further, the head body 22 follows up any lateral deflection of the disk 1 due to the action of the gimbal portion 166.

Then, since the leaf spring member 141 is set in advance in a condition wherein a predetermined spring pressure is exerted by the stopper portion 172 extending from the fixing member 143, even if the head body 22 is displaced upwardly and downwardly by lateral deflection of the disk 1 out of its plane, the variation of the pressurizing force of the head body 22 to the surface 1a of the disk is little. Thus, a substantially fixed pressurizing force can be obtained within the tolerance of lateral deflection of the disk 1 out of its plane.

Further, also with the magnetic head of the present embodiment, the head element 27 is retracted by the distance d2, as shown in FIG. 40B, from the sliding face of the sliding portion 29 of the slider 28, even when there is some variation in profile such as a bump 16 on the surface 1a of the disk 1, the bump 16 will pass between the head element 27 and the disk 1 similarly as described hereinabove.

Figure 50:
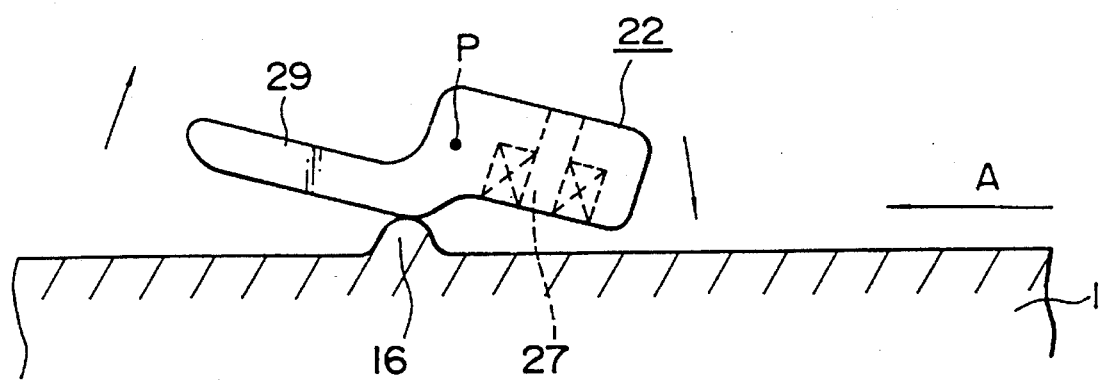
FIG. 50 is a schematic view illustrating operation of the magnetic head of FIG. 36 when it collides with a bump on a surface of a disk.

Further, since the center P of gravity of the head body 22 is positioned between the head element 27 and the sliding portion 29 of the slider 28, since there is some variation in profile such as a bump 16 on the surface 1a of the disk 1, when the bump 16 passes between the head element 27 and the surface 1a of the disk 1 and collides with an end portion of the sliding portion 29, the head body 22 will be pivoted in the clockwise direction around the center P of gravity as seen in FIG. 50. Thereupon, the head element 27 approaches the surface 1a of the disk 1. Consequently, the recording capacity of the head element 27 is raised.

Simultaneously, the equivalent weight of the head body 22 upon sliding movement on the surface 1a of the disk 1 as viewed from the bump 16 is decreased. Consequently, the impact upon the disk 1 is decreased, and the bad influence on the optical pickup system is reduced as much.

Further, since the head element 27 does not make a jump but on the contrary approaches the surface 1a of the disk 1 even when there is some variation in profile on the surface 1a of the disk 1, the magnetic head can be reduced in mass and also in weight. Accordingly, even if an external impact is applied to the magnetic head, the impact upon the disk 1 can be reduced. Consequently, the disk 1 can sufficiently bear an external impact.

Further, since the frequency of natural vibrations of the head body 22 including the two spring portions 157 and 159 of the leaf spring member 141 is set to a value other than the equivalent frequency of the bump 16, the head body 22 does not undergo resonance, and accordingly, the magnetic head can be driven stably.

Figure 51A:
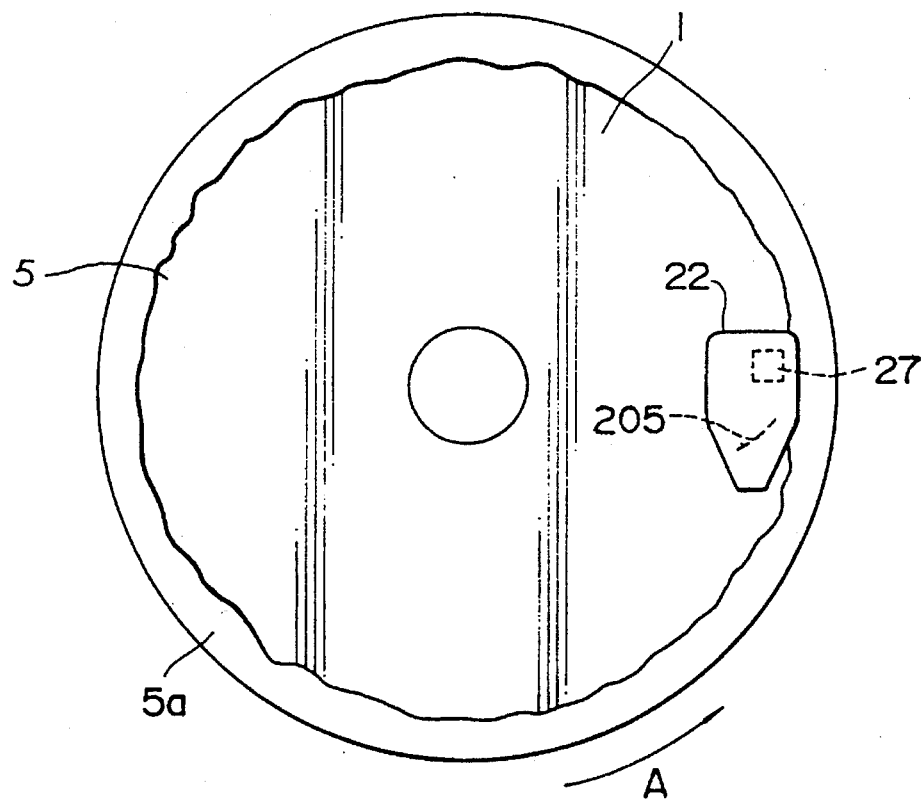
FIG. 51A is a schematic view showing a head body contacting with a disk.
Figure 51B:
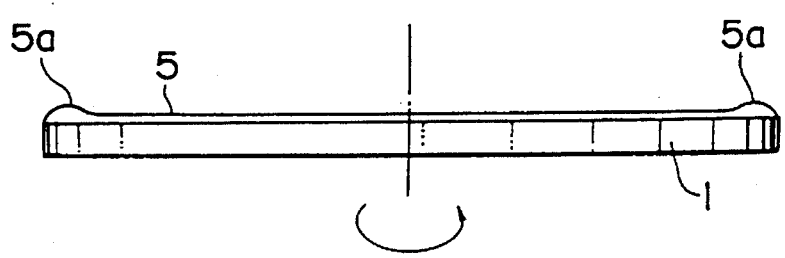
FIG. 51B is a side elevational view illustrating a condition of a surface of the disk of FIG. 51A.

While the protective film 5 of the disk 1 is formed by spin coating, a swollen portion 5a appears at an outer circumferential portion of the disk as shown in FIGS. 51A and 51B. In order to raise the recording density, it is desirable that the disk 1 can be recorded to a portion thereof very close to the outer circumferential edge thereof.

Thus, in the magnetic head of the present embodiment, since the head element 27 is disposed such that the center line $X_1$ thereof is displaced to one side from the center line $X_2$ of the slider 28 as shown in FIG. 40A, even when the head element 27 approaches the swollen portion 5a at an outer peripheral portion of the disk 1, the sliding portion 29 of the slider 28 will slide in line contact 205 on the flat face spaced away from the swollen portion 5a as seen from FIG. 51A. Consequently, high density recording can be achieved.

Since the second spring portion 159 of the leaf spring member 141 for coping with a bump 16 is provided such that it acts independently of the first spring portion 157 for coping with lateral deflection of the disk 1, the influence upon the disk 1 when the sliding portion 29 of the slider 28 collides with the bump 16 can be decreased.

Referring to FIG. 36, since the second spring portion 159 for coping with a bump 16 is disposed such that it passes the axial line $Y_2$ passing the center P of gravity of the head body 22 or a location in the proximity of the axial line $Y_2$, the axial line $Y_2$ of the pivotal motion when the head body 22 collides with and is pivoted by the bump 16 around the center of gravity, that is, the axial line $Y_2$ passing the center of gravity, and the fulcrum of operation of the leaf spring member 141 coincide with each other. Consequently, ideal operation can be realized.

Since the constricted portions 163 are provided between the second spring portion 159 for coping with a bump 16 and the inclined portion 158 of the leaf spring member 141, stress is concentrated upon the constricted portions 163, and consequently, a squeak peculiar to the leaf spring member 141 upon operation can be prevented.

As the disk 1 laterally fluctuates upwardly and downwardly by lateral deflection thereof, variations of the postures of the gimbal 142 on which the head body 22 is mounted and of the spring portions 159A and 159B of the leaf spring member 141 for coping with a bump 16 take place. Thus, when the disk 1 is displaced, for example, upwardly, the gimbal 142 follows up the disk 1, and thereupon, a torsional operation takes place at the gimbal portions 166. The gimbal portions 166 thus exert a force to restore the gimbal 142 itself, and the load is concentrated at an end of the head body 22 adjacent the head element 27. However, where the location at which the head body 22 is mounted on the gimbal 142 is set to a position spaced from the center $Y_1$ of the sliding portion 29 of the slider 28 toward the end of slider 28, the load described above can be controlled.

Figure 41A:
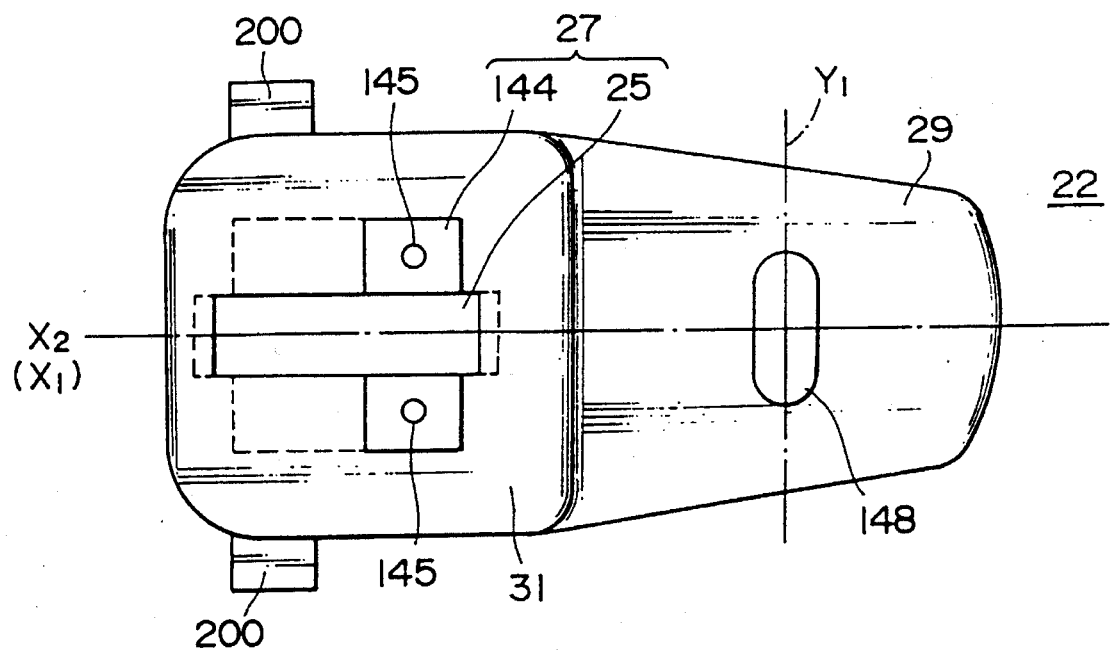
FIGS. 41A and 41B are a plan view and a front elevational view, respectively, of another form of the head body of FIG. 38.
Figure 41B:
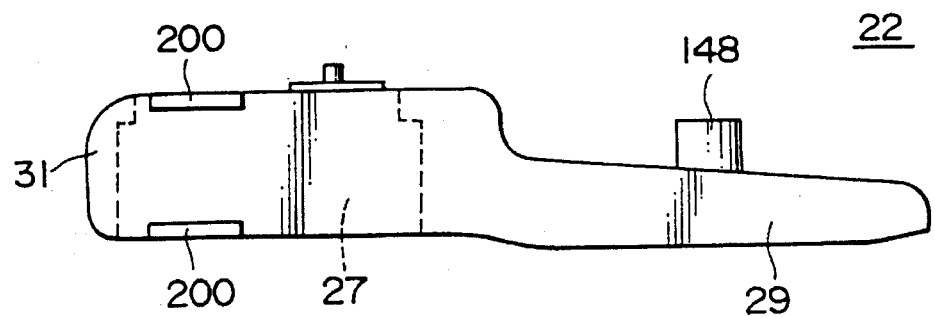

While, in the head body 22 described above, the head element 27 is disposed such that the center axis $X_1$ thereof is displaced from the center axis $X_2$ of the slider 28 and the mounting position thereof on the gimbal 142 and accordingly the mounting portion 148 are provided at a location displaced from the center $Y_1$ of the sliding portion 29 of the slider 28 toward the end of the slider 28 (refer to FIG. 40A), the head body 22 may be disposed otherwise such that, as shown in FIGS. 41A and 41B, the head element 27 is disposed at the center of the head body 22 such that the center axis $X_1$ thereof coincides with the center axis $X_2$ of the slider 28 and also the mounting portion 148 is provided so as to correspond with the position of the center $Y_1$ of the sliding portion 29. In this instance, the base seat 150 is omitted and the top face of the sliding portion 29 is inclined.

FIGS. 52 to 57 show several modifications to the leaf spring member 141, particularly to the second spring portion 159 for coping with a bump and the gimbal 142 of the leaf spring member 141.

Figure 52:
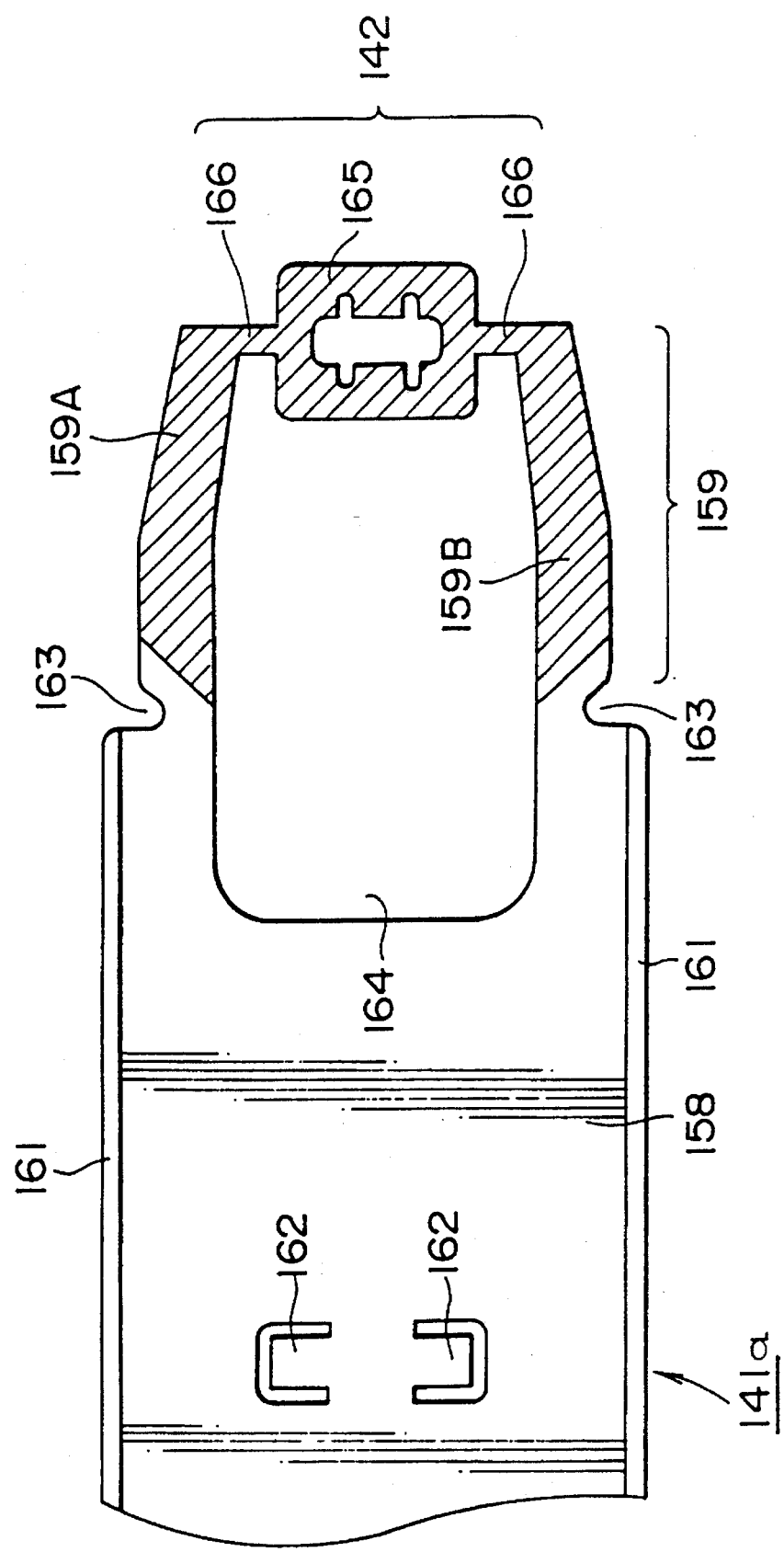
FIG. 52 is a partial plan view showing another form of the leaf spring member of the magnetic head of FIG. 36.

FIG. 52 shows a modified leaf spring member 141 wherein the spring portions 159A and 159B of the second spring portion 159 for coping with a bump and the gimbal 142 (including the gimbal portions 166 and the mounting portion 165) for normally contacting the sliding portion 29 of the slider 28 of the head body 22 with the disk 1 within the tolerance of lateral deflection of the disk 1 out of its plane are half etched as indicated by slanting lines in FIG. 52 to reduce the thickness there comparing with the inclined portion 158. With the modified leaf spring member 141, a flexing operation at the spring portions 159A and 159B and a torsional operation at the gimbal portions 166 are facilitated.

Figure 53:
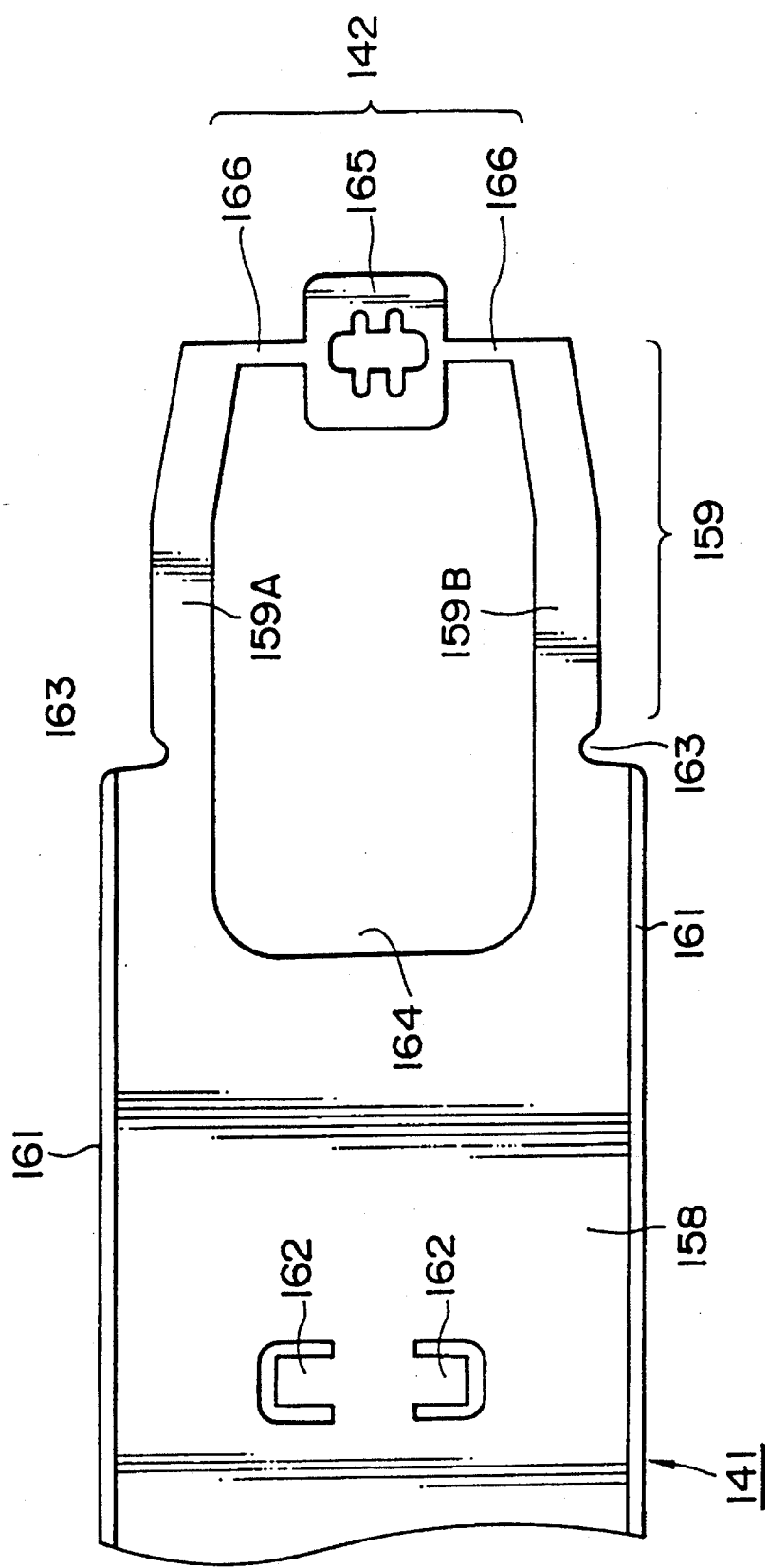
FIG. 53 is a partial plan view showing a further form of the leaf spring member of the magnetic head of FIG. 36.

FIG. 53 shows another modified leaf spring member 141 wherein no half etching is applied and the gimbal portions 166 are formed with an equal thickness to that of the other portions but with a comparative small width and a comparatively greater length so as to facilitate a torsional operation at the gimbal portions 166.

Figure 54:
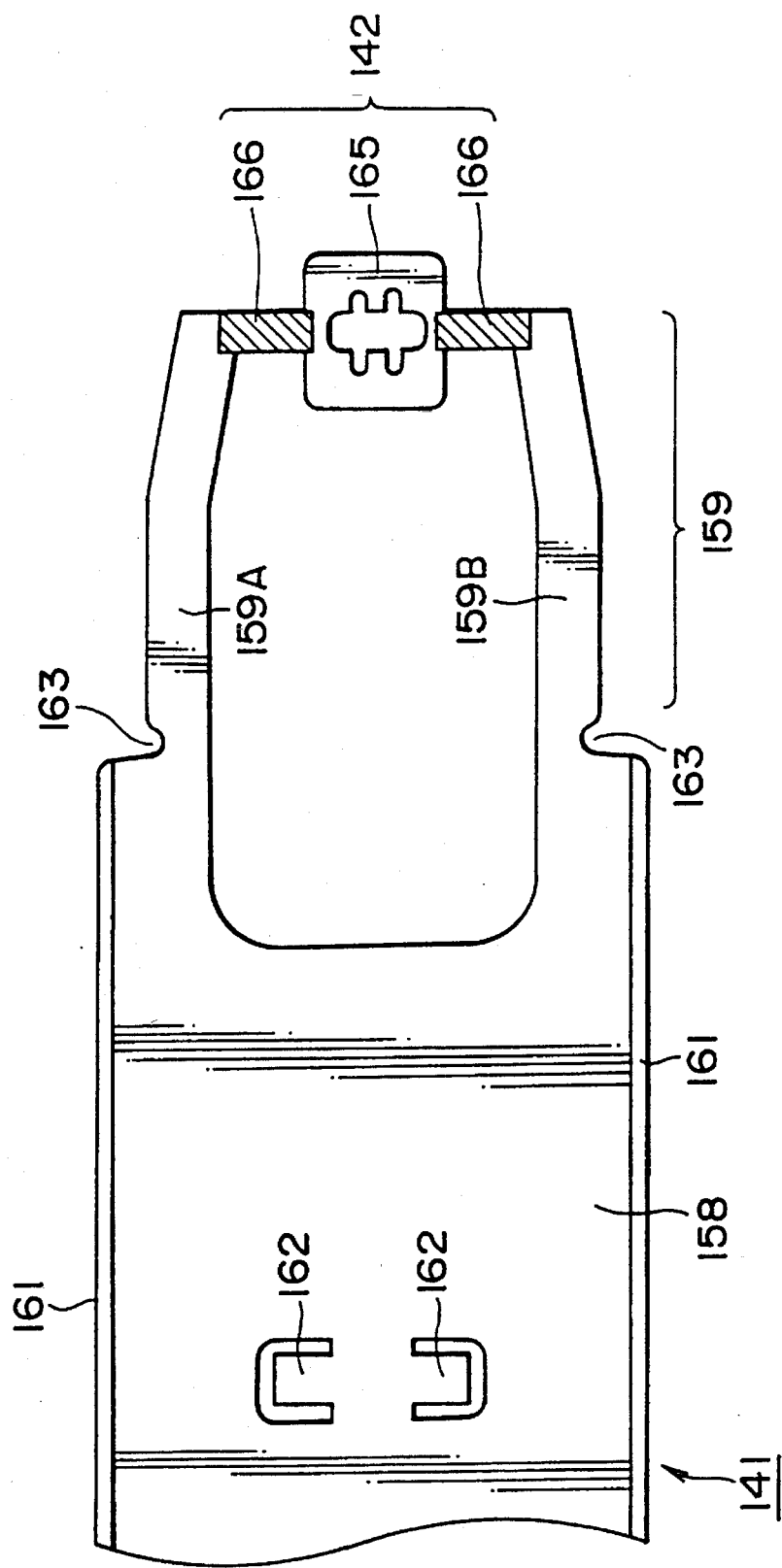
FIG. 54 is a partial plan view showing a still further form of the leaf spring member of the magnetic head of FIG. 36.

FIG. 54 shows a further modified leaf spring member 141 wherein only the gimbal portions 166 are half etched to reduce the thickness to facilitate a torsional operation there.

Figure 55:
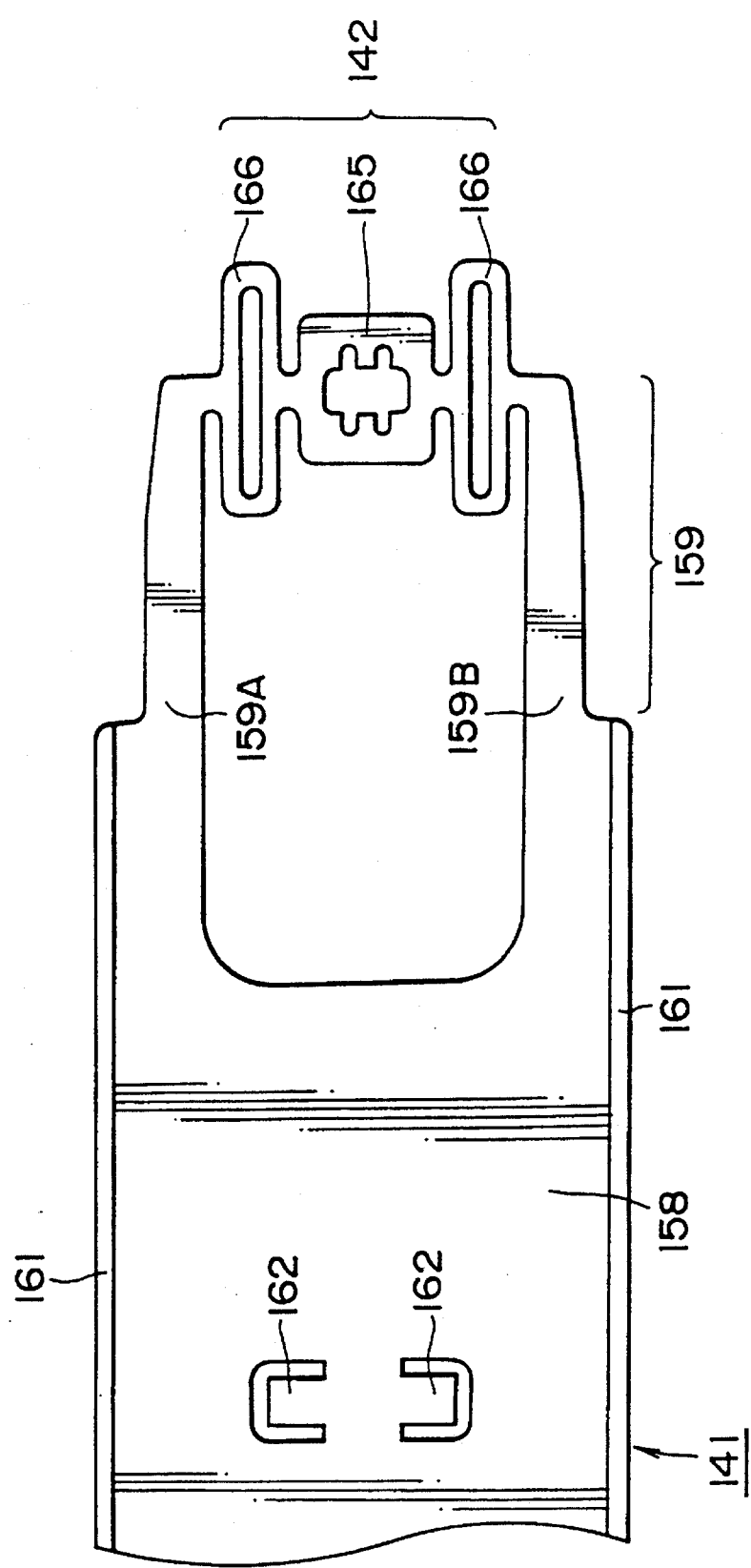
FIG. 55 is a partial plan view showing a yet further form of the leaf spring member of the magnetic head of FIG. 36.

FIG. 55 shows a still further modified leaf spring member 141 wherein the gimbal portions 166 are each formed into an elongated ring extending in the longitudinal direction of the spring portions 159A and 159B of the leaf spring member 141.

Figure 56:
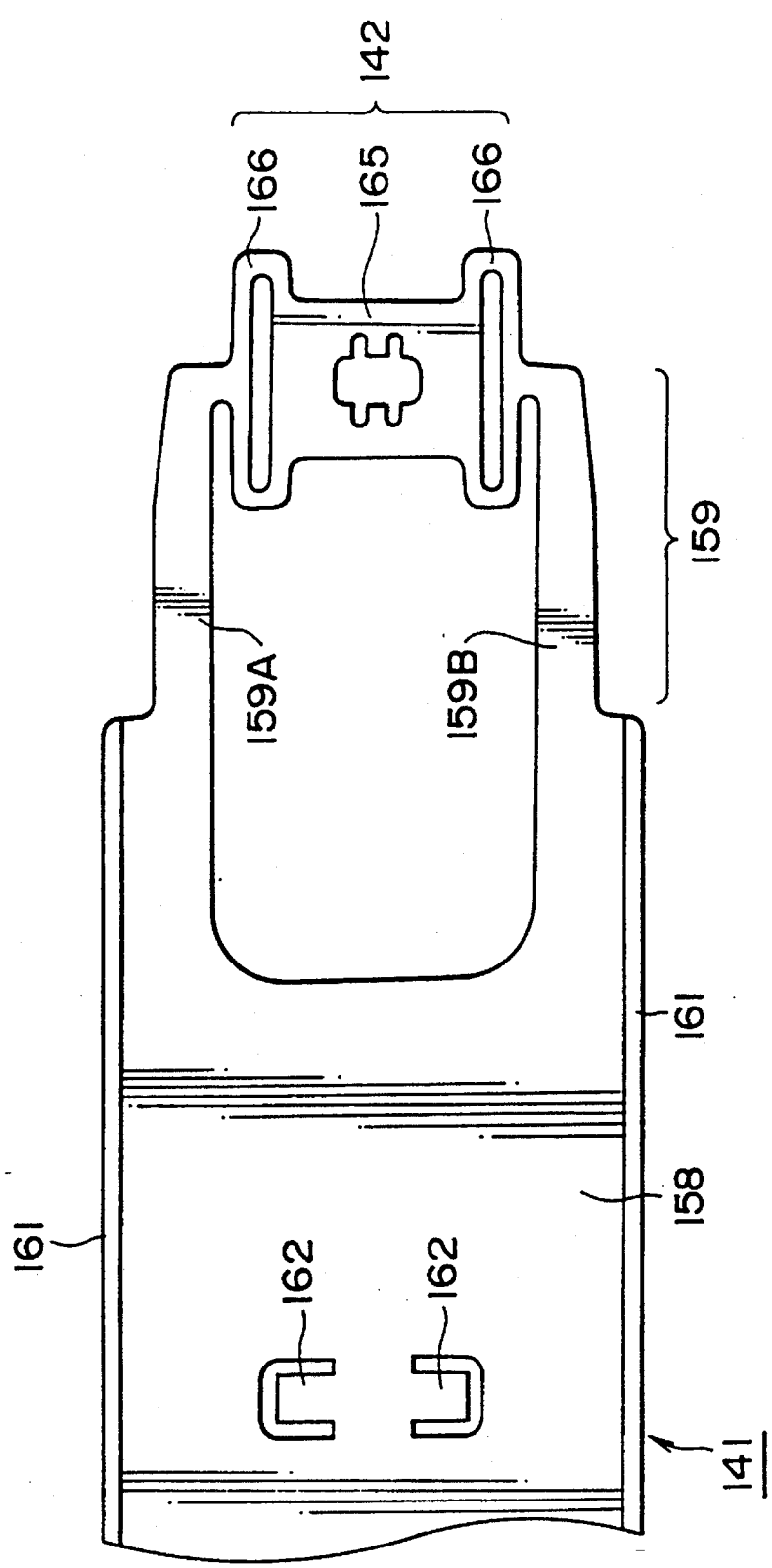
FIG. 56 is a similar view but showing a yet further form of the leaf spring member of the magnetic head of FIG. 36.

FIG. 56 shows a yet further modified leaf spring member 141 which is a modification to the modified leaf spring member 141 shown in FIG. 55 in that the gimbal portions 166 in the form of elongated rings and the mounting portion 165 are formed integrally with each other, that is, the mounting portion 165 is extended and a pair of elongated holes are formed at the opposite end portions of the mounting portion 165 to form the gimbal portions 166 in the form of elongated rings. A torsional operation can be facilitated also with the construction of the leaf spring member 141.

Figure 57:
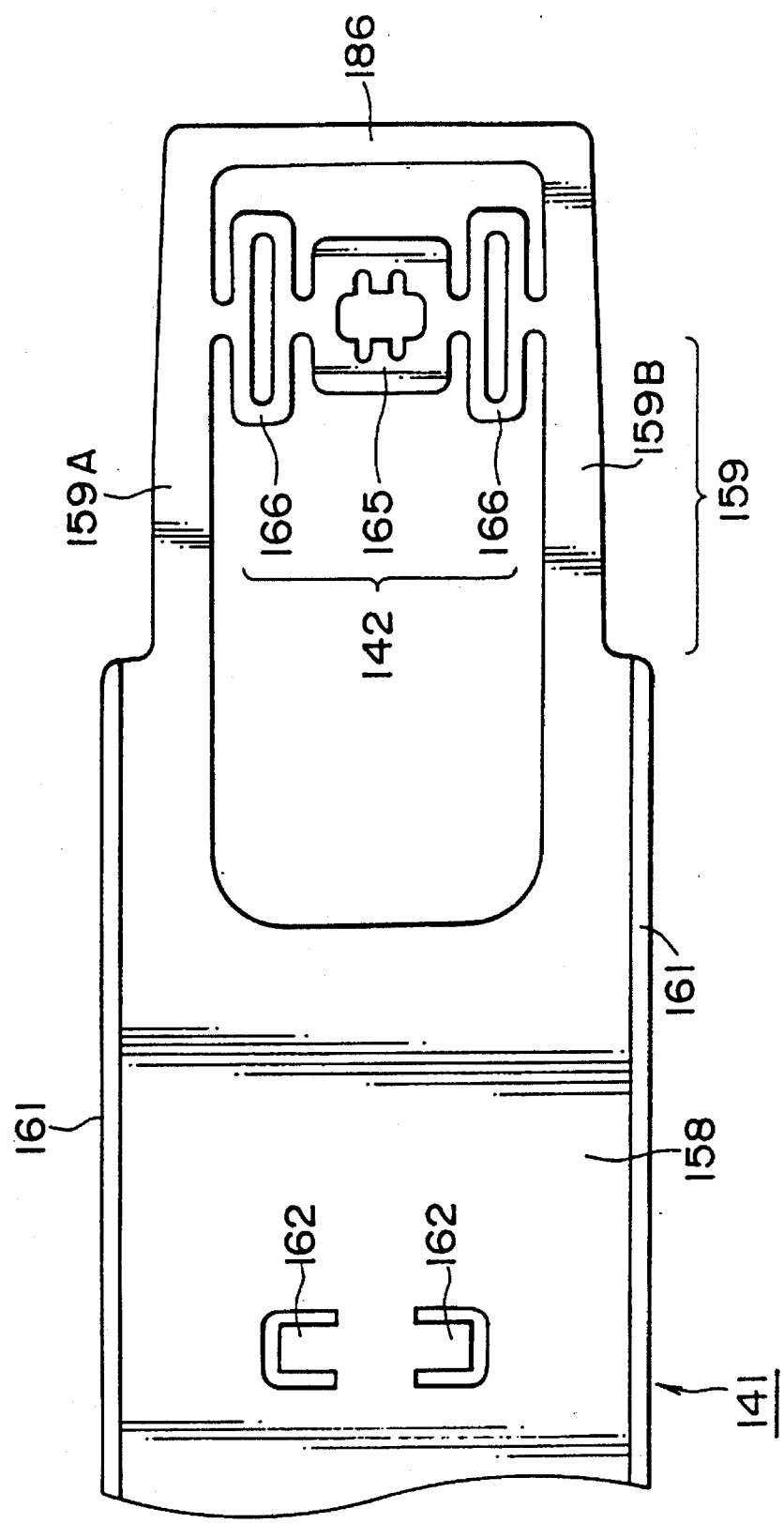
FIG. 57 is a similar view but showing a yet further form of the leaf spring member of the magnetic head of FIG. 36.

FIG. 57 shows a yet further modified leaf spring member 141 which is another modification to the modified leaf spring member 141 shown in FIG. 55 in that the gimbal portions 166 in the form of elongated rings are formed and a reinforcing bridge 186 is provided such that it surrounds the gimbal portions 166 and the mounting portion 165 in order to strengthen the rigidity of the portion of the leaf spring member 141 at and around the gimbal 142.

Figure 58:
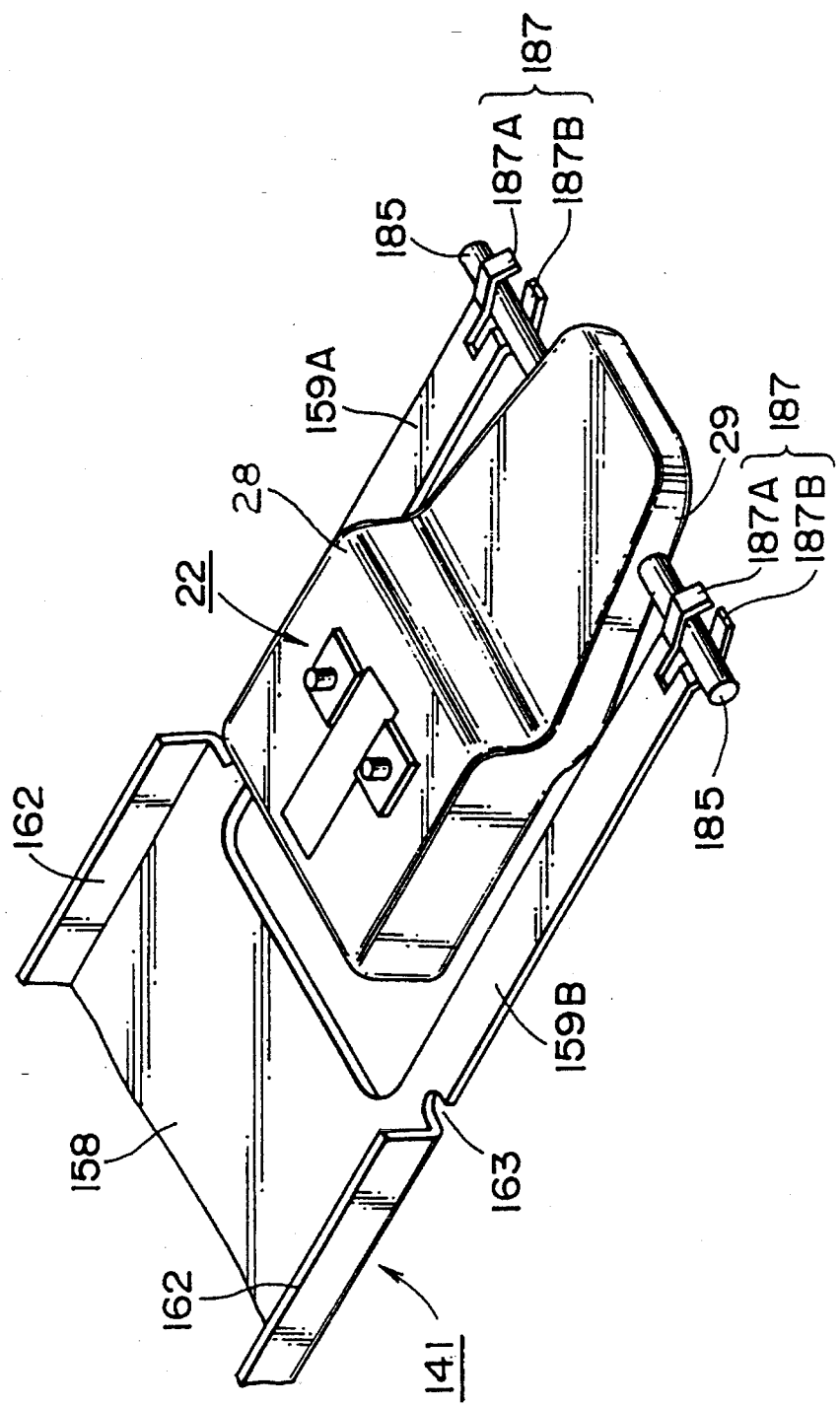
FIG. 58 is a perspective view of part of a yet further sliding type magnetic head for magneto-optical recording showing a yet further preferred embodiment of the present invention.

Referring now to FIG. 58, there is shown a sliding type magnetic head for magneto-optical recording according to a yet further preferred embodiment of the present invention. In the magnetic head of the present embodiment, in place of a gimbal, a pair of shafts 185 are insert molded on the opposite sides of a sliding portion 29 of a slider 28 and two spring portions 159A and 159B of a second spring portion 159 of a leaf spring member 141 are supported for pivotal motion on the shafts 185. The mounting method may be such that, for example, as shown in FIG. 58, each of the spring portions 159A and 159B is bifurcated at an end 187 thereof into a pair of pieces 187A and 187B, which hold a corresponding one of the shafts 185 from above and from below, respectively. Also where a head body 22 is supported for pivotal motion at the spring portions 159A and 159B of the second spring portion 159 of the leaf spring member 141, the head body 22 can follow up a surface $1a$ of a disk 1 within the tolerance of lateral deflection of the disk 1 out of its plane.

Figure 59A:
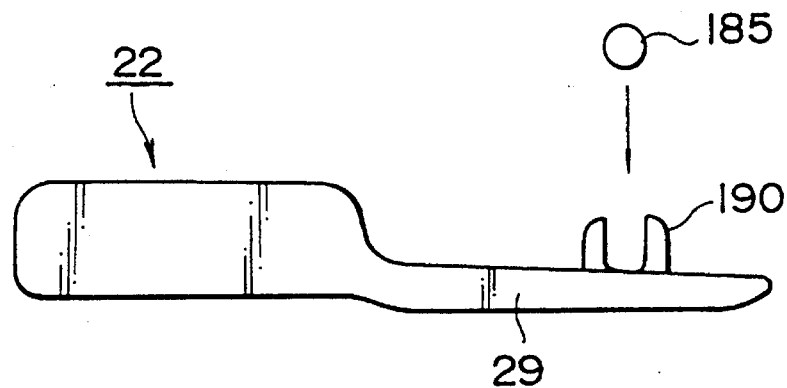
FIGS. 59A and 59B are schematic side elevational views of a yet further sliding type magnetic head for magneto-optical recording showing a yet further preferred embodiment of the present invention and illustrating different steps of an assembling process of the magnetic head.
Figure 59B:
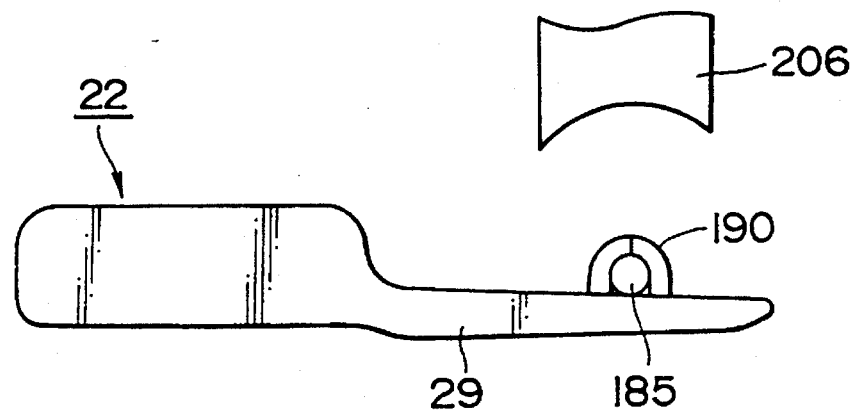

Another pivotally supporting method may be employed alternatively. For example, referring to FIGS. 59A and 59B, a pair of engaging projections 190 are formed integrally on an upper face of a sliding portion 29 of a head body 22 and a shaft 185 is fitted between the projections 190, and then the projections 190 are welded to each other so as to surround the shaft 185 by means of ultrasonic welding means 206 as seen from FIG. 59B to support the shaft 185 for pivotal motion thereon. Further, while, at the inclined portion 158 of the leaf spring member 141, the opposite side portions are bent perpendicularly to form the pair of ribs 16 to strengthen the rigidity of the inclined portion 158 as shown in FIG. 43 or 60A in order to isolate the first spring portion 157 for coping with lateral deflection of the disk out of its plane and the second spring portion 159 for coping with a bump from each other, a pair of riser portions 161 may otherwise be provided on the opposite side portions of the inclined portion 158 by drawing as shown in FIG. 60B.

Figure 61:
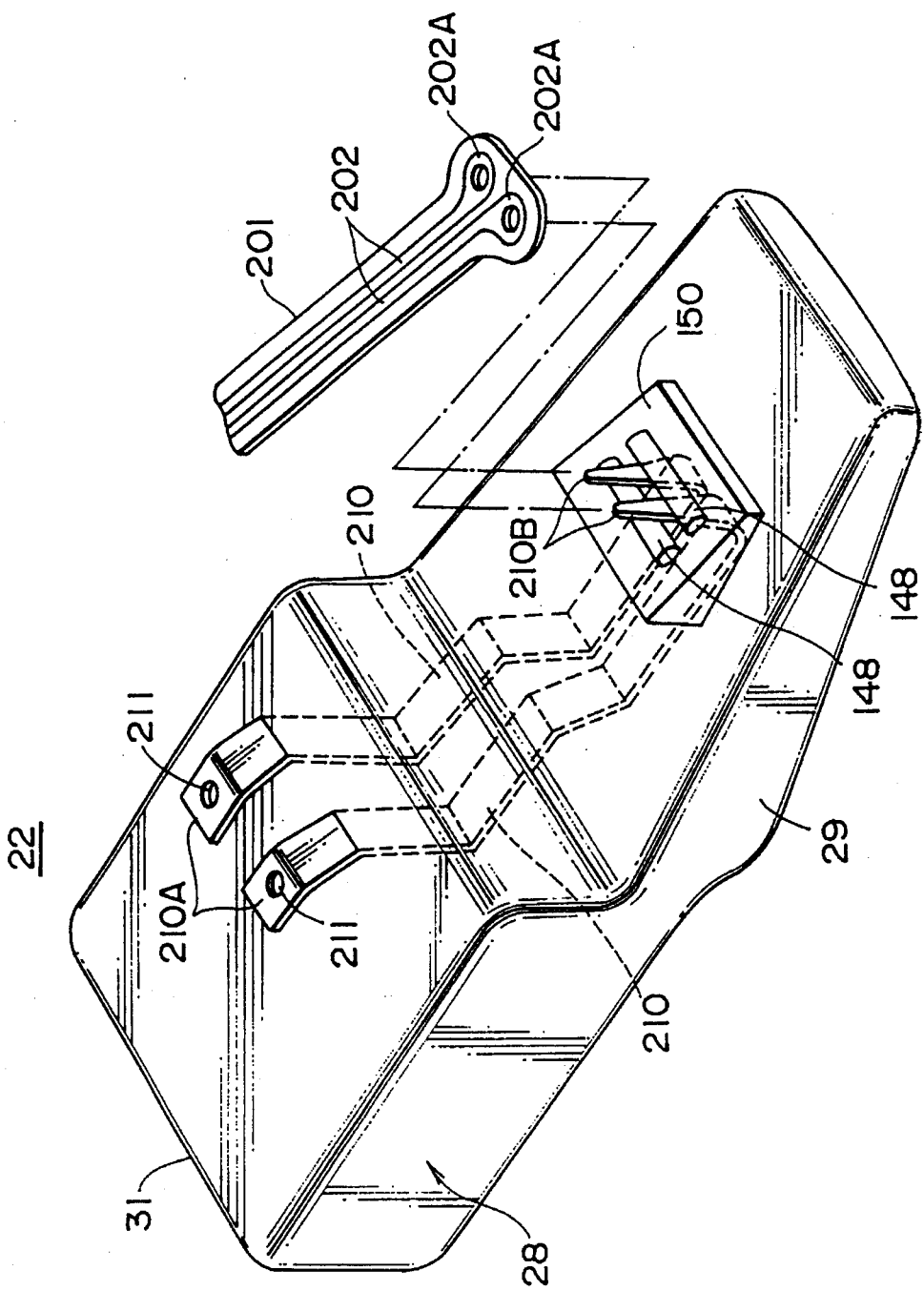
FIG. 61 is a perspective view illustrating another connection between a head body and a flexible circuit board.
Figure 62:
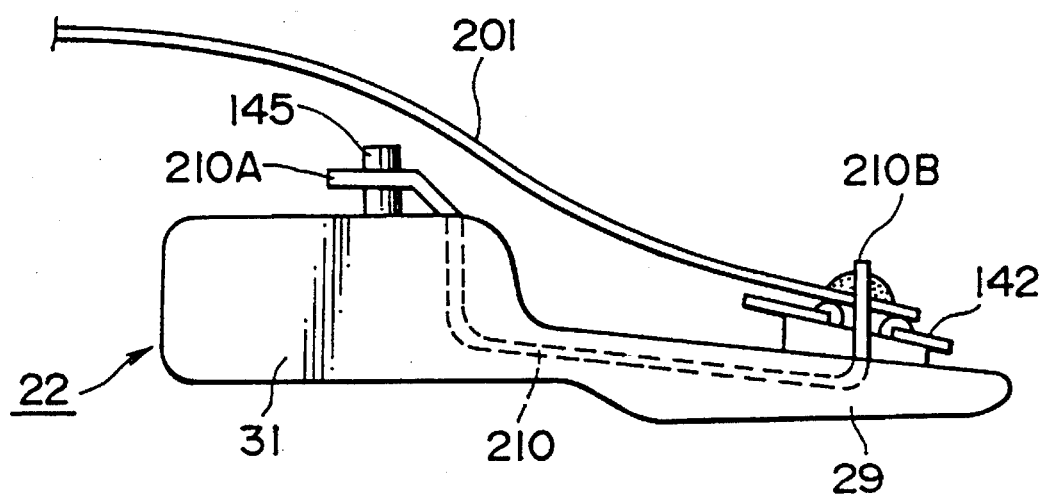
FIG. 62 is a front elevational view of the head body to which the flexible circuit board of FIG. 61 is connected.

Referring now to FIGS. 61 and 62, there is shown a sliding type magnetic head for magneto-optical recording according to a yet further preferred embodiment of the present invention. The magnetic head of the present embodiment is improved in connection of a flexible circuit board.

In the magnetic head of the present embodiment, a pair of conductor members 210 are insert molded in advance in a slider 28 constituting a head body 22 such that they extend from a mounting portion 31, at which a head element 27 is to be mounted, to a pair of mounting portions 148 on an upper face of a sliding portion 29 of the slider 28. An end 210A of each of the conductor members 210 is led out from the mounting portion 31 and has a terminal pin insertion hole 211 formed at a location thereof corresponding to one of a pair of bobbin terminal pins 145. The other end 210B of each of the conductor members 210 is led out through a base seat 150 on the upper face of the sliding portion 29. The mounting portions 148 of the base seat 150 are formed such that they are separate from each other on the opposite sides of the other ends 210B of the conductor members 210.

Figure 63A:
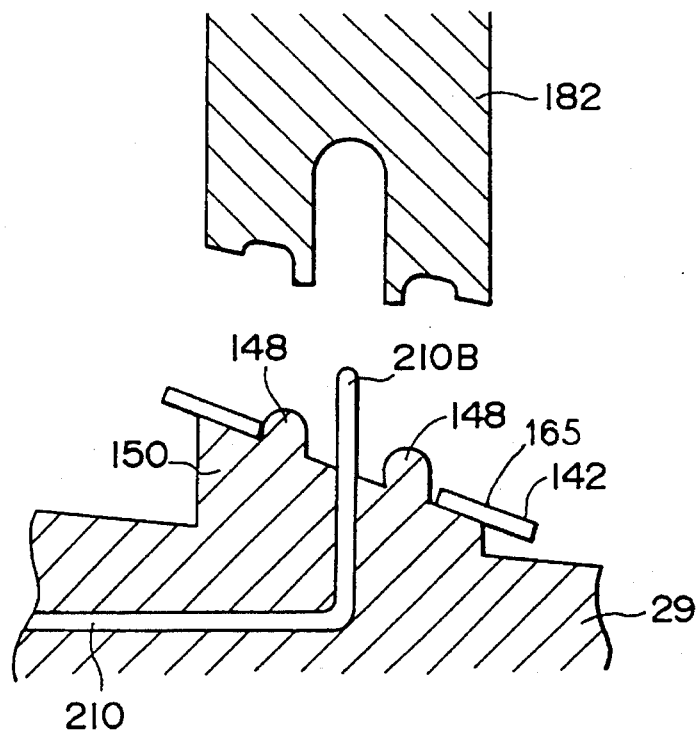
FIGS. 63A and 63B are schematic sectional views showing different steps of a connecting process between the flexible circuit board and the head body of FIG. 61.
Figure 63B:
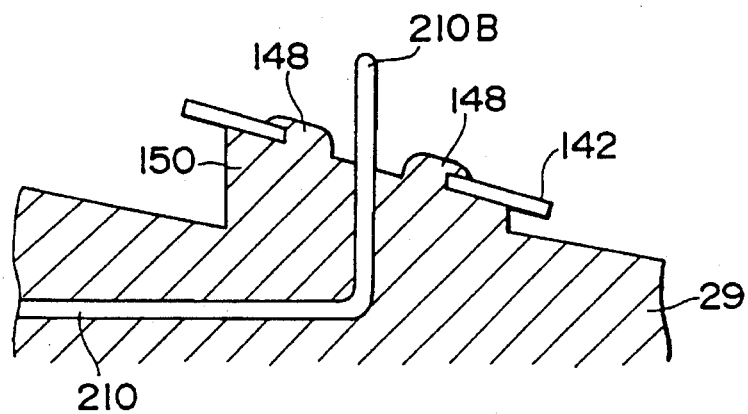

Then, a mounting portion 165 of a gimbal 142 is engaged with the mounting portions 148 of the sliding portion 29 of the slider 28 as shown in FIG. 63A, and the mounting portions 148 and the gimbal mounting portion 165 are welded to each other as shown in FIG. 63B by ultrasonic welding means 182 shown in FIG. 63A. Then as shown in FIG. 61, land portions 202A of a flexible circuit board 201 are fitted with and soldered to the terminals 210B of the conductor members 210 led out to the outside of upper faces of the mounting portions 148 of the sliding portion 29. Meanwhile as shown in FIG. 62, the bobbin terminal pins 145 are inserted into the holes 211 of and soldered to the terminals 210A of the conductor members 210 led out to the mounting portion 31 side of the head element 27.

By soldering the flexible circuit board 20 at the gimbal 142 and the mounting portions 148 in this manner, the influence of the rigidity of the flexible circuit board 201 can be reduced comparing with that of FIG. 36, and a static posture of the head body 22 can be maintained.

In the magnetic head shown in FIGS. 36 and 37, lateral deflection (by an amount of, for example, ±0.7 mm) of the disk 1 out of its plane is absorbed at the first spring portion 157 of the leaf spring member 141. Here, if the leaf spring member 141 is formed so as to extend linearly from the mounting portion 156, if the disk 1 is deflected laterally by +0.7 mm from its reference position $Z_0$ (to a deflected position $Z_1$) as diagrammatically shown in FIG. 64, then the leaf spring member 141 is pivoted in the counterclockwise direction in FIG. 64 around its fulcrum $m_0$ so that the head element 27 (particularly the center magnetic pole core 25A) at the end thereof is displaced to another radially outer position $n_1$ from its reference position $n_0$.

Figure 64:
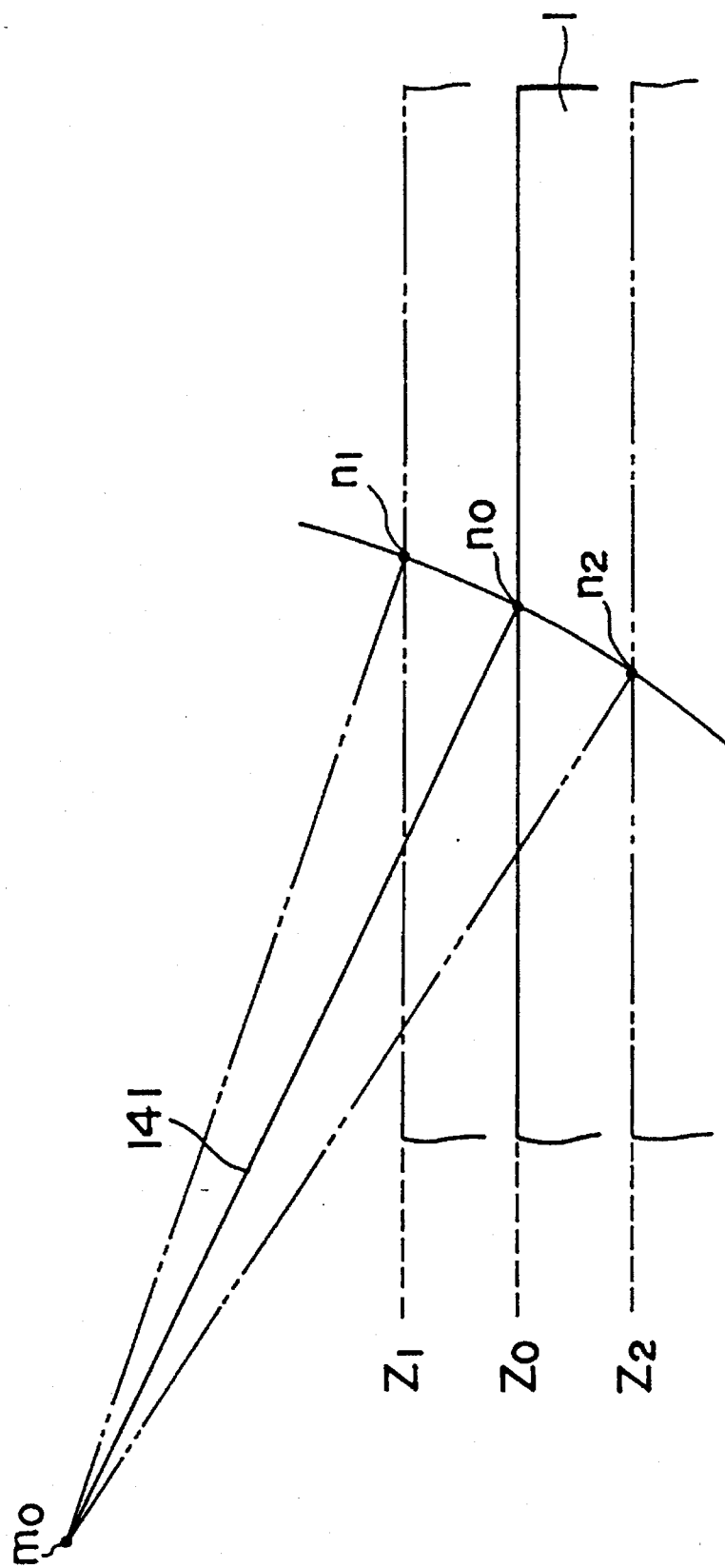
FIG. 64 is a diagrammatic view illustrating a problem when a magnetic disk is deflected laterally out of its plane.

On the contrary if the disk 1 is deflected laterally by −0.7 mm to another deflected position $Z_2$, then the leaf spring member 141 is pivoted in the clockwise direction in FIG. 64 around the fulcrum $m_0$ so that the center magnetic pole core 25A at the end thereof is displaced to another radially inner position $n_2$ from its reference position $n_0$. The displacement of the center magnetic pole core 25A by the lateral deflection of the disk 1 makes it unavoidable to increase the magnetic field insuring region by magnetic fluxes from the head element 27, resulting in increase of the power dissipation.

Figure 65:
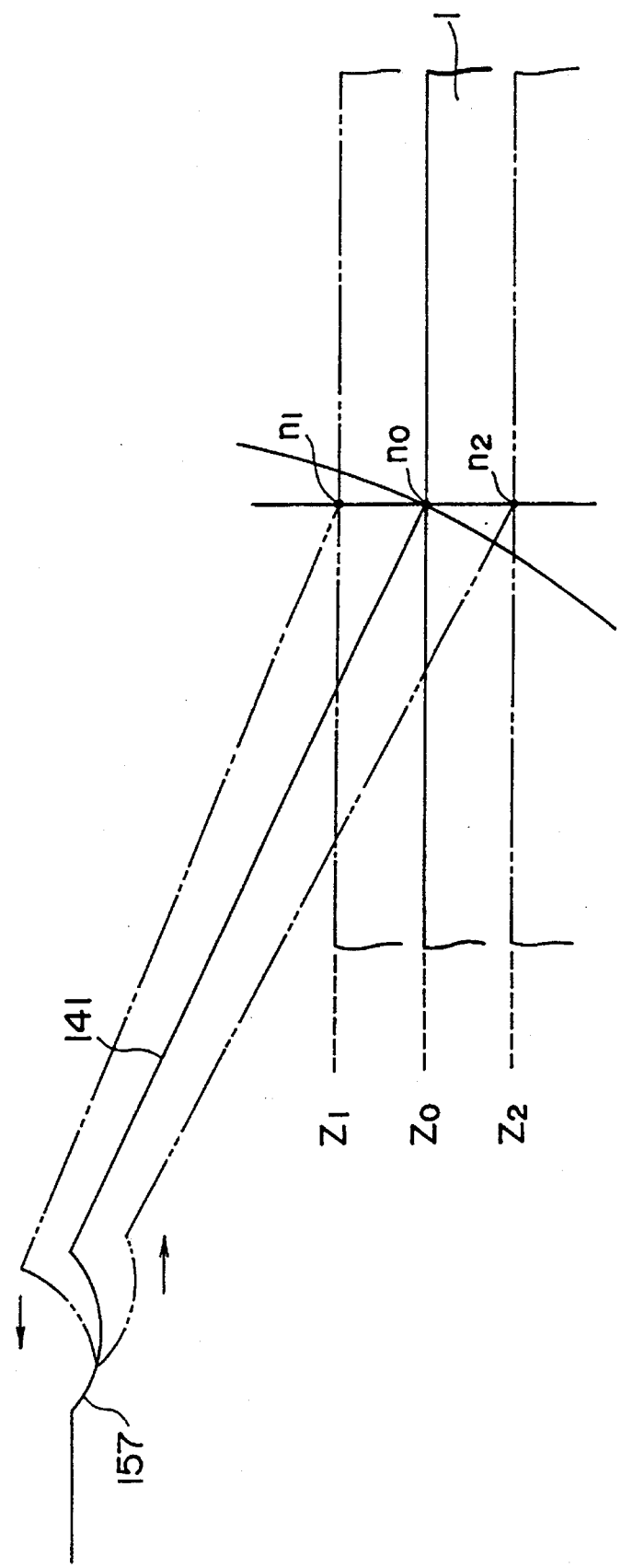
FIG. 65 is a similar view but illustrating operation of a magnetic head according to the present invention which solves the problem illustrated in FIG. 64.

With the magnetic head of the present embodiment, however, since the first spring portion 157 of the leaf spring member 141 is formed in a curved configuration such that it is convex toward the disk 1 side, when the disk 1 is deflected laterally by +0.7 mm as seen in FIG. 65, the first spring portion 157 is deformed so as to increase the curvature of its curve to decrease its dimension. Consequently, the displacement of the head element 27 from the reference position $n_0$ to the displaced position $n_1$ shown in FIG. 64 is offset or cancelled by the deformation of the first spring portion 157.

On the contrary when the disk 1 is deflected by −0.7 mm, the first spring portion 157 is deformed so as to decrease the curvature of its curve to increase its dimension as seen from FIG. 65. Consequently, the displacement of the head element 27 from the reference position $n_0$ to the displaced position $n_2$ shown in FIG. 64 is offset or cancelled by the deformation of the fist spring portion 157.

Accordingly, the position of the center magnetic pole core 25A of the head element 27 presents little or a little displacement upon deflection of the disk 1 by ±0.7 mm or less.

Accordingly, the magnetic field insuring region by the head element 27 can be minimized and the power dissipation of the magnetic head can be reduced. Here, if a deformed condition is considered when the first spring portion 157 is merely deformed, for example, when the spring portion 157 is deflected laterally by +0.7 mm, a portion of the spring portion 157 adjacent the head body 22 with respect to the center of the deformation presents a contracted condition while the other portion on the fixed side presents an extended condition, and accordingly, the effect is deteriorated.

Figure 66A:
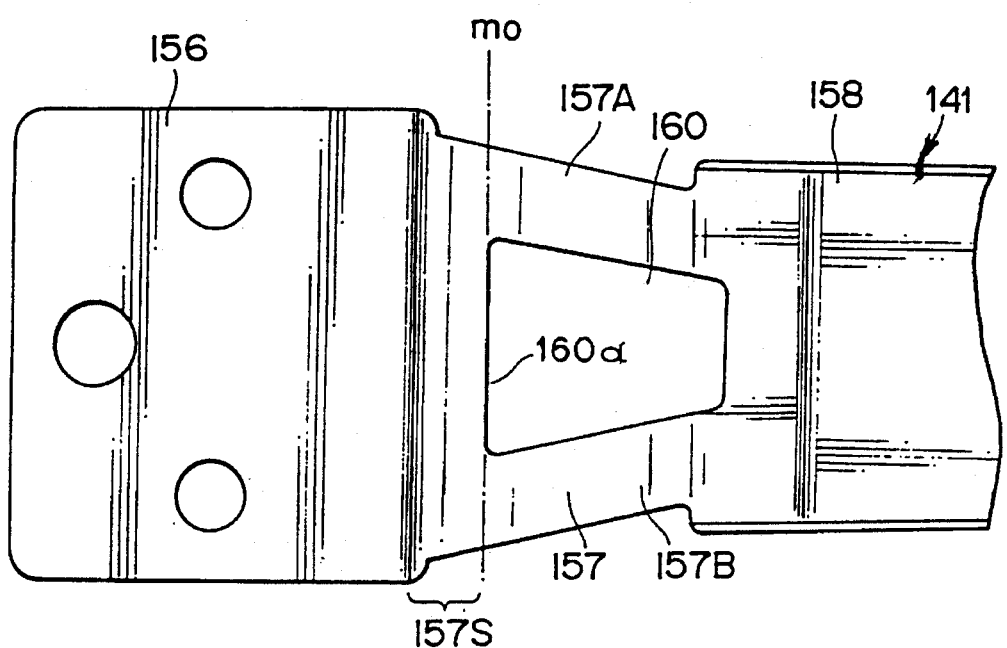
FIGS. 66A and 66B are a plan view and a front elevational view, respectively, showing part of a yet further form of the leaf spring member of the magnetic head of FIG. 36
Figure 66B:
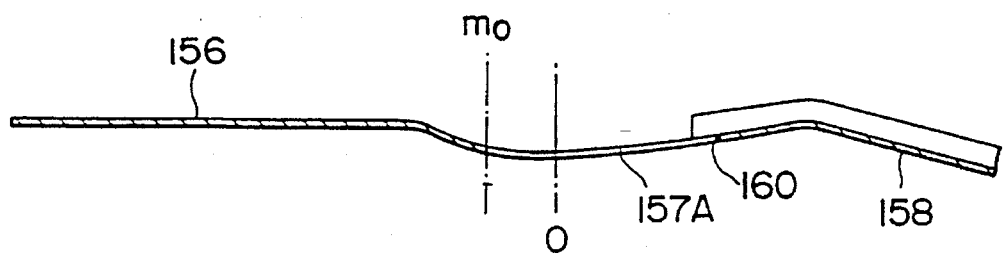

In the magnetic head of the present embodiment, as shown in FIG. 66A and 66B, the first spring portion 157 of the leaf spring member 141 has an opening 160 formed therein such that an opening end edge 160a is located in the proximity of the center O and a portion 157S between the opening end edge 160a and the mounting portion 156 is formed as a rigid portion so that the opening end edge 160a serves as a bending fulcrum $m_0$ for the leaf spring member 141 upon lateral deflection of the disk 1. Accordingly, the variation of the curved configuration at the first spring portion 157 illustrated in FIG. 65 is obtained, and the effect of displacement by the first spring portion 157 is enhanced.

Figure 67:
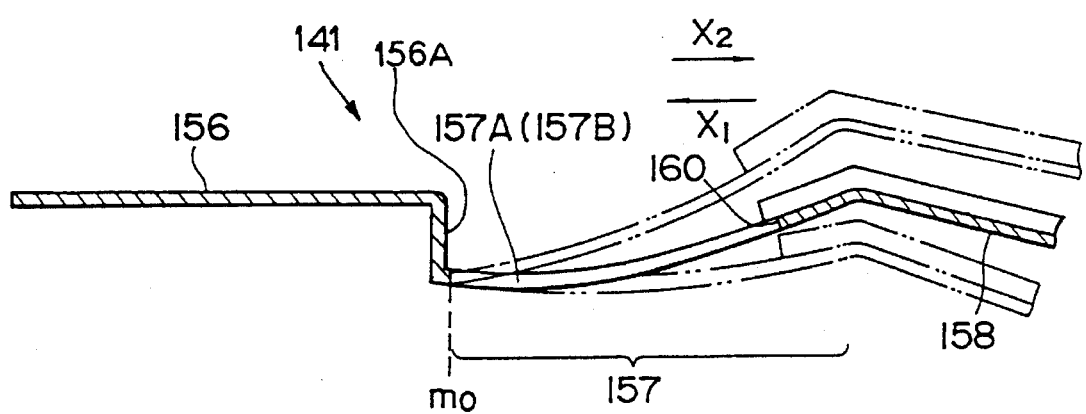
FIG. 67 is a sectional view showing part of a yet further form of the leaf spring member of the magnetic head of FIG. 36.

FIG. 67 shows a modification to the first spring portion 157 of the leaf spring member 141. In the leaf spring member 141 shown, the mounting portion 156 is bent perpendicularly downwardly to form a bent portion 156A, and the bottom end of the bent portion 156A of the mounting portion 156 serves as a bending fulcrum $m_0$ for the first spring portion 157. The first spring portion 157 first extends obliquely upwardly from the bottom end of the mounting portion 157 to form a pair of side plate portions 157A and 157B with an opening 160 defined therebetween and then extends a little obliquely downwardly to form an inclined portion 158. The side plate portions 157A and 157B may extend in a little curved configuration. In this instance, since the bent portion 156A of the mounting portion 156 is a rigid portion and the bottom end thereof serves as the bending fulcrum $m_0$, the first spring portion 157 is deformed in the direction indicated by an arrow mark $X_1$ by lateral deflection of the disk 1 by +0.7 mm, but is deformed in the direction indicated by another arrow mark $X_2$ by lateral deflection of the disk by −0.7 mm. Consequently, the object described above is achieved.

Figure 72:
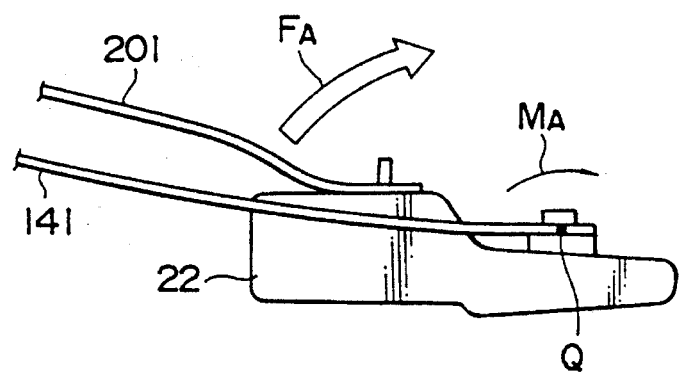
FIG. 72 is a schematic side elevational view illustrating a problem of a head body of a magnetic head.

By the way, while, with the magnetic head described hereinabove with reference to FIG. 36, the flexible circuit board 201 provided independently on the leaf spring member 141 extends along the leaf spring member 141 and is connected to the terminal pins 145 on the head body 22 side, in this instance, there is the possibility that the head body 22 may be acted upon as shown in FIG. 72 by an angular moment $M_A$ around the fulcrum Q caused by a reactive force $F_A$ of the flexible circuit board 201 secured to the head body 22 and the angular moment $M_A$ may have a bad influence upon the posture of the head body 22.

Further, there is the possibility that a bimetal effect arising from a difference in coefficient of linear expansion between the materials of the flexible circuit board 201 and the leaf spring member 141 may take place. Therefore, designing must necessarily be performed taking the influence of the flexible circuit board into consideration.

Further, in order to minimize the reactive force of the flexible circuit board 201, a flexible circuit board having a further reduced thickness must be used as the flexible circuit board 201. In this instance, there are various problems that the wiring line resistance of the flexible circuit board increases and that the flexible circuit board is thin, difficult to handle and difficult in assembly.

Figure 68:
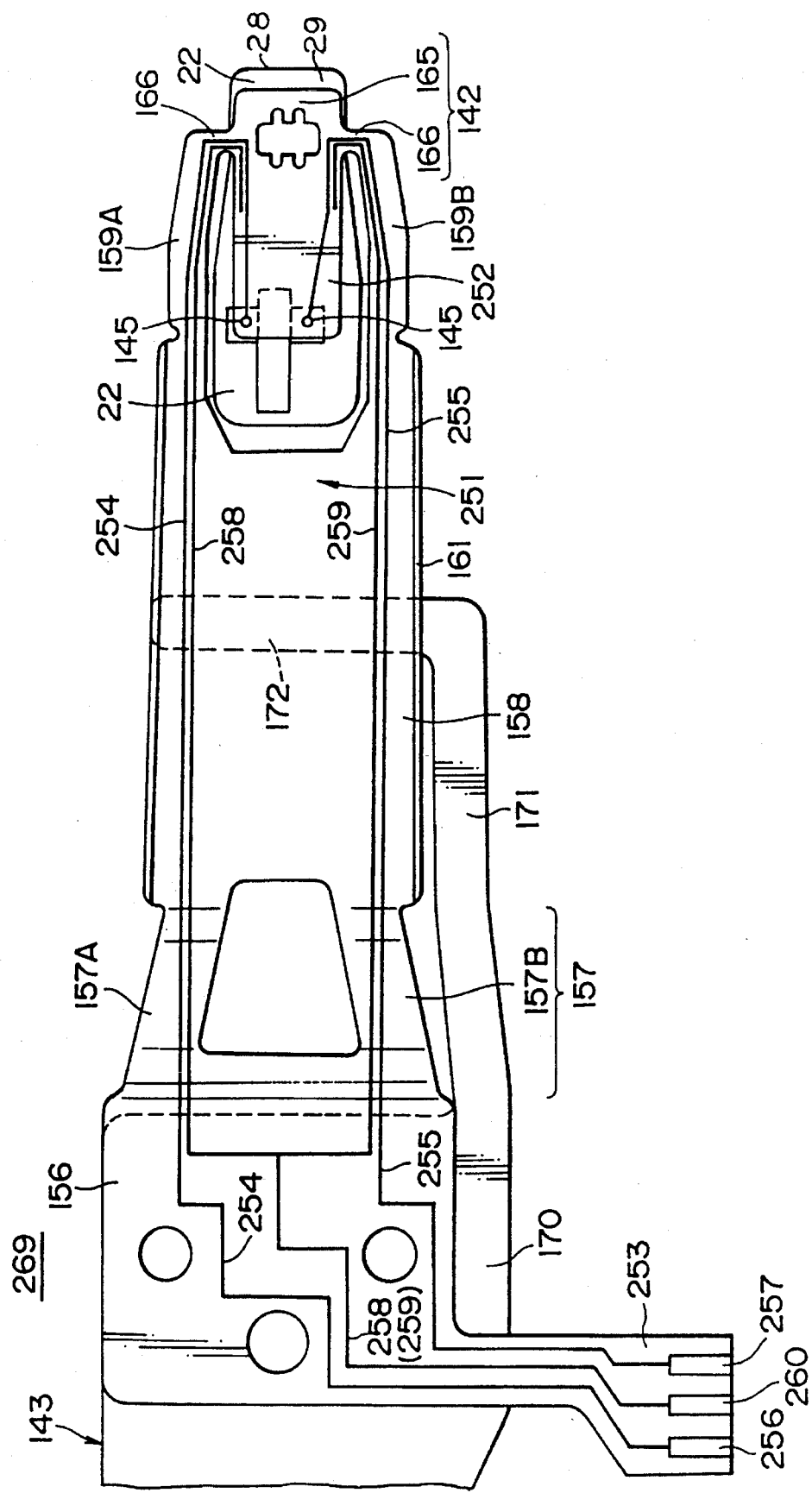
FIG. 68 is a plan view of a yet further sliding type magnetic head for magneto-optical recording showing a yet further preferred embodiment of the present invention.
Figure 69:
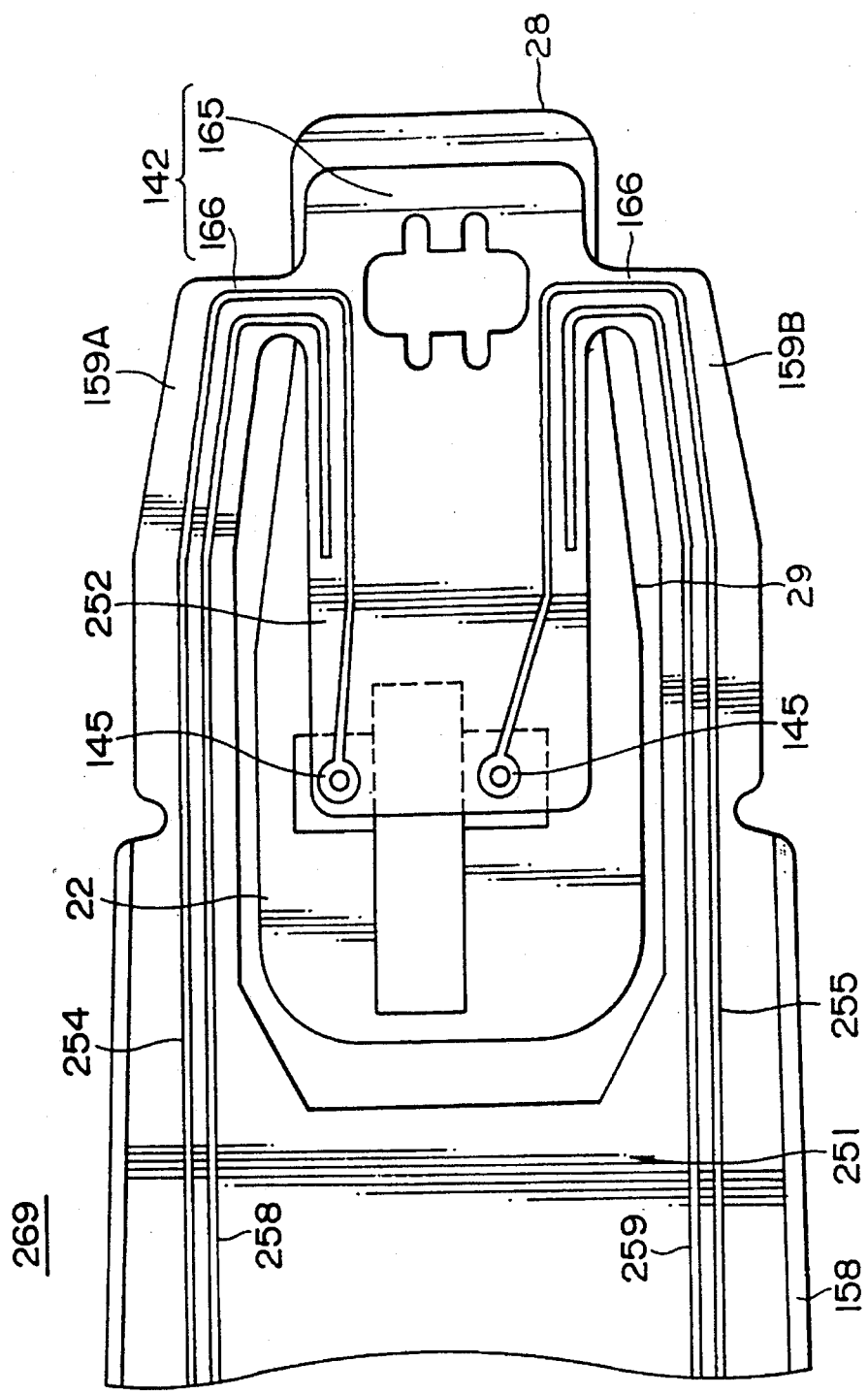
FIG. 69 is an enlarged plan view of part of the magnetic head of FIG. 68.

FIGS. 68 and 69 show a sliding type magnetic head for magneto-optical recording according to a yet further preferred embodiment of the present invention which is improved in those points. Referring to FIGS. 68 and 69, the magnetic head 269 includes a head body 22, a thin leaf spring member 251 for biasing the head body 22 to resiliently press a sliding portion 29 of a slider 28 of the head body 22 against a surface 1a of a disk 1, and a fixing member or head arm 143 on which the leaf spring member 251 is mounted. The head body 22 is mounted on a gimbal 142 at an end of the leaf spring member 251, and the other end of the leaf spring member 251 is mounted on the fixing member 143.

It is to be noted that portions of the head body 22, the fixing member 143 and the leaf spring member 251 which correspond to those of FIG. 36 are denoted by like reference numerals and overlapping description thereof is omitted herein to avoid redundancy.

Figure 70:
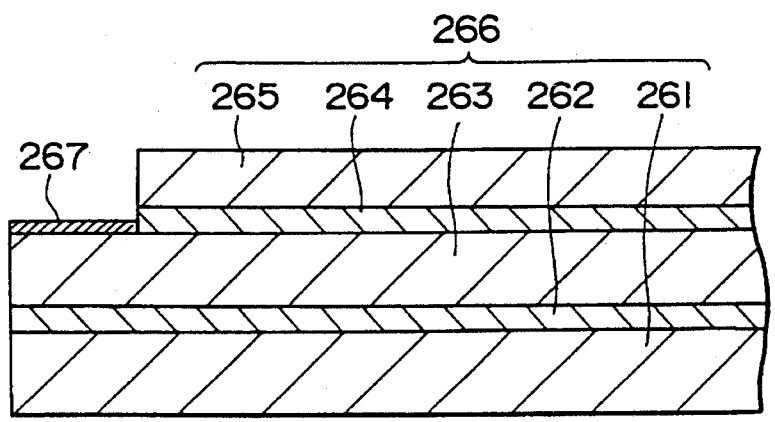
FIG. 70 is an enlarged sectional view of a leaf spring member of the magnetic head of FIG. 68.

In the magnetic head of the present embodiment, particularly the leaf spring member 251 is formed such that it serves also as a flexible circuit board. In particular, the leaf spring member 251 may be formed, for example, as shown in FIG. 70, from a laminate 266 including a base film 261 made of an insulating material such as, for example, polyimide and having the thickness of 75 μm, a copper foil layer 263 having the thickness of 70 μm and applied to the base film 261 with a bonding agent layer 262 of the thickness of 20 μm interposed therebetween, and a cover lay film 265 of the thickness of 50 μm made of, for example, polyimide and applied to the copper foil layer 263 with another bonding agent layer 264 of the thickness of 20 μm interposed therebetween.

The copper foil layer 263 is patterned to form a pair of wiring lines 254 and 255, as shown in FIGS. 68 and 69, connecting to the pair of respective terminal pins 145 of the head body 22.

The leaf spring member 251 is formed such that it has a first spring portion 157, an inclined portion 158, a second leaf spring portion 159 including a pair of spring portions 159A and 159B extending in parallel to each other with a spacing 164 left therebetween, a head mounting portion 165 and a gimbal 142 which includes a pair of gimbal portions 166 in the form of strings, similarly to the leaf spring member 141 described hereinabove. The leaf spring member 251 further includes a first terminal extension 252 extending from the head mounting portion 165 to the terminal pins 145 of the head body 22, and a second terminal extension 253 extending from a side of the mounting portion 156 of the fixing member 143. Consequently, the configuration of the leaf spring member 251 is quite similar to that of the leaf spring member 141 described hereinabove except the first and second terminal extensions 252 and 253.

Each of the wiring lines 254 and 255 extends at an end thereof to the end of the first terminal extension 252, and a perforation of a rounded portion thereof is fitted with the corresponding terminal pin 145 with the rounded portion electrically connected to the terminal pin 145 by soldering or like means. The other end of each of the wiring lines 254 and 255 extends to the end of the second terminal extension 253. A plated layer 267 of, for example, gold is applied to the other end of each of the wiring lines 254 and 255 as shown in FIG. 70 and is led out as a positive terminal 256 or a negative terminal 257 as shown in FIGS. 68 and 69. It is to be noted that the first terminal extension 252 may otherwise be formed to have a bifurcated configuration corresponding to the wiring lines 254 and 255 in pair.

Here, the wiring lines 254 and 255 are formed such that they extend substantially in a symmetrical relationship to each other along the opposite sides of the leaf spring member 251. In particular, the wiring line 254 is formed along one of the gimbal portions 166, the spring portion 159A of the second spring portion 159, one side of the inclined portion 158 and the side plate portion 157A of the first spring portion 157. On the other hand, the other wiring line 255 is formed along the other gimbal portion 166, the spring portion 159B of the second spring portion 159, the other side of the inclined portion 158 and the other side plate portion 157B of the first spring portion 157.

Where the wiring lines 254 and 255 are disposed on the opposite sides of the leaf spring member 251, the balance of the resiliency of the leaf spring member 251 can be maintained.

Further, in the magnetic head of the present embodiment, in order to prevent electrostatic noise which may be produced from the wiring lines 254 and 255, the copper foil layer 263 is patterned so that a pair of grounding wiring lines 258 and 259 for electrostatic shielding to which the ground potential is to be applied are formed adjacent and along the wiring lines 254 and 255 connecting to the terminal pins 145 of the coil and a ground terminal 260 plated with gold and common to the grounding wiring lines 258 and 259 is led out. With the leaf spring member 251 of the construction just described, shaping of the spring portions 157 and 159, the inclined portion 158, the ribs 161 and so forth can be performed by means of a heat press.

With the magnetic head 269 described above, the leaf spring member 251 itself serves also as a flexible circuit board having thereon the wiring lines 254 and 255 electrically connecting to the terminal pins 145, and accordingly, the flexible circuit board 201 of a separate member described above can be omitted and the angular moment by the flexible circuit board 201 described above is eliminated. Consequently, the posture of the head body 22 can be maintained well.

Further, since the flexible circuit board 201 is eliminated, the bimetal effect described above can be prevented.

The laminate 266 in the magnetic head of the present embodiment has resiliency of the same condition as that of a leaf spring member of SUS304 having the thickness of 30 μm, and a spring pressure of 0.4 to 0.6 gf can be obtained. Accordingly, the laminate 266 functions sufficiently as a leaf spring member.

Further, since the leaf spring member 251 serves also as a flexible circuit board, the wiring lines 254 and 255 can be formed with a comparatively great line width. For example, the line width of 0.6 mm can be obtained, and the wiring resistance can be reduced to a low value of 0.05 Ω. This will result in reduction of the power dissipation.

Furthermore, with the magnetic head of the present embodiment, since the grounding wiring lines 258 and 259 to which the grounding potential is to be applied are formed in the proximity of and along the wiring lines 254 and 255, respectively, electric noise which may otherwise be produced from the wiring lines 254 and 255 can be prevented.

It is to be noted that, while, in the magnetic head of the embodiment described above, a polyimide film is employed as the base film 261 constituting the leaf spring member 251, some other high molecular resins, high molecular resins containing a filler therein, inorganic insulating materials such as mica and so forth can alternatively be employed for the film 261.

Further, while, in the magnetic head of the embodiment described above, the fixing member 143 is made of a metal, it may alternatively be formed from some other resin material, and in this instance, the fixing member 143 and the leaf spring member 251 can be secured to each other by ultrasonic welding.

Figure 71:
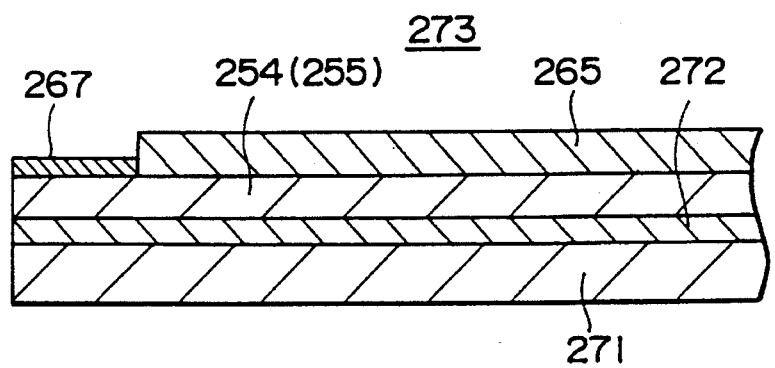
FIG. 71 is a sectional view of another form of the leaf spring member of the magnetic head of FIG. 68.

Furthermore, while, in the magnetic head of the embodiment described above, the leaf spring member 251 is formed from the laminate 266 wherein the wiring lines 254 and 255 formed from the copper foil layer 263, the grounding wiring lines 258 and 259 and so forth are formed on the polyimide film 261, it is otherwise possible to use such a leaf spring member 273 as shown in FIG. 71 wherein wiring lines 254 and 255 and grounding wiring lines 258 and 259 formed from a conductor layer of copper or some other metal are formed on a metal base 271 of, for example, SUS304 with an insulator layer 272 interposed therebetween. The insulator layer 272 may be formed over the entire area or a required area or areas of the metal base 271. If necessary, an insulating cover lay film 265 may be formed. Naturally, the thickness, the material and so forth of each of the layers of the leaf spring member 273 are selected suitably so that required resiliency may be obtained. It is to be noted that, while it is also possible to dispose the grounding wiring lines 258 and 259 in the proximity of the wiring lines 254 and 255, in this instance, electrostatic noise which may be produced from the wiring lines 254 and 255 can be prevented without provision of grounding wiring lines by applying the grounding potential to the metal base 271.

Further, while, in the magnetic head of the present embodiment described above, the wiring lines 254 and 255 are formed substantially in a symmetrical relationship on the opposite sides of the leaf spring member 251 taking the balance of the resiliency into consideration, it is otherwise possible to form the wiring lines 254 and 255 as well as grounding wiring lines on one side of the leaf spring member 251 while the other side of the leaf spring member 251 is formed so as to have equal resiliency as that on the one side in order to assure a balance of the resiliency.

Furthermore, while, in the magnetic head of the present embodiment described above, the entire leaf spring member 251 serves as a flexible circuit board, an alternative construction may be employed wherein only a portion of the leaf spring member 251 from the gimbal 142 to the first terminal extension 252 or another portion of the leaf spring member 251 including the second spring portion 159, the gimbal 142 and the first terminal extension 252 serves partially as a flexible circuit board and wiring lines for other portions are provided using a flexible circuit board of a separate member. In this instance, the reactive force $F_A$ illustrated in FIG. 72 is eliminated.

The leaf spring members 251 and 273 which serve also as flexible circuit boards in the embodiments described above are not limited to those of the embodiments, and a leaf spring member of any configuration can be applied as a leaf spring member for supporting a head body thereon.

Figure 73:
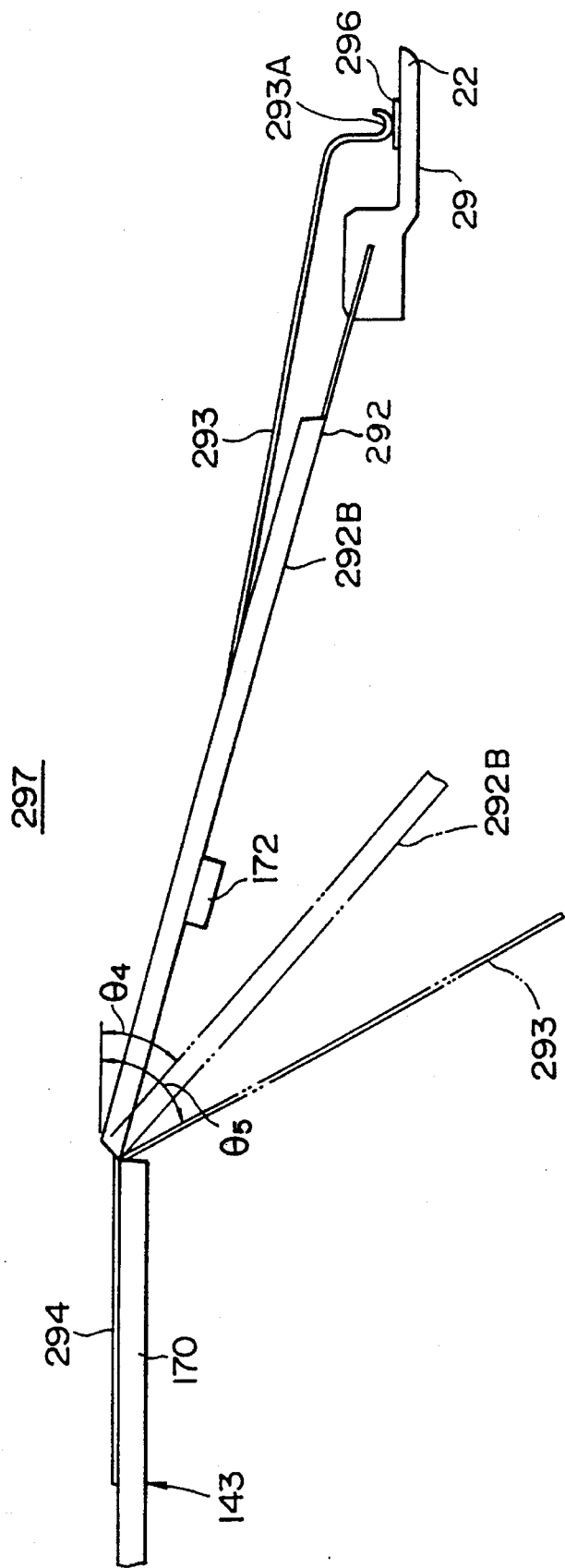
FIG. 73 is a schematic side elevational view of a yet further sliding type magnetic head for magneto-optical recording showing a yet further preferred embodiment of the present invention.
Figure 74:
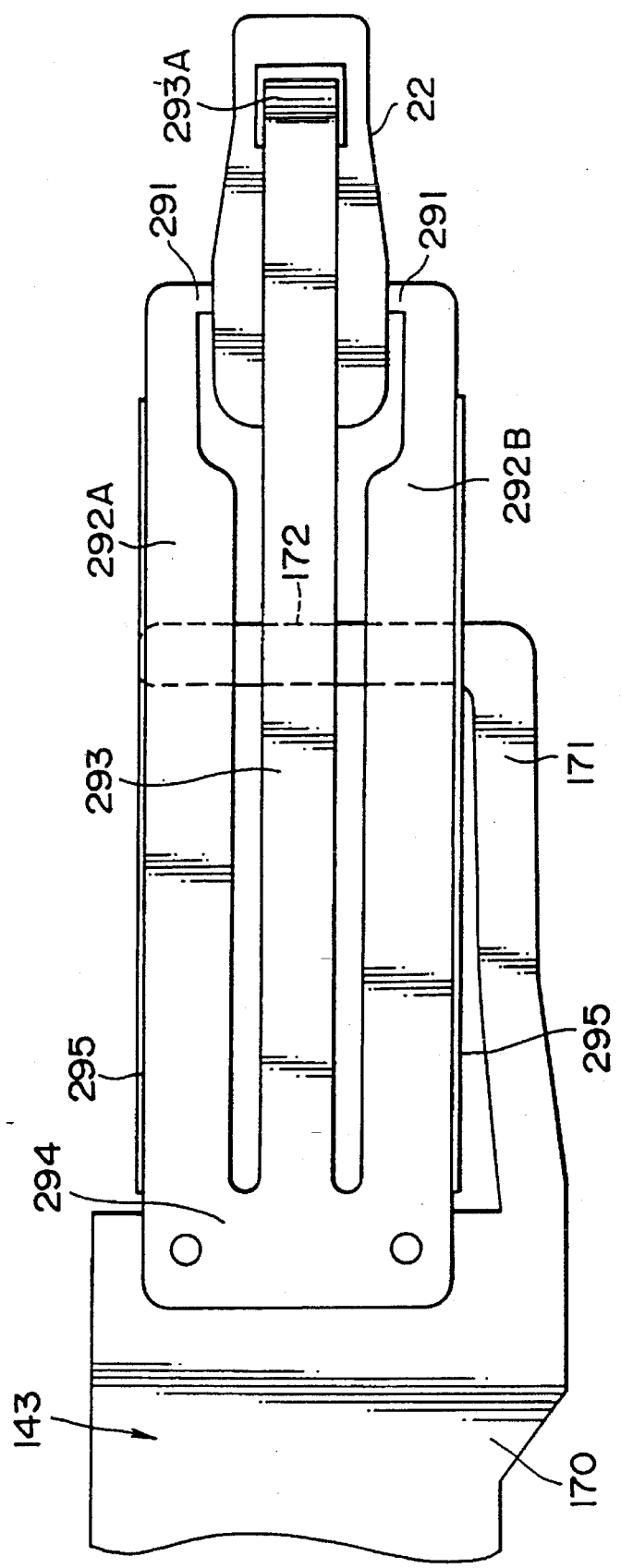
FIG. 74 is a plan view of the magnetic head of FIG. 73.

Referring now to FIGS. 73 and 74, there is shown a sliding type magnetic head for magneto-optical recording according to a yet further preferred embodiment of the present invention. The magnetic head 297 shown includes a head body 22, a support member 292 for supporting the head body 22 at the position of the center of gravity of the head body 22 by way of a gimbal portion 291 thereof, a spring member 293 for resiliently pressing a portion of the head body 22 corresponding to a sliding portion 29, and a fixing member 143 to which ends of the support member 292 and the spring member 293 are fixed. The support member 292 is in the form of a leaf spring member having a pair of spring fingers 292A and 292B.

The fixing member 143 is formed as a unitary member and has, similarly as described hereinabove, a mounting portion 170, an inclined portion 171 extending from a side of the mounting portion 170, and a stopper portion 172 extending perpendicularly from an end of the inclined portion 171.

The leaf spring member 292 and the spring member 293 are formed from a single thin metal plate of, for example, SUS304 or BeCu wherein one ends thereof are connected to each other and the spring member 293 is located between the spring fingers 292A and 292B of the leaf spring member 292.

The spring member 293 and the spring fingers 292A and 292B of the leaf spring member 292 extend in an inclined relationship by a predetermined angle from a mounting portion 294 at which they are connected connected to each other. A rib 295 or a drawn convex portion is formed along each of outer side edges of the spring fingers 292A and 292B of the leaf spring member 292.

The spring fingers 292A and 292B of the leaf spring member 292 are formed to extend, in their initial condition, in an inclined relationship at a predetermined angle $\theta_4$ from the mounting portion 294 as indicated by chain lines in FIG. 73. Meanwhile, the spring member 293 is formed to extend, in its initial condition, in an inclined relationship at another predetermined angle $\theta_5$ ($>\theta_4$) from the mounting portion 294 as indicated by chain lines in FIG. 294.

Predetermined spring pressures are exerted by the leaf spring member 292 and the spring member 293 by securely mounting the mounting portion 294 of them on the fixing member 143 and arresting intermediate portions of them at the stopper portion 172 of the fixing member 143.

A gimbal portion 291 is formed integrally at a free end of each of the spring fingers 292A and 292B of the leaf spring member 292, and the head body 22 is supported at the opposite sides thereof on the spring fingers 292A and 292B by way of the gimbal portions 291. Meanwhile, the spring member 293 is curved at a free end portion 293A thereof which is resiliently contacted with and presses a pressure stage 296 of an upper face of the head body 22 at a position corresponding to the sliding portion 29. A load of the head body 22 to the disk 1 depends principally on the spring pressure of the spring member 293. A load of 0.5 gf or so is exerted in the magnetic head of the present embodiment.

Attachment of the gimbal portions 291 to the head body 22 may be achieved by insert molding together with the slider 28 or by ultrasonic welding.

With the magnetic head 297 of the present embodiment, since the head body 22 is supported at the position of the center of gravity thereof on the spring fingers 292A and 292B of the leaf spring member 292 by way of the gimbal portions 291, even if an impact is applied thereto, an otherwise possible inadvertent movement of the magnetic head 22 by the impact can be prevented. Further, since the head body 22 is supported at the position of the center of gravity thereof, the basic posture of the head body 22 is maintained.

Figure 75:
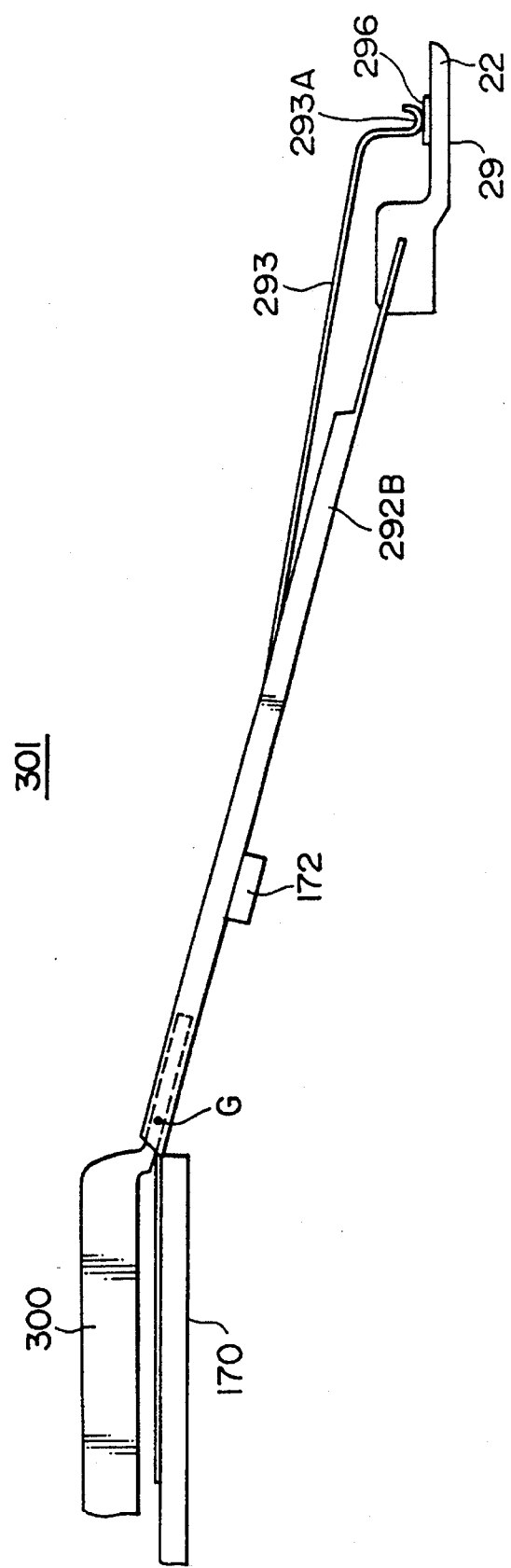
FIG. 75 is a schematic side elevational view of a yet further sliding type magnetic head for magneto-optical recording showing a yet further preferred embodiment of the present invention.
Figure 76:
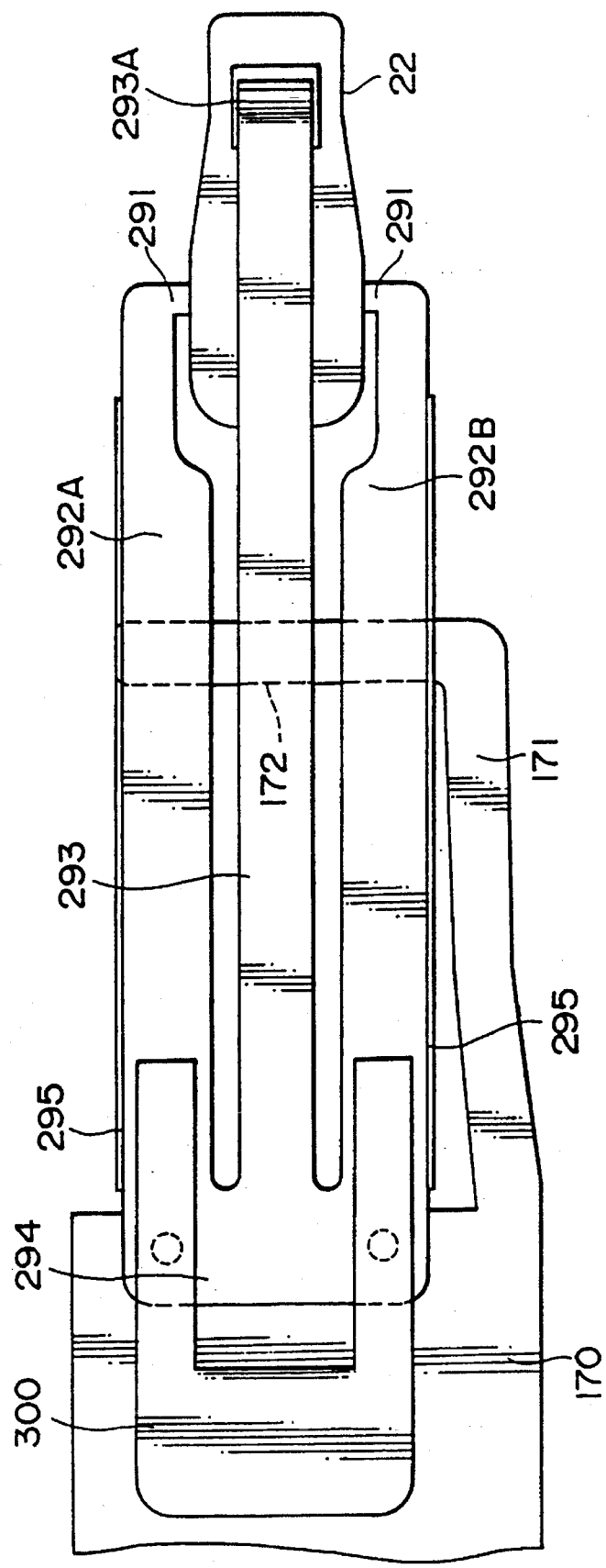
FIG. 76 is a plan view of the magnetic head of FIG. 75.

Referring now to FIGS. 75 and 76, there is shown a sliding type magnetic head for magneto-optical recording according to a yet further preferred embodiment of the present invention. In the magnetic head 301 of the present embodiment, a balance weight 300 is provided at an end portion of a leaf spring member 292 having a pair of spring fingers 292A and 292B. The weight of the balance weight 300 is selected to such a value at which it is balanced with a head body 22 side with respect to a position G in the proximity of a mounting portion 294 of the leaf spring member 292. The other construction of the magnetic head is similar to that of the magnetic head described hereinabove with reference to FIGS. 73 and 74, and overlapping description thereof is omitted herein to avoid redundancy.

With the magnetic head 301 of the present embodiment, since the head body 22 itself is supported at the position of the center of gravity thereof and besides the entire system including the leaf spring member 292 is balanced with respect to the center G, the magnetic head 301 can bear further against an external impact. Further, as the entire system is in a well-balanced condition, the pressing force of the spring member 293 can be reduced, for example, to 0.2 gf or so.

It is to be noted that, also in the magnetic heads 297 and 301 described above, if each of the spring portions is formed in a curved configuration such that the end portion of the leaf spring member adjacent the mounting portion is curved so as to be convex toward the disk side, then the displacement of the head element, particularly the center magnetic pole core of the head element, can be made very small upon lateral deflection of the disk in the upward or downward direction similarly as in the magnetic head shown in FIGS. 36 and 37.

Figure 77:
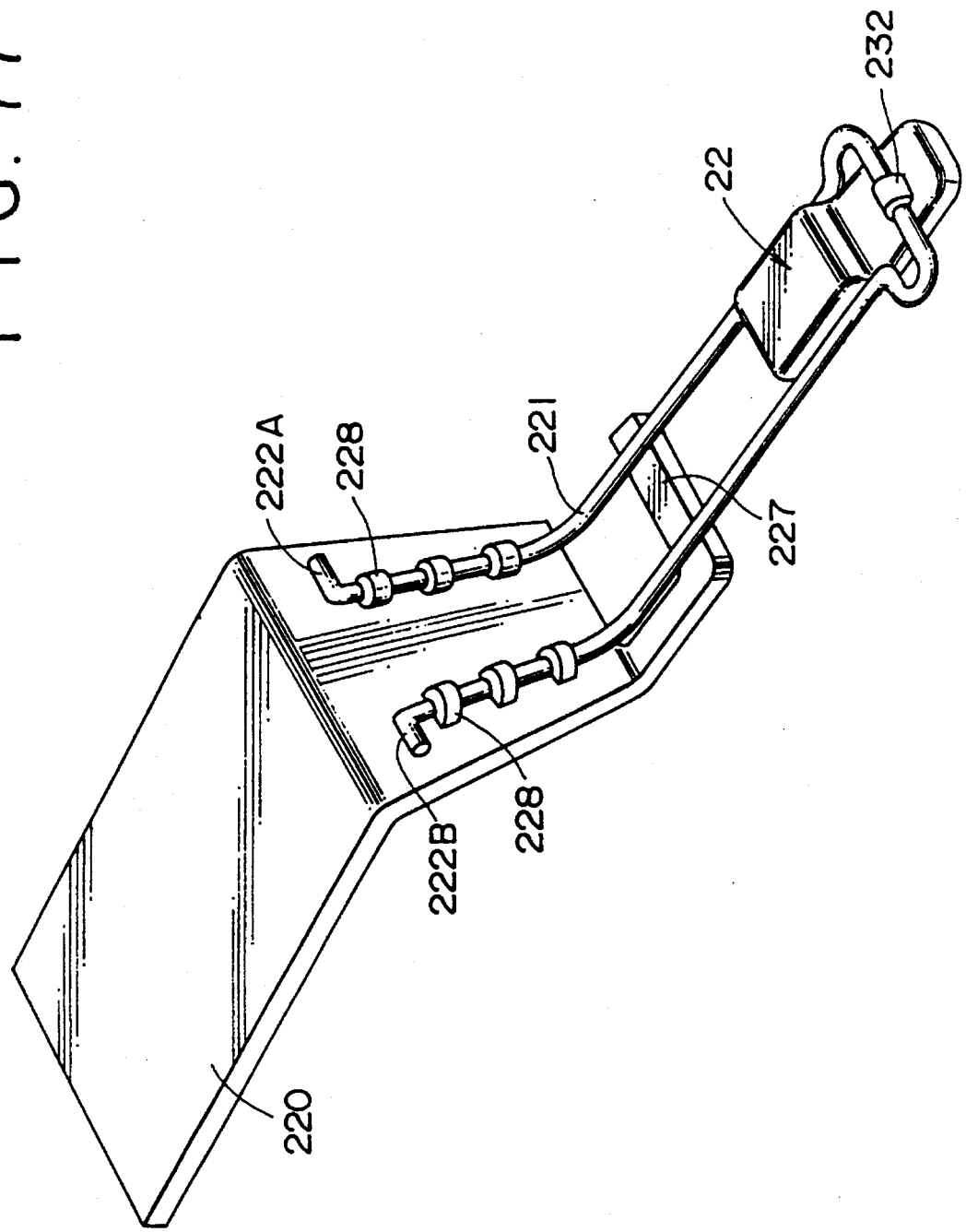
FIG. 77 is a schematic side elevational view of a yet further sliding type magnetic head for magneto-optical recording showing a yet further preferred embodiment of the present invention.
Figure 78:
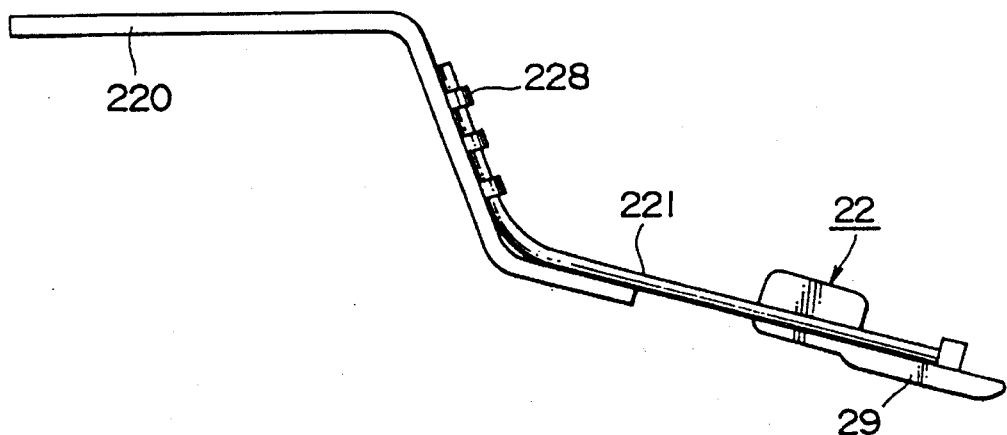
FIG. 78 is a front elevational view of the magnetic head of FIG. 77.

Referring now to FIGS. 77 and 78, there is shown a sliding type magnetic head for magneto-optical recording according to a yet further preferred embodiment of the present invention. The magnetic head of the present embodiment includes a head body 22, a wire-like spring member 221 for resiliently pressing a sliding portion 29 of the head body 22 against a surface 1a of a disk 1, and a fixing member or head arm 220 on which the wire-like spring member 221 is mounted. The wire-like spring member 221 is attached at an end thereof to the head body 22 and at the other end thereof to the fixing member 220.

Figure 79A:
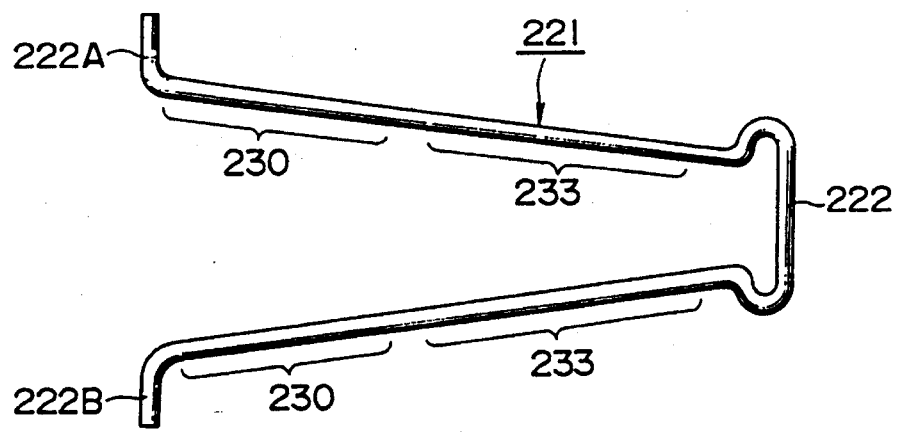
FIGS. 79A and 79B are a plan view and a front elevational view, respectively, of a wire-formed spring member of the magnetic head of FIG. 77.
Figure 79B:
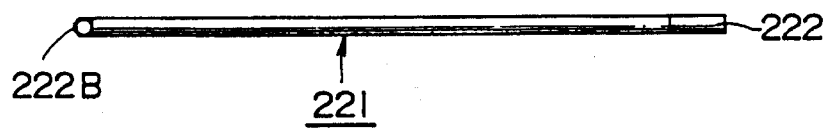

Referring to FIGS. 79A and 79B, the wire-like spring member 221 is formed, for example, by bending a wire-like element of the diameter of 0.2 to 0.4 mm into a substantially trapezoidal shape, in particular, into such a shape that a pair of opposite portions with respect to a central portion 222 of the wire-like element are bent from the central portion 222 so as to extend alongside with each other such that the distance between them increases gradually toward free ends thereof and then the free end portions 222A and 222B are bent horizontally in the opposite directions away from each other. While the ideal bent shape of the wire-like spring member is a triangle as viewed in plan, when mounting of the head body 22 is taken into consideration, such a trapezoidal shape as shown in FIG. 79A is desirable.

Since the wire-like spring member 221 has the free ends 222A and 222B bent in the horizontal directions in this manner, it is positioned when it is to be mounted along the fixing member 220, and distortion of it after it is mounted can be prevented.

Figure 80A:
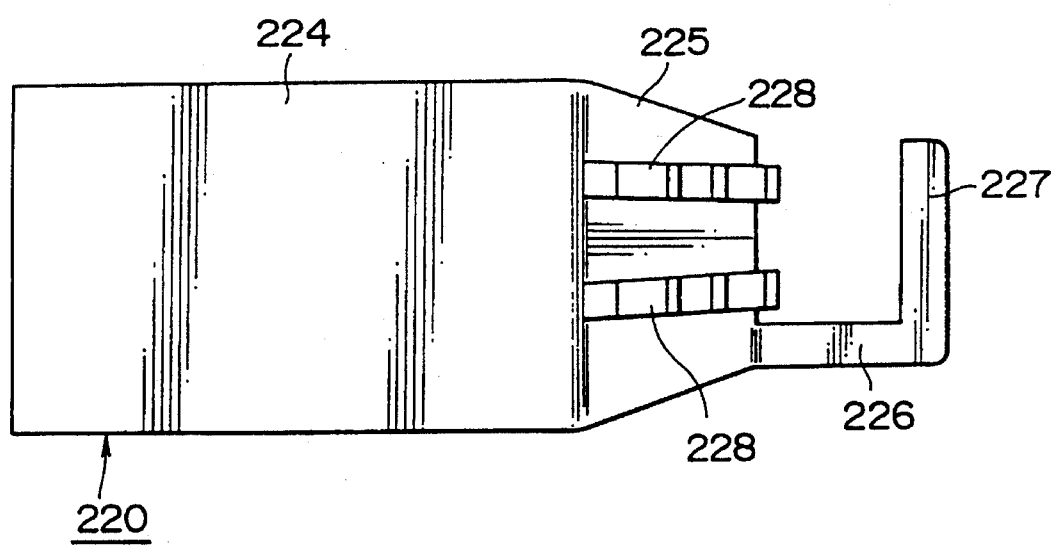
FIGS. 80A and 80B are a plan view and a front elevational view, respectively, of a fixing member of the magnetic head of FIG. 77.
Figure 80B:
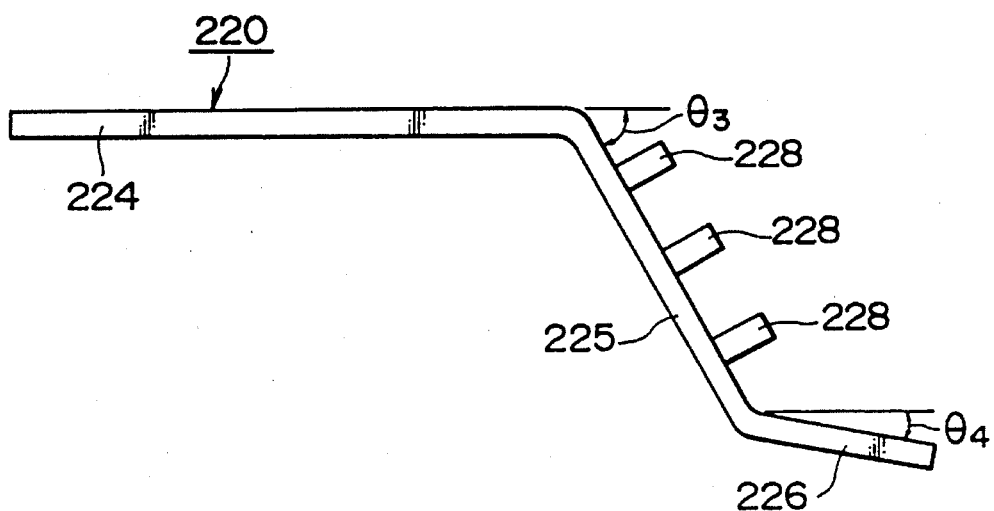

Referring to FIGS. 80A and 80B, the fixing member 220 is formed as a unitary member and has a flat plate portion 224, an inclined mounting portion 225 extending at a predetermined angle $\theta_3$ from the flat plate portion 224, an extension 226 extending at another predetermined angle $\theta_4$ ($\theta_3 > \theta_4$) from one side of the mounting portion 225, and a stopper portion 227 extending perpendicularly from the extension 226 so that it may be opposed to the inclined mounting portion 225.

A plurality of arresting pieces or lugs 228 for fixing the spring member 221 are formed on the inclined mounting portion 225 of the fixing member 220. Then, the wire-like spring member 221 is resiliently deformed so that it extends along the inclined mounting portion 225 and the stopper portion 227 of the fixing member 220, and then the arresting pieces 228 are forcibly bent, for example, by means of a forming machine to fix a pair of leg portions 230 adjacent the free ends 222A and 222B of the spring member 221 to the inclined mounting portion 225 and the stopper portion 227 of the fixing member 220. By this assembly, resiliency is applied to the wire-like spring member 221, and a predetermined spring pressure is provided by the stopper portion 227.

Figure 81:
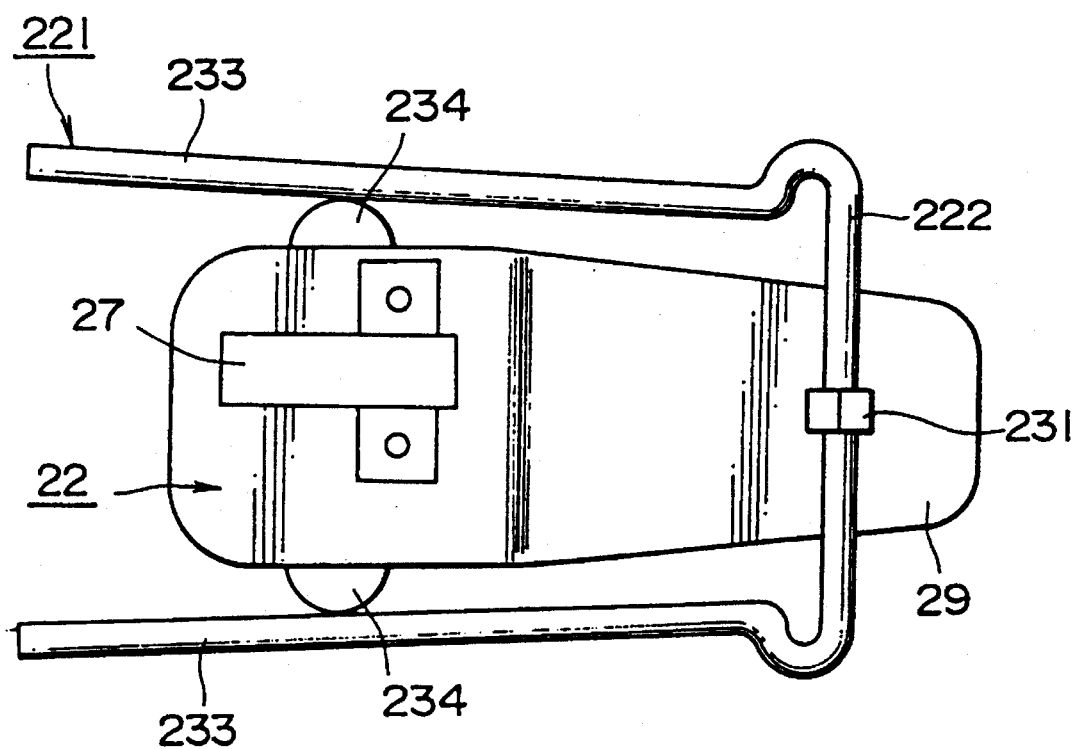
FIG. 81 is a plan view showing another form of part of the magnetic head of FIG. 77.

Subsequently, the head body 22 is mounted for pivotal motion at the central portion 222 on the end side of the spring member 221. For example, a pair of arresting portions 231 are provided on an upper face of the sliding portion 29 of the head body 22 as shown in FIG. 81, and the central portion 222 on the end side of the spring member 221 is engaged with the arresting portions 231 and then the arresting portions 231 are deformed by heat to connect them to each other to mount the spring member 221 for pivotal motion on the head body 22.

Also in this instance, the wire-like spring member 221 of the trapezoidal configuration is disposed such that the two spring portions 233 thereof extend along or in the proximity of an axial line passing the center of gravity of the head body 22 and accordingly part of the head body 22 is positioned upwardly and downwardly across the boundary at a plane defined by the spring portions 233. It is to be noted that, in order to prevent possible displacement of the head body 22 in its widthwise direction, preferably a pair of swollen portions 234 for engaging with the spring portions 233 of the wire-like spring member 221 are provided integrally on the opposite sides of the sliding portion 29 of the head body 22.

The wire-like spring member 221 of the trapezoidal configuration will serve as spring portions for coping with lateral deflection of a disk and for coping with a bump by setting the resonance frequency of the spring to a value lower than a frequency of natural vibrations of the disk 1 and an equivalent frequency of the bump.

Also with the construction, a jump of the head body 22 by a variation of the profile of a disk (that is, a bump or the like) can be prevented, and simultaneously the magnetic head can bear an external impact.

Figure 82:
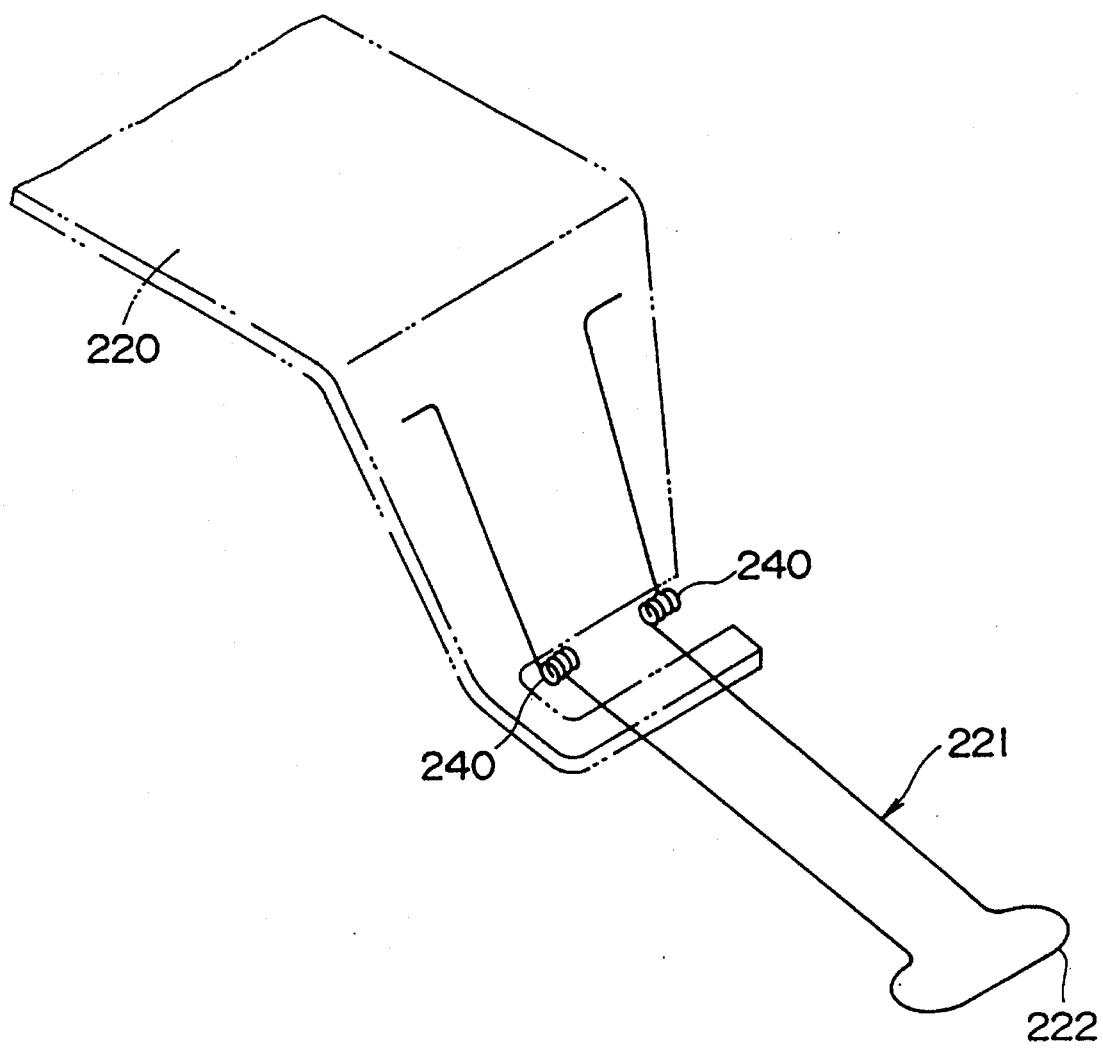
FIG. 82 is a perspective view showing another form of the wire-formed spring member of the magnetic head of FIG. 77.

The wire-like spring member 221 may have, for example, one or a pair of torsion spring portions 240 at an intermediate portion or portions thereof as shown in FIG. 82, and in this instance, the spring constant of the wire-like spring member 221 can be set comparatively low.

Figure 83:
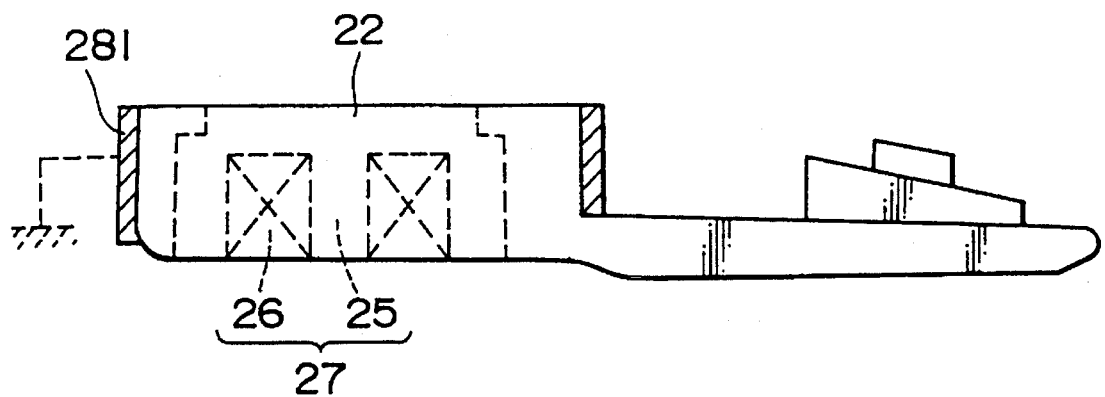
FIG. 83 is a schematic side elevational view, partly in section, showing another form of a head body of the magnetic head of FIG. 77.
Figure 84:
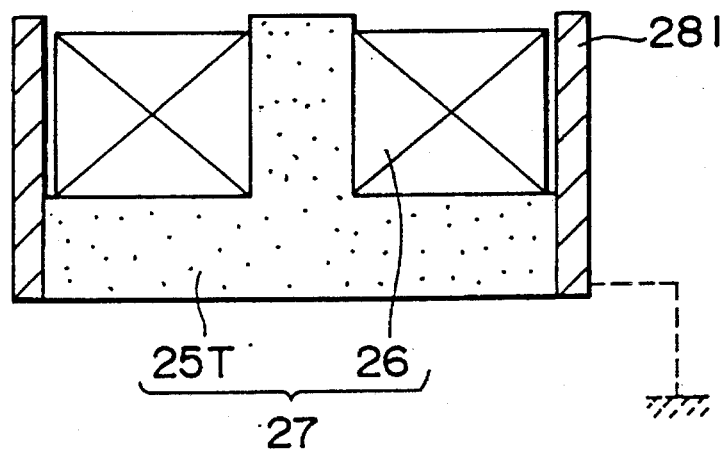
FIG. 84 is a schematic sectional view showing another form of the head body of the magnetic head of FIG. 77.
Figure 85:
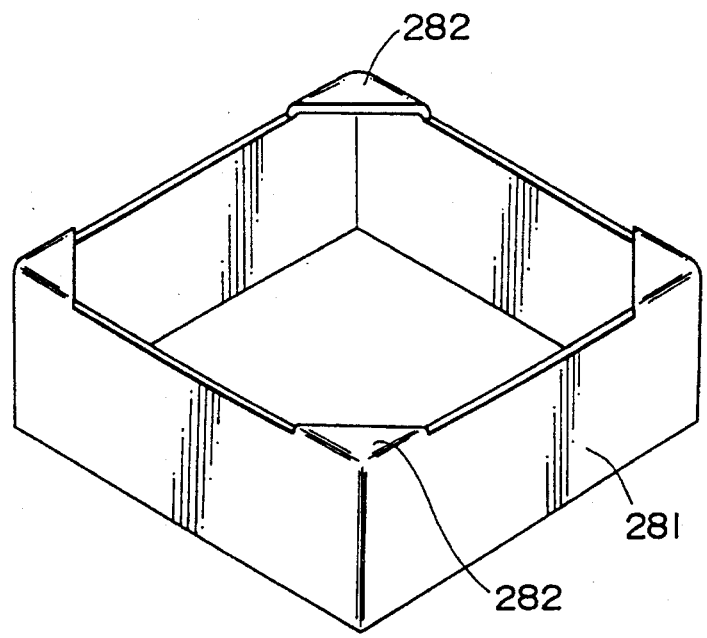
FIG. 85 is a perspective view showing a form of a shielding ring conductor of the magnetic head of FIG. 77.
Figure 86:
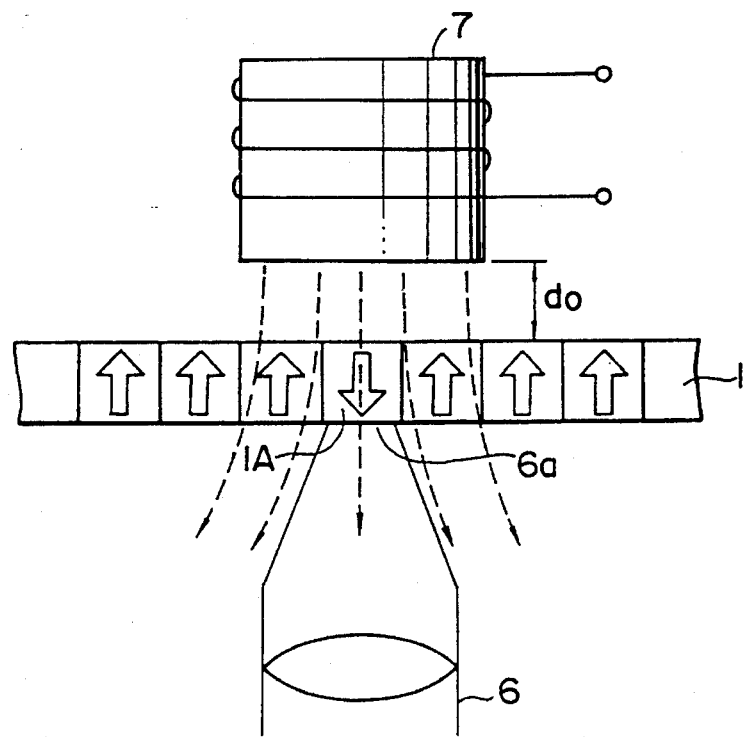
FIG. 86 is a diagrammatic view illustrating magnetic field modulation.
Figure 87:
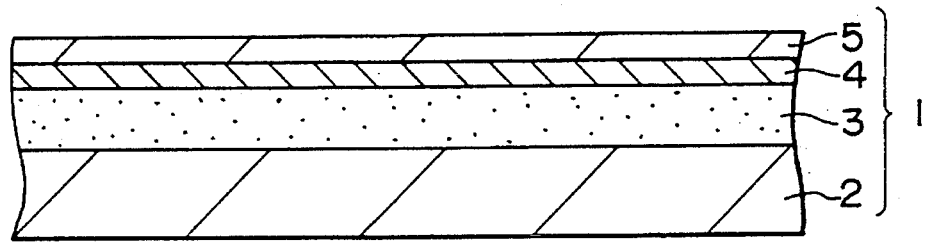
FIG. 87 is a schematic sectional view of a magneto-optical disk.
Figure 88:
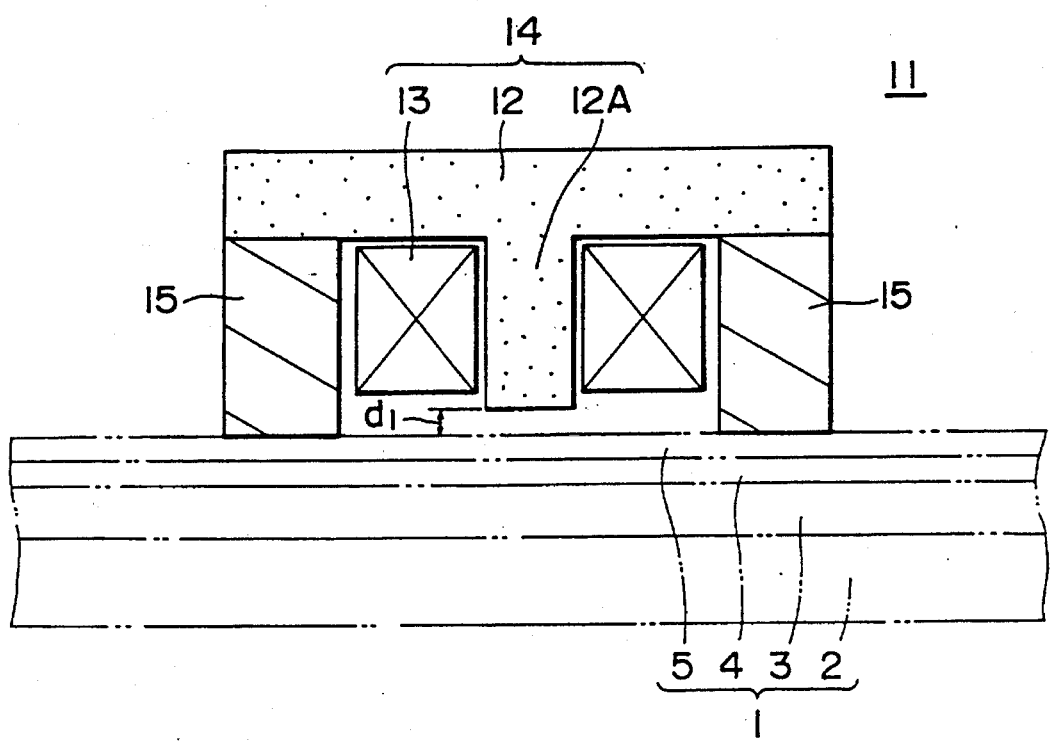
FIG. 88 is a schematic sectional view showing a comparative example of a sliding type magnetic head for magneto-optical recording.
Figure 89:
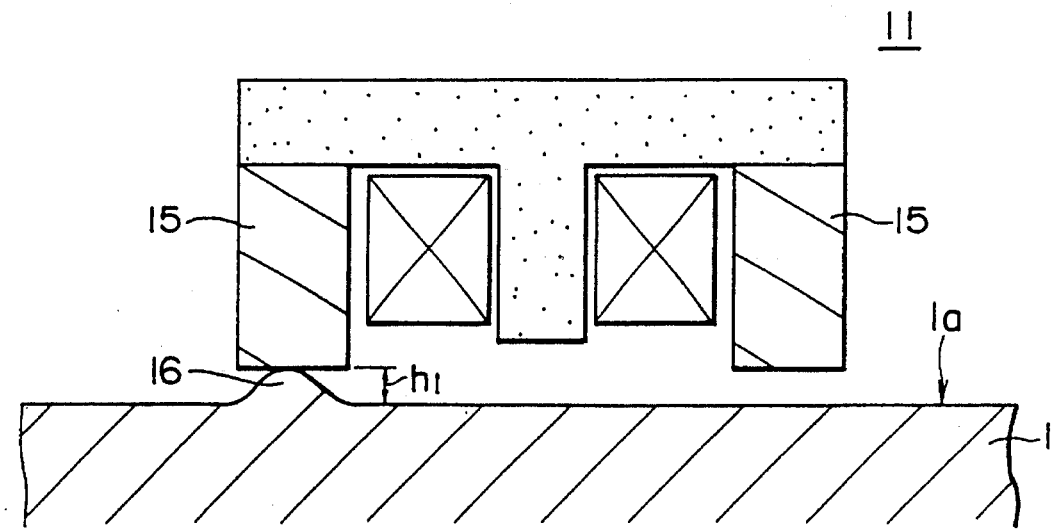
FIG. 89 is a schematic sectional view illustrating operation of the magnetic head of FIG. 88.

In a sliding type magnetic head for magneto-optical recording for use with the magnetic field modulation type described hereinabove, it is required to prevent radiation of electromagnetic noise radiated from the outside from a coil itself of a head element. FIGS. 83 to 85 show different sliding type magnetic heads for magneto-optical recording according to yet further preferred embodiments of the present invention which are improved in this point.

In the magnetic head shown in FIG. 83, a ring-shaped shielding conductor, for example, a ring-shaped shield member 281 of copper having the thickness of 18 to 30 μm, is provided such that it surrounds an outer periphery of a mounting portion 31 of a head body 22 in which a head element 27 is inserted. The copper shield member 281 serves as a magnetic shield member and also as an electrostatic shield member when it is grounded.

While, in the arrangement shown in FIG. 83, the copper shield member 281 is disposed on the outer side of the head body 22, it may alternatively be provided on the inner side of the head body 22 as shown in FIG. 84. In particular, referring to FIG. 84, the magnetic core is formed as a T-shaped core member 25T and a coil 26 is wound around a center magnetic pole core of the T-shaped core member 25T to form the head element 27, and the copper shield member 281 is provided such that it surrounds the head element 27.

Since the copper shield member 281 is formed with a comparatively small thickness in order to reduce the weight thereof, a rib 282 may be provided at each of corners of the ring-shaped copper shield member 281 as shown in FIG. 85 to raise the strength of the ring-shaped copper shield member 281. Further, the effect of the shield member 281 for surrounding a coil is enhanced if it is formed from a plurality of layers.

Where the copper shield member 281 is disposed so as to surround the coil 26 of the head element 27 in this manner, magnetic shielding and electrostatic shielding for the magnetic head are achieved in magnetic recording of the magnetic field modulation type, and radiation of electromagnetic noise radiated from the coil 26 to the outside can be prevented.

It is to be noted that, while in the embodiments described hereinabove the present invention is applied to a magnetic head for a magneto-optical disk of the very small type, it may be applied also to a sliding type magnetic head for magneto-optical recording for an ordinary magneto-optical disk.

Further, a magnetic head of the present invention can be applied to those of the magnetic field modulation type and the optical modulation type.

Having now fully described the invention, it will be apparent to one of ordinary skill in the art that many changes and modifications can be made thereto without departing from the spirit and scope of the invention as set forth herein.

What is claimed is:

1. A sliding type magnetic head for magneto-optical recording on a recording medium, comprising:

a head body having a center of gravity, said head body including a head element including a coil and a magnetic core on a first side of said center of gravity, said head body further including a sliding element on a second side of said center of gravity, said second side being on an opposite side of said center of gravity from said first side, said sliding element slidably contacting a record medium, said head body having a shaped surface for disposal opposite the recording medium with said coil and magnetic core being at one part of said shaped surface and said sliding element being at another part of said shaped surface so that said coil and said magnetic core are spaced from the recording medium when said sliding element in sliding engagement with the recording medium, means for mounting said head body for pivoting movement about said center of gravity, means for biasing said head body for pivotable movement about said center of gravity in a biasing direction to cause said sliding element to be in sliding contact with the recording medium and to cause said coil and said magnetic core to be spaced from said recording medium during use of said magnetic head, wherein said head body pivots about said center of gravity on said means for mounting in a direction opposite said biasing direction of said means for biasing when a bump on the recording medium strikes said sliding element so that said coil and magnetic core move closer to the recording medium as the bump on the recording medium causes said slider to move away from the recording medium.

2. A sliding type magnetic head for magneto-optical recording according to claim 1, wherein said means for mounting holds said head element spaced away from a surface of a recording medium when said sliding element of said head body contacts with the surface of the recording medium.

3. A sliding type magnetic head for magneto-optical recording, comprising:

a head body including a head element including a coil and a magnetic core, said head body further including a sliding element on one side of said head body for slidably contacting with a record medium, said head body further including said core and magnetic coil on another side of said head body;

means for pivotably mounting said head body for pivotable movement about an axis of rotation between said sliding element and said head element; and a spring means for resiliently biasing said head body in a direction pressing said sliding element of said head body against a surface of a record medium and for spacing said head element away from the surface of the record medium, wherein said magnetic core moves toward the record medium as said sliding element moves away from the record medium due to striking a bump on the record medium.

4. A sliding type magnetic head for magneto-optical recording according to claim 3, wherein said head body is supported at a position at least near the center of gravity of said head body.

5. A sliding type magnetic head for magneto-optical recording, comprising:

a head body including a head element including a magnetic core and a coil wound on said magnetic core, said head body further including a sliding element on one side of said head body for slidably contacting with a record medium and said magnetic core on another side of said head body; and a spring member for resiliently biasing said head body in a direction pressing said sliding element of said head element toward the record medium;

said head body being supported for pivotable movement at a position corresponding to an intermediate position between said magnetic core and said sliding element so that said magnetic core moves toward the recording medium as said sliding element moves away from the recording medium due to striking a bump on the recording medium.

\* \* \* \* \*